Sept. 24, 1946.  A. F. POTT  2,408,097

CALCULATING MACHINE FOR PERFORMING DIVISION

Filed Dec. 19, 1939   23 Sheets-Sheet 1

Inventor,
A. F. Pott
By: Glascock
Downing & Seebold
Attys.

Sept. 24, 1946.  A. F. POTT  2,408,097
CALCULATING MACHINE FOR PERFORMING DIVISION
Filed Dec. 19, 1939  23 Sheets-Sheet 2
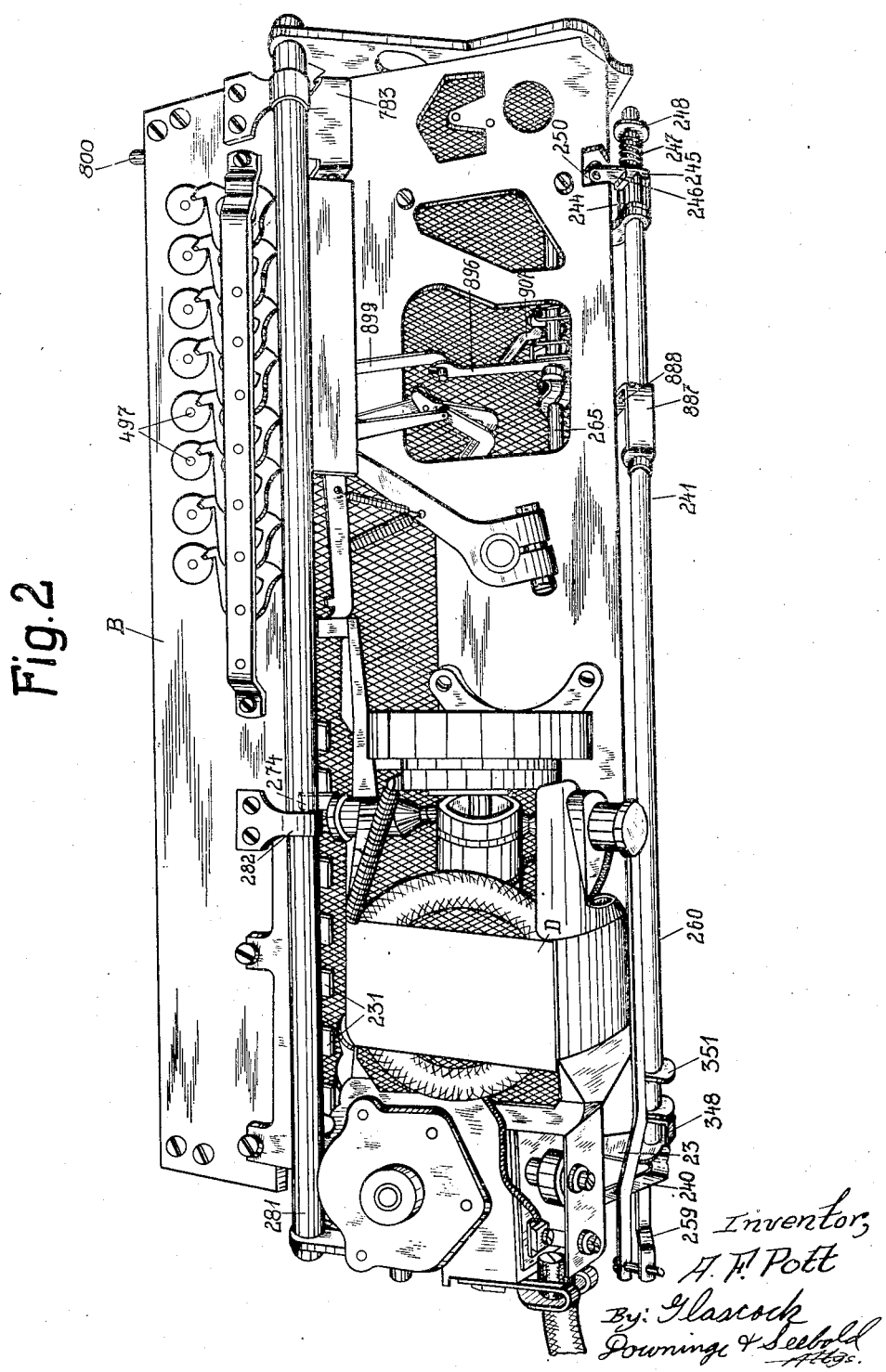

Sept. 24, 1946.        A. F. POTT         2,408,097
CALCULATING MACHINE FOR PERFORMING DIVISION
Filed Dec. 19, 1939        23 Sheets-Sheet 3
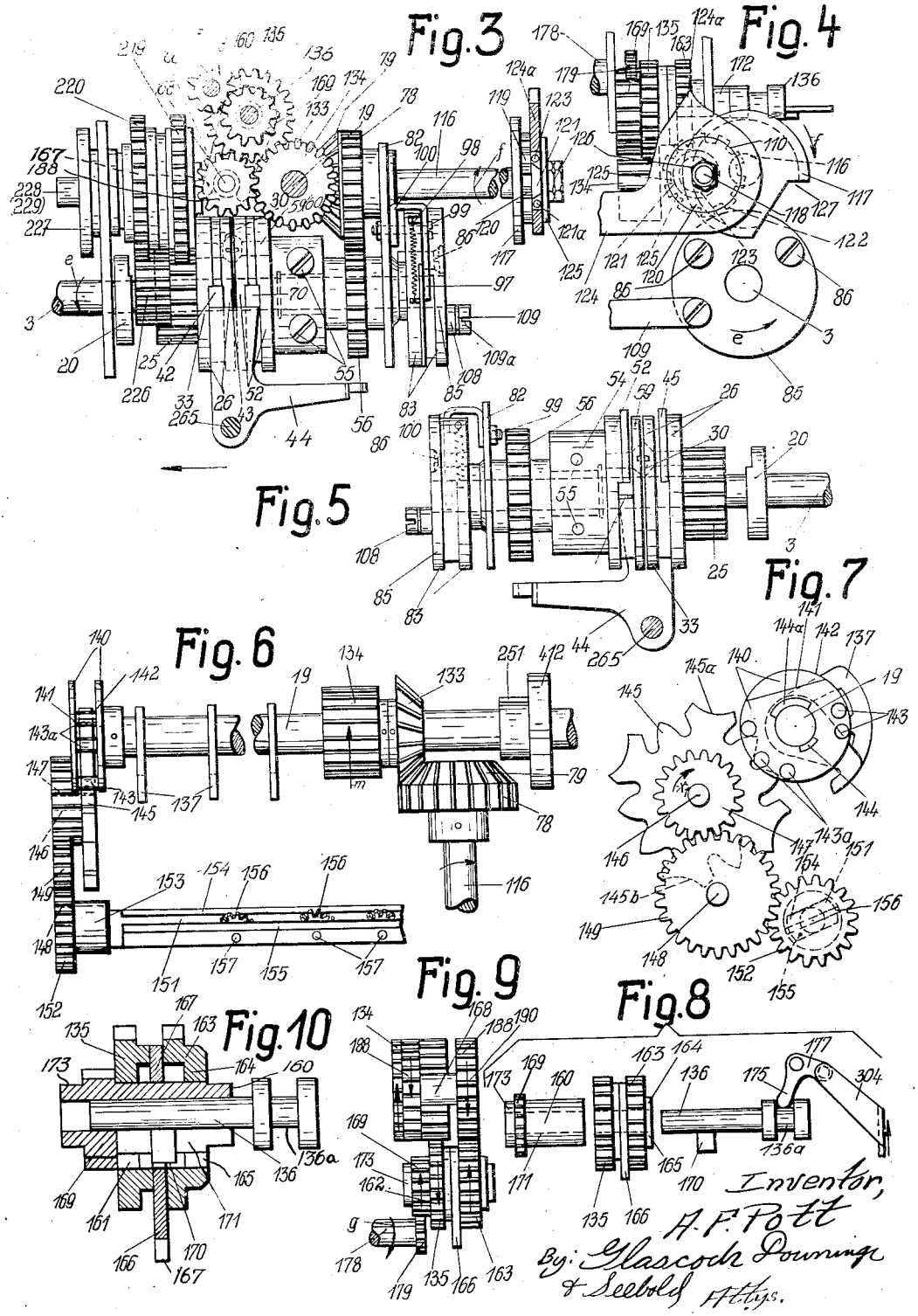

Sept. 24, 1946.   A. F. POTT   2,408,097
CALCULATING MACHINE FOR PERFORMING DIVISION
Filed Dec. 19, 1939   23 Sheets-Sheet 4
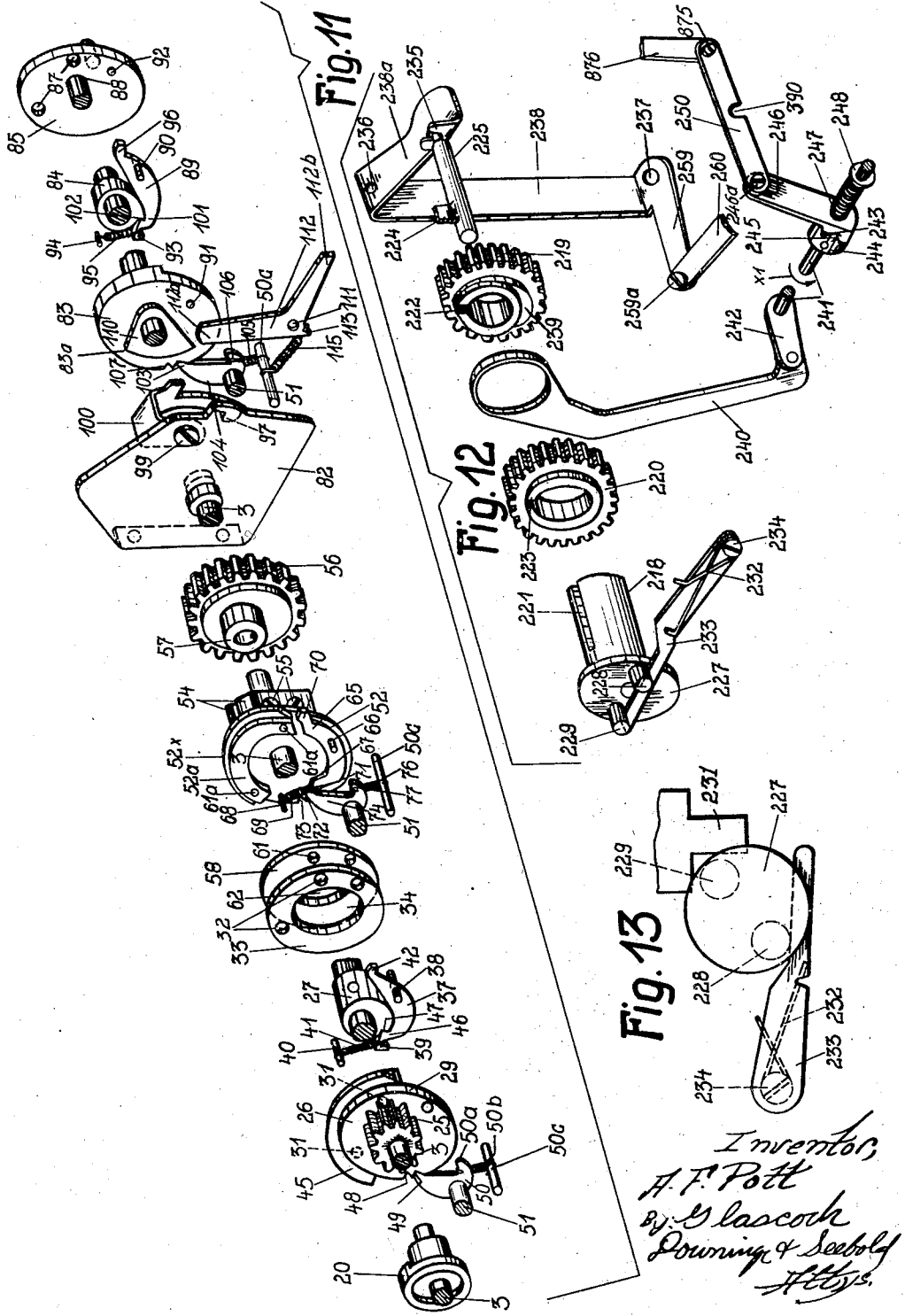

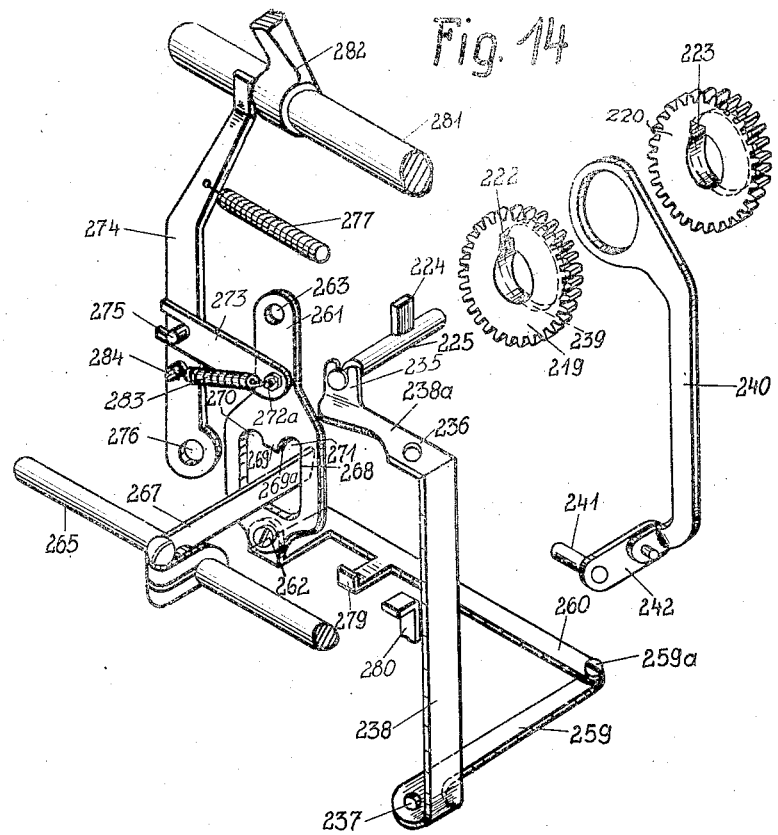
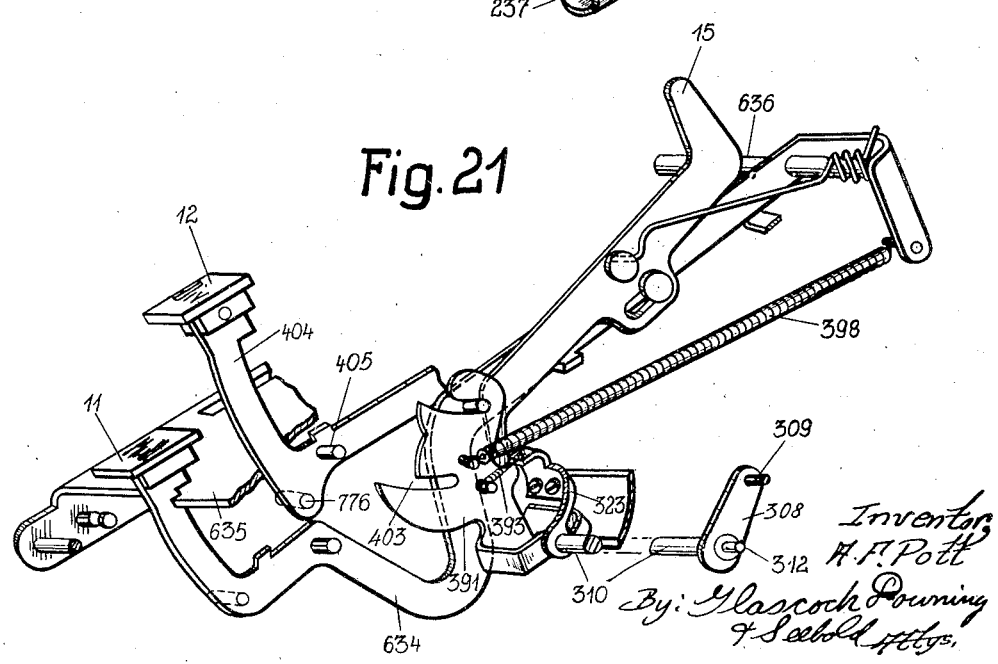

Sept. 24, 1946.　　　　A. F. POTT　　　　2,408,097
CALCULATING MACHINE FOR PERFORMING DIVISION
Filed Dec. 19, 1939　　　23 Sheets-Sheet 6
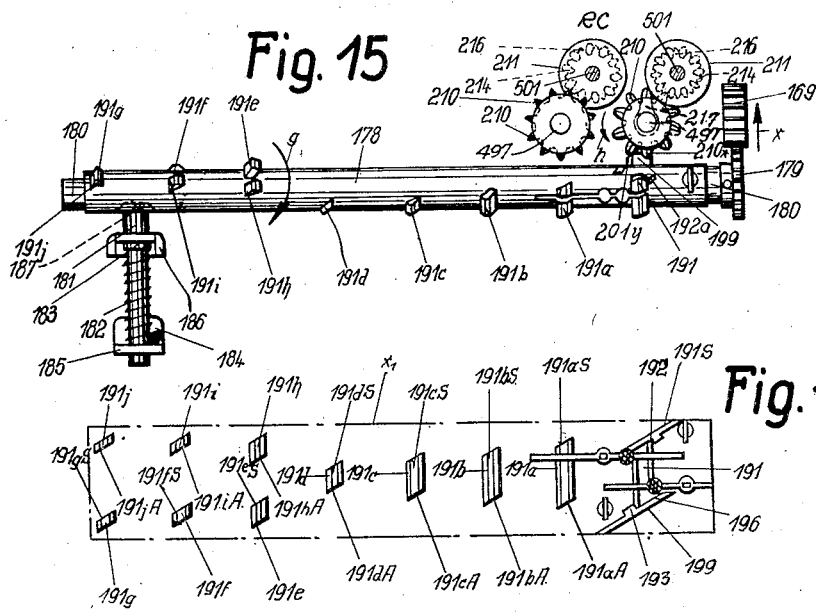
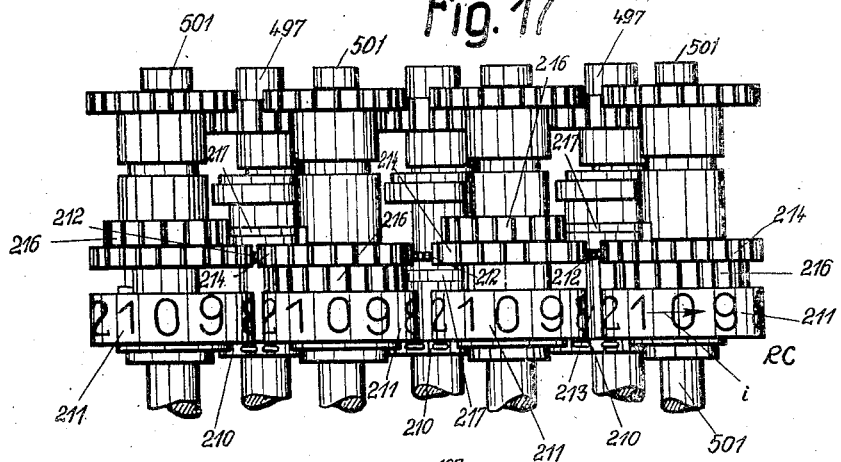
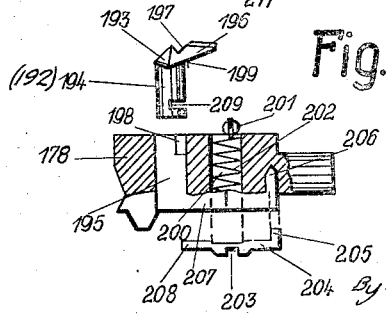

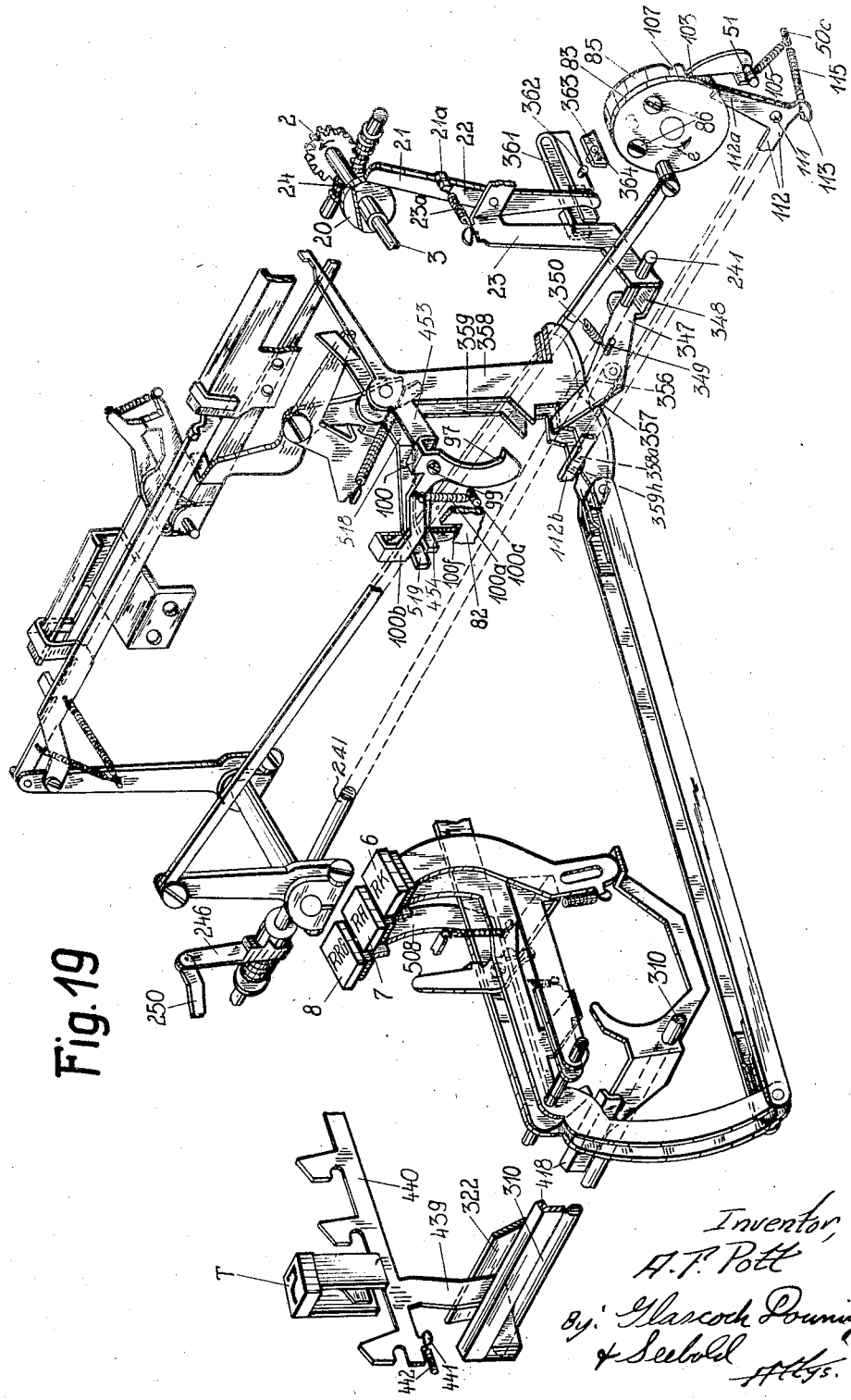

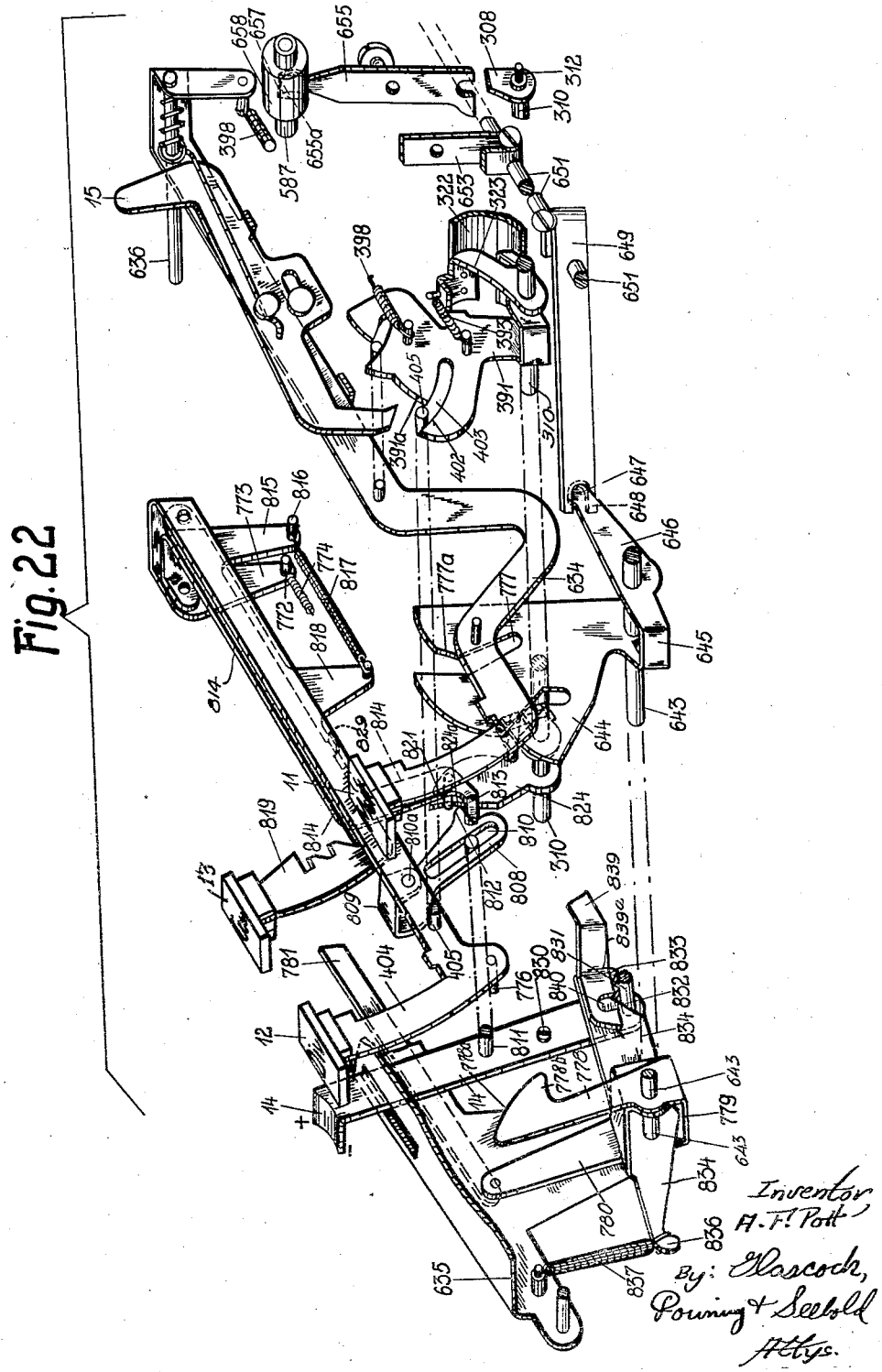

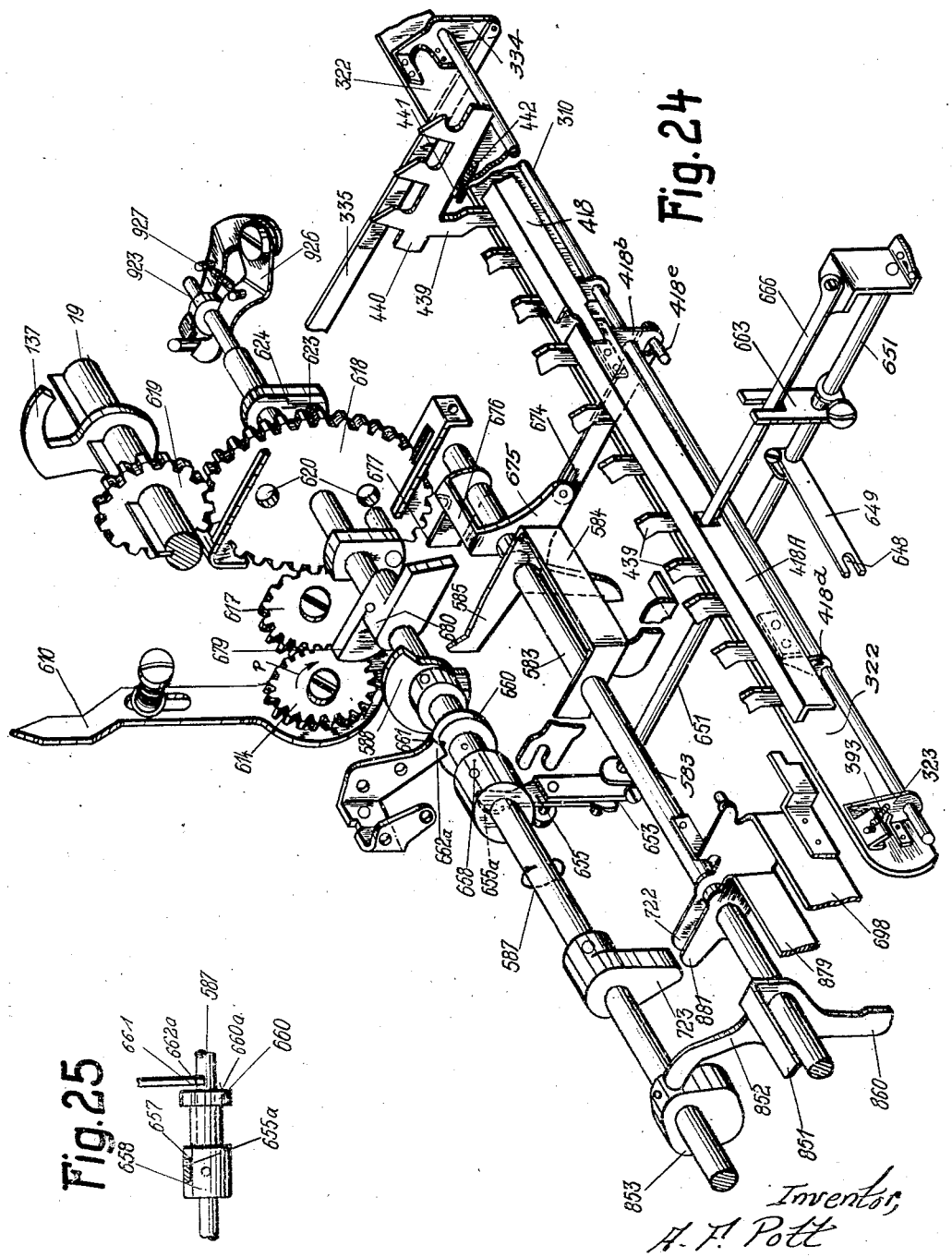

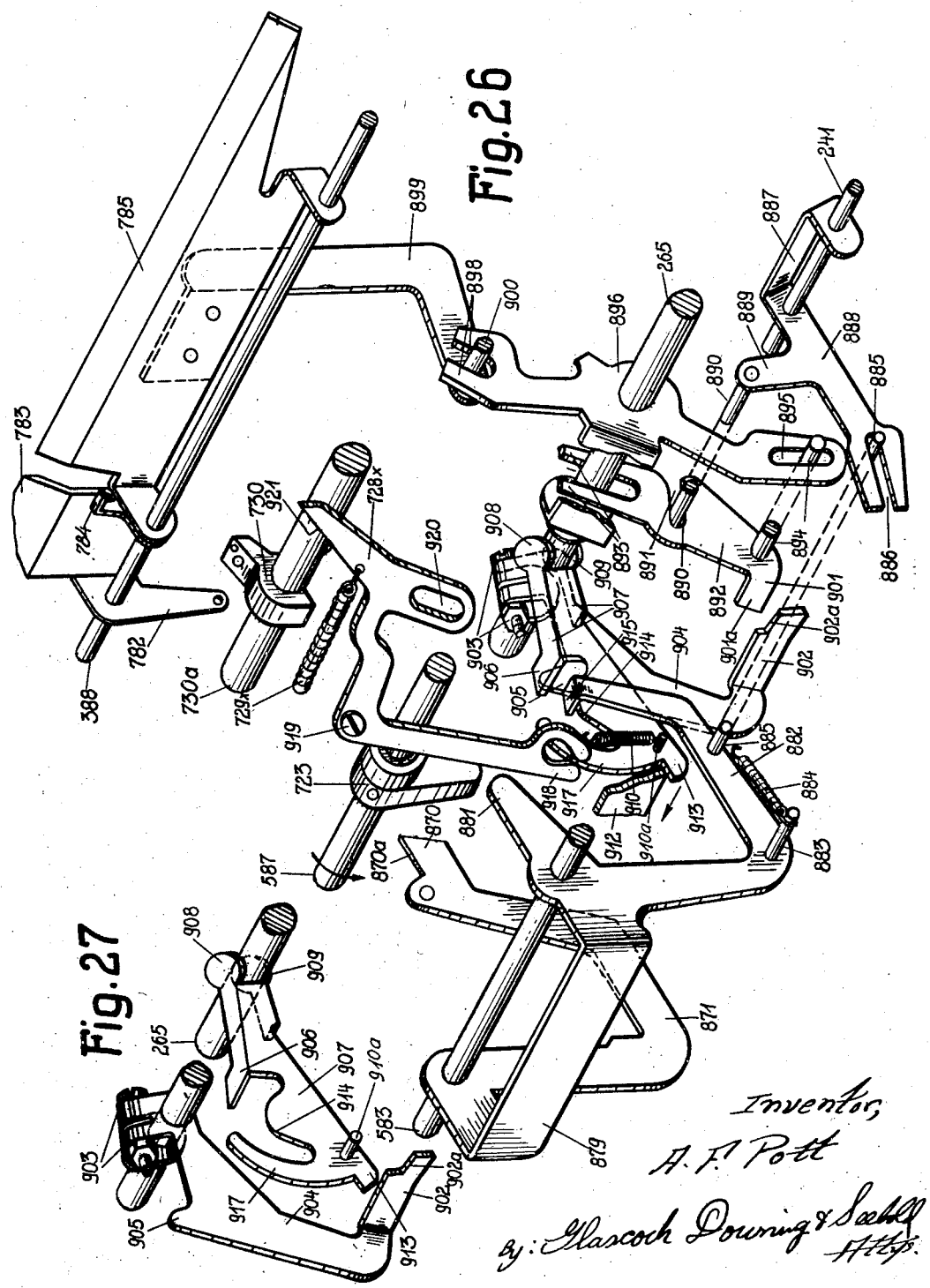

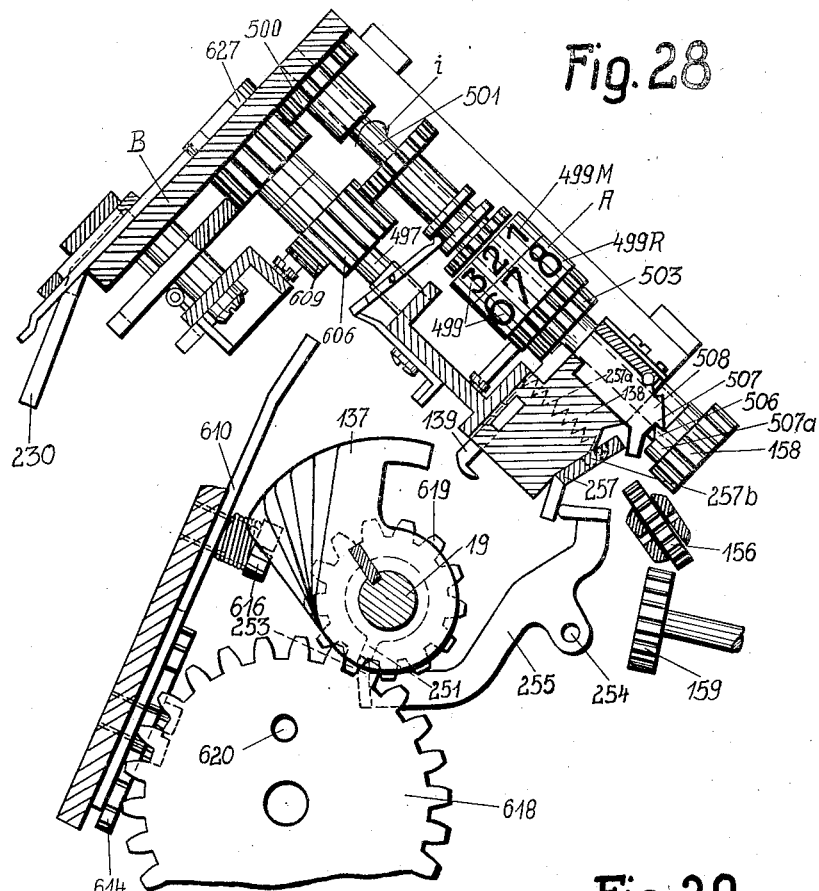
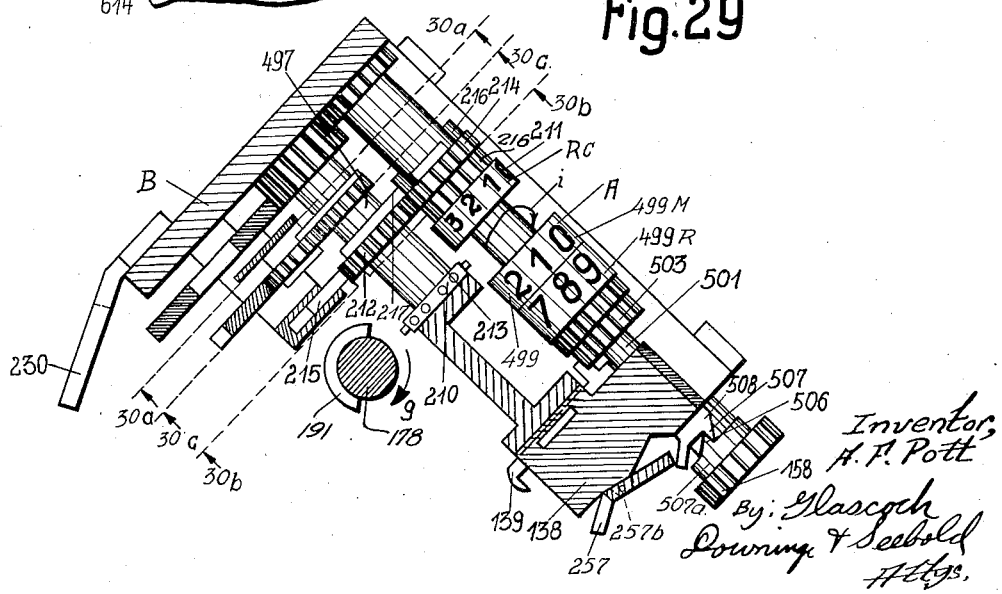

Sept. 24, 1946.　　　　A. F. POTT　　　　2,408,097
CALCULATING MACHINE FOR PERFORMING DIVISION
Filed Dec. 19, 1939　　　23 Sheets-Sheet 14
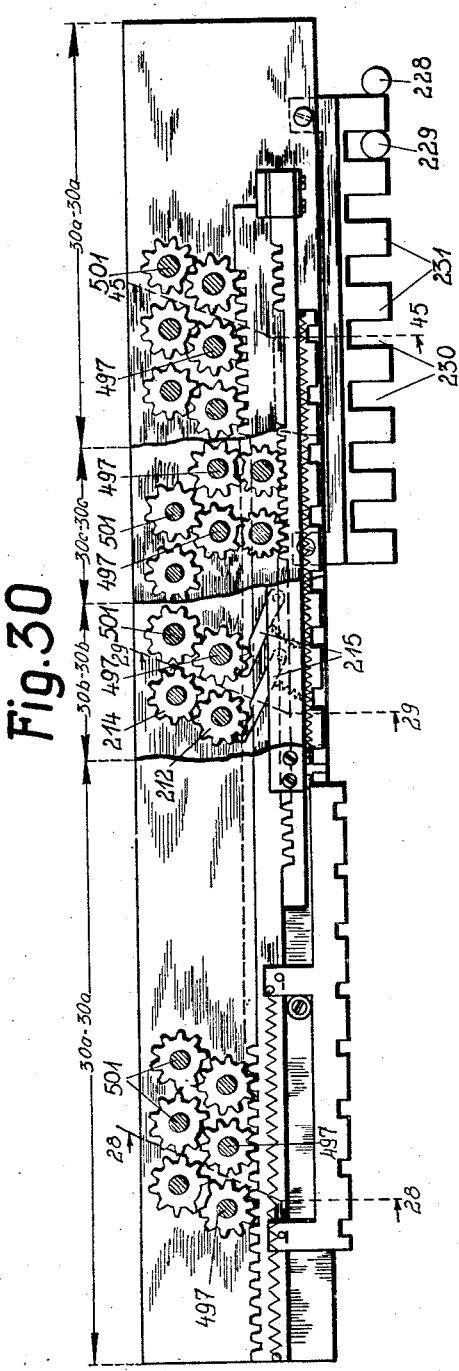
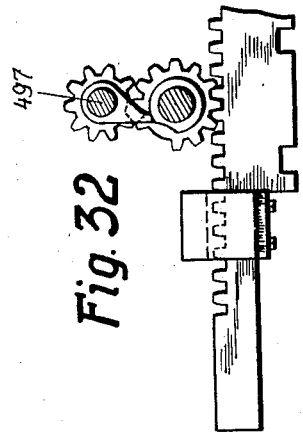
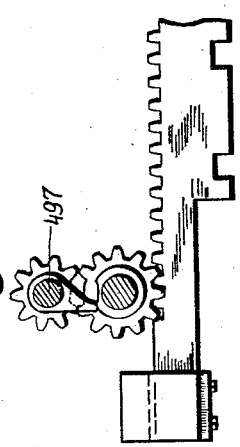

Sept. 24, 1946.　　　A. F. POTT　　　2,408,097
CALCULATING MACHINE FOR PERFORMING DIVISION
Filed Dec. 19, 1939　　23 Sheets-Sheet 15

Inventor;
A. F. Pott
By: Glascock Downing & Seebold
Attys.

Sept. 24, 1946.   A. F. POTT   2,408,097
CALCULATING MACHINE FOR PERFORMING DIVISION
Filed Dec. 19, 1939   23 Sheets-Sheet 17

Inventor,
A. F. Pott
By: Glascock
Downing & Seebold
Attys.

Sept. 24, 1946. A. F. POTT 2,408,097
CALCULATING MACHINE FOR PERFORMING DIVISION
Filed Dec. 19, 1939 23 Sheets-Sheet 18

Inventor,
A. F. Pott
By: Glascock
Downing & Seebold
Attys.

Sept. 24, 1946.  A. F. POTT  2,408,097
CALCULATING MACHINE FOR PERFORMING DIVISION
Filed Dec. 19, 1939  23 Sheets-Sheet 23

Patented Sept. 24, 1946

2,408,097

UNITED STATES PATENT OFFICE 2,408,097

CALCULATING MACHINE FOR PERFORMING DIVISION

August Friedrich Pott, Zella-Mehlis II, Thuringia, Germany; vested in the Alien Property Custodian Application December 19, 1939, Serial No. 310,079
In Germany December 30, 1932

16 Claims. (Cl. 235—73)

This application is a continuation-in-part of my earlier application 704,354 filed December 28, 1933 which has been abandoned, and relates to improvements in calculating machines of the type equipped for setting up a dividend and a divisor in a common keyboard.

The primary object of my invention is the provision of an efficient machine adapted for the setting up of a dividend and divisor in common setting up mechanism including a stationary keyboard, together with simplified state control means for conditioning the machine for the entry of the desired values for division operations.

Other objects of my improvements will become apparent from the following description and claims with reference to the accompanying drawings.

In said drawings,

Figure 1 is a view in perspective of a calculating machine embodying my improvements and looking at the front of the machine, Figure 2 is a view in perspective looking at the rear of the machine, Figure 3 is a view in side elevation of the main drive shaft of the machine, together with coupling mechanism including clutch devices for connecting the carriage shift and differential mechanism to the main drive shaft, and also parts associated with coupling or clutch mechanism.

Figure 4 is a detail view looking at the right hand side of Fig. 3.

Figure 5 is a detail view in elevation similar to Fig. 3, but looking at the opposite side from that shown in Fig. 3.

Fig. 6 is a view in plan of parts of driving mechanism for the value wheels of the dividend registering means.

Fig. 7 is a view in end elevation of parts shown in Fig. 6 looking at the left hand side of Fig. 6.

Fig. 8 is a view of a draw key and other parts of the reverse gearing for the quotient register shown in disassembled positions.

Fig. 9 is a plan view of the reverse gearing for the driving shaft of the quotient register.

Fig. 10 is a view in longitudinal section of parts of the reverse gearing in the quotient register.

Fig. 11 is a view in perspective of parts of the coupling or clutch mechanism shown in Figs. 3 and 5 with said parts disassembled.

Fig. 12 is a view in perspective of a draw key coupling forming part of the carriage reversing mechanism, together with control parts associated therewith and showing the parts disassembled.

Fig. 13 is a detail view in elevation of parts of the carriage shifting mechanism.

Fig. 14 is a perspective view of parts of the carriage shift reversing mechanism.

Fig. 15 is a view in front elevation illustrating the transfer mechanism of the quotient register.

Fig. 16 is a diagrammatic development of the driving shaft of the quotient register.

Fig. 17 is a plan view of the quotient register with the parts separated for clearness of illustration.

Fig. 18 is a detail view in section of portions of the driving shaft and transfer devices for the quotient register.

Fig. 19 is a view in perspective of the resetting mechanisms for the keyboard, the dividend registering means and the quotient register.

Fig. 21 is a view in perspective of the multiplication and division keys, a multiplication interruption lever and part of a key locking bail, the multiplication key being depressed and said interruption lever being shown in effective position.

Fig. 22 is a view in perspective of the multiplication, division, and correction keys, respectively, together with levers and other parts operated thereby.

Fig. 24 is a perspective view of a settable multiplication and division control shaft, the drive thereto, parts operated and controlled by said shaft, setting mechanism for the shaft, and parts of the keyboard resetting mechanism.

Fig. 25 is a view showing the control shaft set by depression of the division key.

Fig. 26 is a perspective view of parts of the division mechanism.

Fig. 27 is a fragmentary view in perspective of details of the division mechanism.

Fig. 28 is a view in transverse section taken on the line 28—28 of Fig. 30, looking in the direction indicated by the arrows and showing on an enlarged scale the dividend registering means and appertaining parts.

Fig. 29 is a similar view taken on the line 29—29 of Fig. 30 looking in the direction indicated by the arrows.

Fig. 30 is a section through the register carriage taken in different planes on the line 30a—30a, 30b—30b and 30c—30c of Fig. 29 looking in the direction of the arrows.

Fig. 31 is a fragmentary view partly in section and partly in elevation, of an overthrow lock for the resetting or zero-setting mechanism of the quotient register.

Fig. 32 is a similar view illustrating the operation of the said lock.

Figure 1:
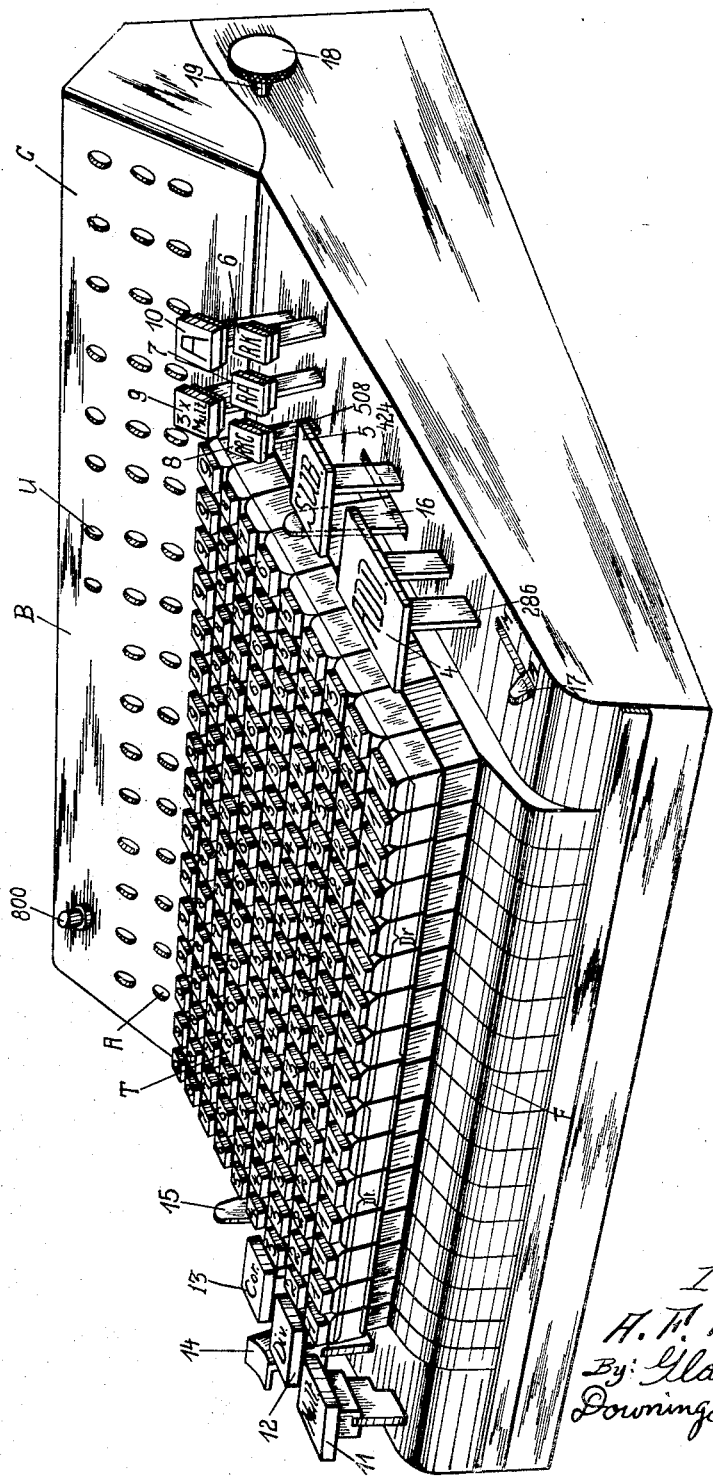

The present invention is concerned more particularly with the well known Mercedes Euklid calculating machine, the basic structure of which is disclosed in U. S. Patent No. 1,011,617, which is a key-set, one-way drive adding mechanism adapted for subtracting, under control of a subtract key, by complemental addition.

The machine of the present invention will now be described under appropriate headings.

GENERAL ASSEMBLY

The casing F supports at its rear a carriage B for the main totalizer A, on which, when performing division, the dividend is registered, and the revolutions counter or quotient register RC (Fig. 29) visible through the usual sight openings U in the cover plate C. The keyboard comprises denominational rows of value keys T for setting up values in an indexing mechanism. The machine is motor driven under the control of special control keys, as follows:

At the right of the keys T, as viewed by an operator facing the machine, is an addition key 4 designated "Add," a subtraction key 5 designated "Sub," a keyboard resetting key 6 designated RK, an accumulator clearing or resetting key 7, designated RA, a quotient register resetting key 8 designated RRC, a "threefold" multiplication key 9 designated "3×Mult." and a key 10 designated A for the storage device. Also at the right-hand side of the keyboard are levers 16 and 17, the former for controlling the resetting of the quotient register RC in three-fold multiplication and the latter, a repeat or cycle controlling key or lever for determining whether or not the machine shall operate through a single or multiple cycles of operations when the addition or subtraction keys 4 or 5 are held depressed.

On the left-hand side of the keyboard are a multiplication key 11 marked "Mult.," a division key 12 marked "Div.," a correction key 13, marked "Cor.," a lever 14 for controlling the machine for positive and negative computing in multiplication and division, and a multiplication interruption lever 15.

The knob 18 caps a shaft 19 projecting through the right-hand side frame, for the application of a crank to the drive mechanism whereby crank operation of the machine may be resorted to when desired, as disclosed in my prior U. S. Patent No. 1,935,858.

KEYBOARD

There are sixteen rows of value keys T, in the present instance, since the main accumulator or dividend registering means (A) has a capacity of sixteen denominations. In division, that section of the keyboard comprising the nine right-hand rows are for use in setting up the divisor and the section comprising the seven left-hand rows may be used for setting up the dividend.

For convenience in distinguishing between the two sections of the keyboard, as above characterized, the cover plate C is bracketed in front of said keys and the abbreviations "Dr" and "Dt" are delineated thereon, in front of the appropriate sections of said keys. Also the first row of the left-hand section of keys T is suitably colored to provide a visible line of distinction between the two indicated sections thereof.

VALUE KEY LOCKING MECHANISM

The value keys T are locked in depressed position by reciprocating key locking bars 440 (Figs. 19, 24 and 39), which in the depressed position of said keys, are shifted forwardly to locking position by suitable tension springs 442 connected thereto at 441. Depending arms 439 on said bars are provided for moving the same rearwardly to unlocking or key releasing position, all as disclosed in Patent No. 1,935,858 supra. The key locking bars 440 are moved rearwardly to unlocking position by mechanism described and shown in my Patent No. 2,143,741, dated January 10, 1939.

A key-locking bail 322, (Figs. 20 and 24), extends transversely of the machine behind and closely adjacent the depending arms 439 of the key-locking bars 440 for co-action therewith. The key-locking bail 322 is journaled by spaced brackets 321, 323 and 334 on a correction shaft 310, for rocking movement towards and from the depending arms 439, and when rocked toward the depending arms it prevents the key-locking bars 440 from releasing the keys.

The key-locking bail 322 and the correction shaft 310 form component parts of motor control, and correction mechanisms, respectively, and will be described in detail in connection with these mechanisms.

THE CARRIAGE

The carriage B is of the usual well known type mounted for denominational movement on a rear guide rail 281 (Fig. 2) upon which it is tiltable for access to subjacent mechanism.

THE DIVIDEND REGISTERING MEANS

Figure 45:
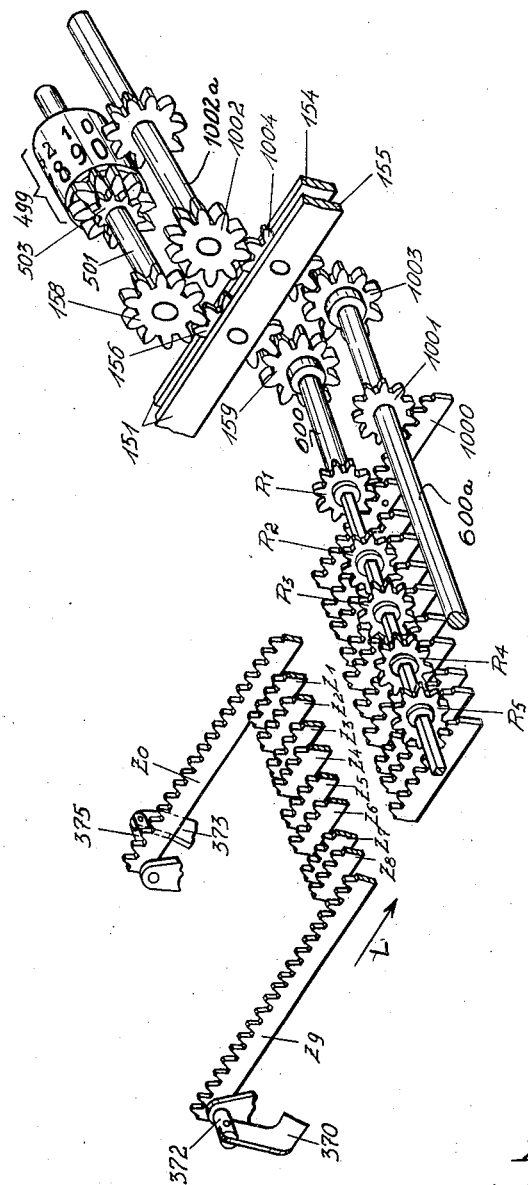
Fig. 45 is a perspective view of the mechanism for entering the "fugitive one."

The main accumulator A, on which the dividend is entered, in the performance of division operations, comprises the usual denominational value wheels 499, (Figs. 28, 29 and 45), there being sixteen in this instance, each provided with front and rear series 499R, 499M (Fig. 28), respectively, of symbols "0" to "9," one series being complemental to the other. As will be understood, the front series 499R is for use in adding operations and the rear series 499M for subtracting operations. The value wheels 499 are fast upon value wheel shafts 501 suitably journaled in the carriage B to extend forwardly thereof and having fast on their front ends driving gears 158 and transfer conditioning cam members 507a.

The transfer mechanism comprises transfer slides 139 (Fig. 28) operated by transfer cams 137 on a transfer shaft 19 to turn the transfer gears 503, and conditioned for transfer operations by transfer conditioning slides 508 shiftably mounted in the front bar 138 of the carriage. The transfer conditioning slides 508 are set by coacting lugs 506, 507 on the conditioning cam members 507a and slides 508, respectively. Coacting with said conditioning slides 508 is a locking flap 257 pivoted at 257b, and tensioned by a spring 257a for movement counter-clockwise, (Fig. 28) to unlocking position. The flap 257 is normally held in locking position by a lever 255 pivoted at 254 and a tappet 251 on the shaft 19 coacting with a lug 253 on said lever 255. The above type of transfer mechanism is fully disclosed in Patent No. 1,935,858 supra to which attention is invited.

See also U. S. patents to Pott, 2,143,741, dated January 10, 1939, and 2,173,635, issued September 19, 1939, and dating back to April 26, 1933.

VALUE SETTING UP MECHANISM

Figure 38:
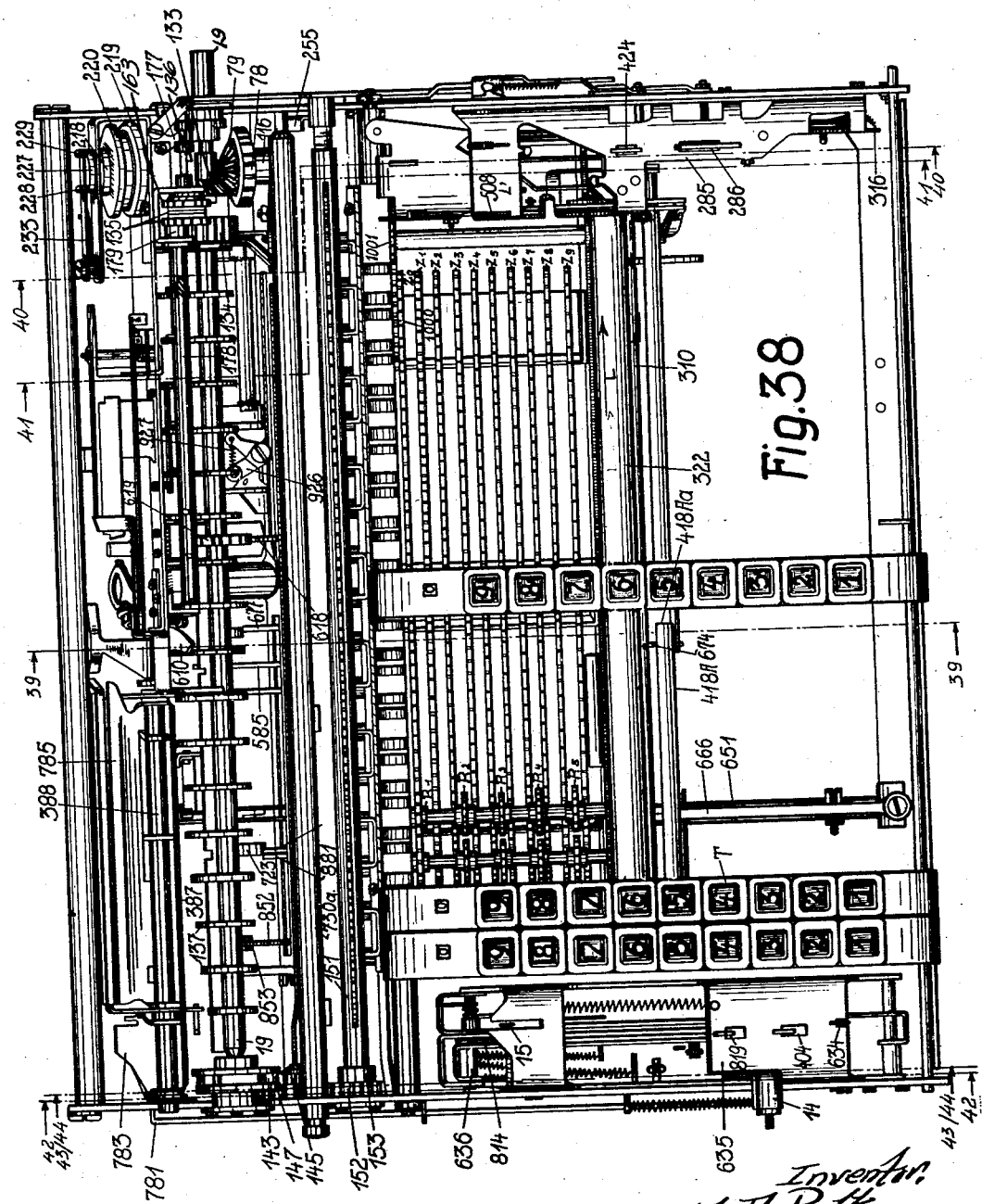
Fig. 38 is a view in top plan of the machine with parts eliminated for the sake of clearness.

The value setting up mechanism is also disclosed in Patent No. 1,935,858. For present purposes, it is sufficient to explain that the value keys T shift into different set positions value selecting gears R1 to R5 (Figs. 38, 39), slidably mounted in denominational series upon rotatable shafts 600 journaled in a sub-frame, the shafts 600 extending longitudinally of the machine and on which shafts said gears are splined. The shafts 600 are provided with driving gears 159, fast on the rear ends thereof for transmitting the values set up on the keyboard, to the main accumulator wheels A by way of the gears 158, (Fig. 28), of the latter and through coupling gears 156 presently described.

DIFFERENTIAL MECHANISM

The differential mechanism is fully described in Patent No. 1,011,617. Suffice it to explain herein that said mechanism comprises a series of ten differential actuators Z0 to Z9 (Figs. 38 and 39) in the form of reciprocating racks extending transversely of the machine and with which said value selecting gears R1 to R5 mesh, in different set positions thereof, the actuators being movable on their forward stroke in different degree, under different conditioning, to rotate said selecting gears in addition and subtraction in accordance with the actual and complemental values of the keys, respectively. The conditioning or state control is effected by anchoring the Z0 and Z9 actuators in addition and subtraction, respectively. A pair of sliding bolts 372, 375 (Fig. 20) mounted in suitable guides and projectible into recesses 367g in the Z0 and Z9 actuators, respectively, anchor the latter. The bolts 372, 375 are operated by actuator conditioning, or state control mechanism, to be described.

ADD AND SUBTRACT STATE CONTROL FOR DIFFERENTIAL ACTUATORS

Figure 40:
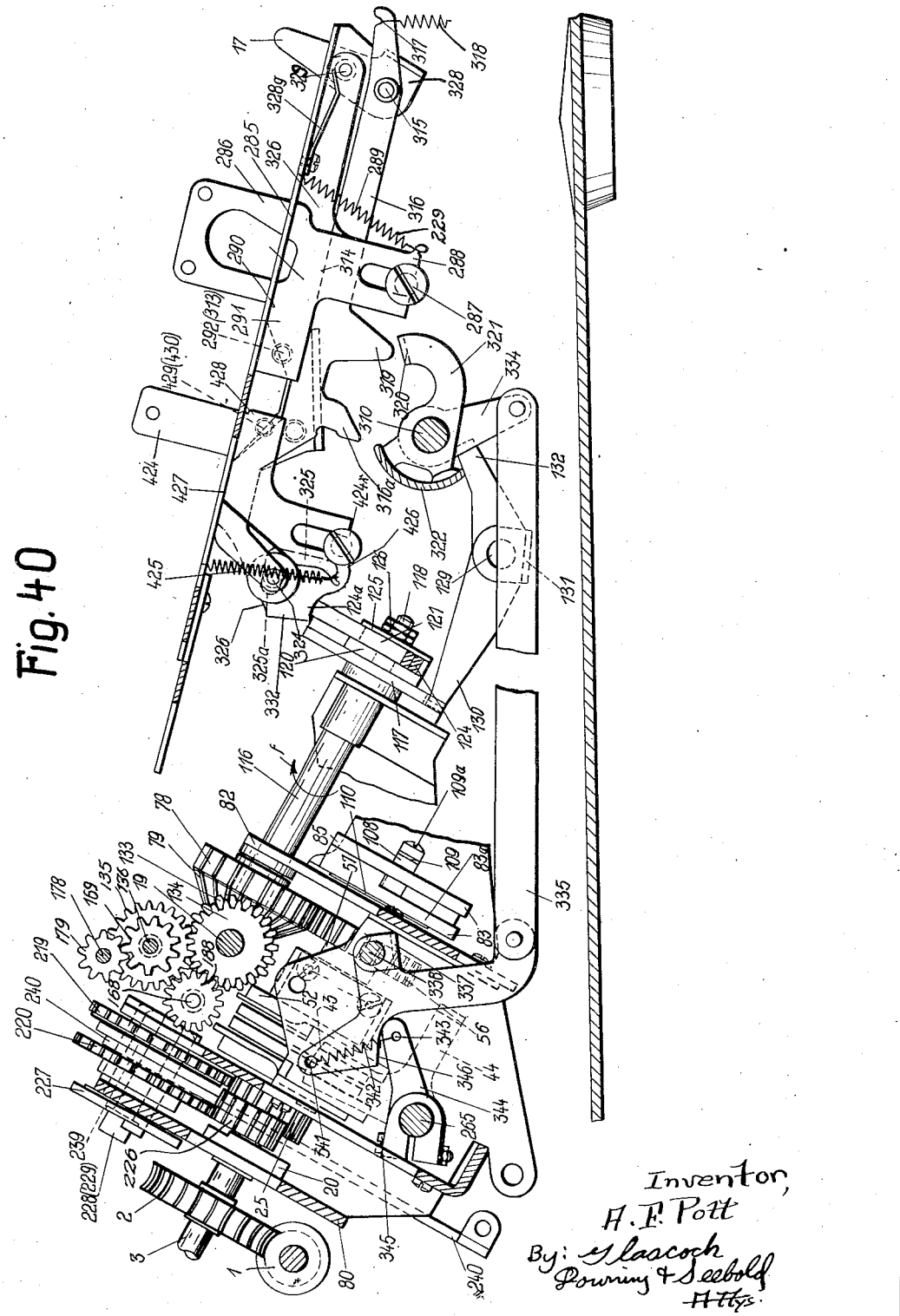
Fig. 40 is a similar section taken on the line 40—40 of Fig. 38 looking in the direction indicated by the arrows.
Figure 41:
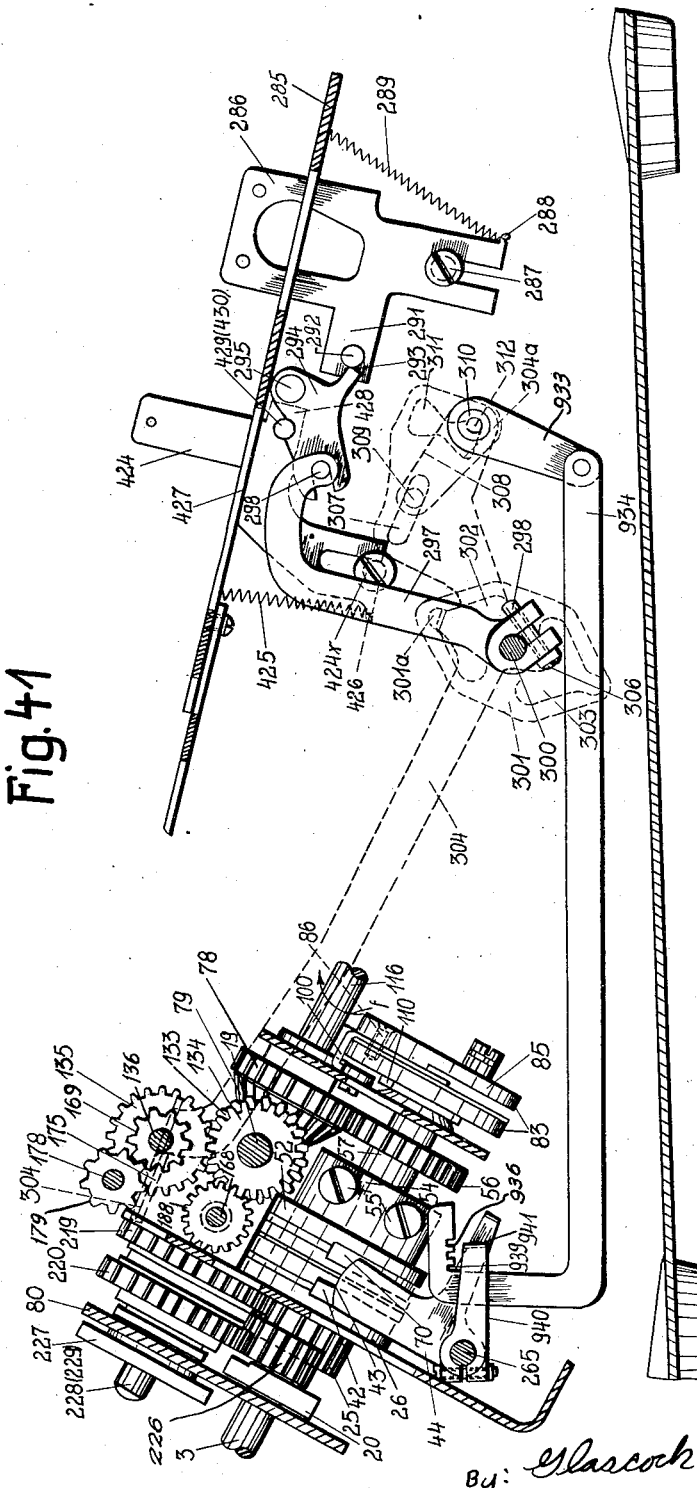
Fig. 41 is another similar section taken on the line 41—41 of Fig. 38 looking in the direction indicated by the arrows.

The addition key 4 comprises a forked vertical slide 286 (Figs. 20, 40, 41) depressible in a guide plate 285 against the tension of a spring 289 connected thereto at 288 and to a fixed part of the machine. The slide 286 is guided by a fixed stud 287 and has a rearwardly extending arm 291, the upper edge 290 of which engages said plate 285 and limits upward movement of said slide.

Adjacent the arm 291 is a rocker 294 pivoted intermediate its ends on a transverse shaft 295, and having a bifurcated end operatively connected, by the stud 298, to a crank arm 297 fast on a transverse state control rock shaft 300. A pin 292 on the key slide 286 overlies the forward end 293 of said rocker 294 whereby upon depression of the addition key 4, said shaft 300 may be rocked in one direction, that is to say, clockwise as viewed in Fig. 20. Fixed to said shaft 300, at 365, is another crank arm 366 operatively connected to a yoke 369 intermediate the ends 373, 370 of the latter, by a pin 368 playing in a compensating slot in said yoke. The ends 373, 370 of said yoke 369 are operatively connected to said bolts 375 and 372, respectively, at 374 and 371. The shaft 300, crank arm 366 and yoke 369 are normally yieldingly positioned so that the bolt 375 anchors the Z0 actuator to condition the actuators for addition, and so that said shaft 300 is rocked in the clockwise direction above specified. This is effected through the medium of a rearwardly extending state control bar 376 urged forwardly by a draft spring 859 (Figs. 23 and 42) connected to the toe 856 of the arm 854 of a state control bail 851 having a pin and slot connection 855, 380 with the state control bar 376. The state control bar 376 and the state control bail 851 are resiliently linked to each other by a tension spring 857 (Figs. 23 and 42) connected to said bar, at 387g, and to a state control bail 851. Said bar 376 and bail 851 will be subsequently referred to in detail in connection with division operations.

Figure 23:
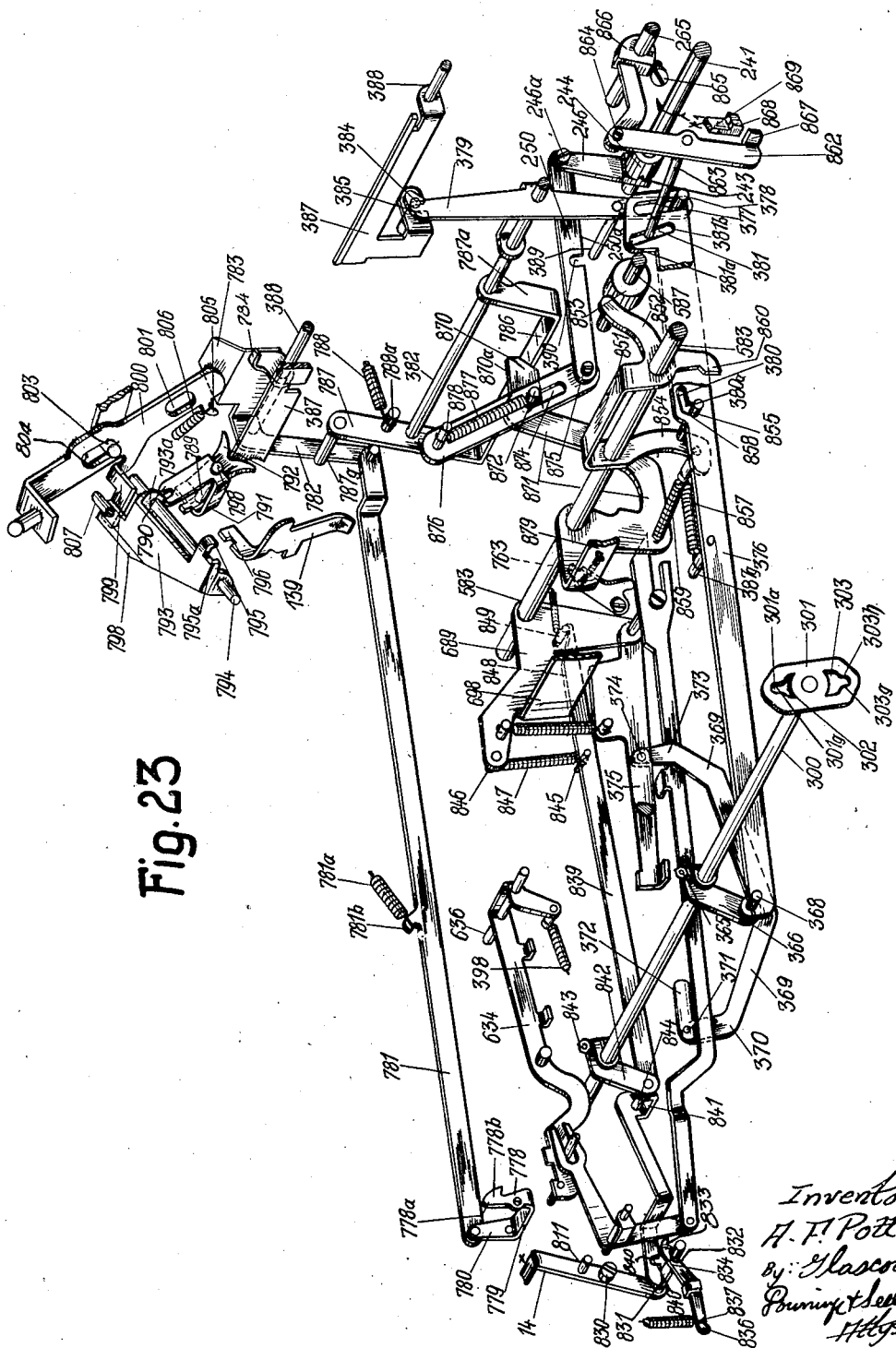
Fig. 23 is a detail view in perspective of the multiplication key lever, mechanism for changing from positive to negative computing and vice versa, and parts effected by operation of said key and lever.

The subtract key 5 (Figs. 20 and 40) is mounted on a bifurcated key slide 424 depressible in the guide plate 285 and guided by a stud 424x. A spring 425 connected to said slide, at 426, and to a fixed part of the machine, tensions said slide against depression, and a shoulder 427 on said slide engaging said plate 285 limits upward movement thereof. A forwardly projecting arm 428 of said slide 424 carries a lateral pin 429 overlying the rearward end of the rocker 294, whereby depression of said subtraction key 5 rocks the state control shaft 300 in counter-clockwise direction opposite to that in which it may be rocked by the addition key 4 and against the tension of the spring 859 (Fig. 23). Rocking of said shaft 300 in said opposite direction operates said yoke 369 to withdraw the bolt 375 from the actuator Z0 and project the bolt 372 into actuator Z9, thereby conditioning the differential actuators Z0 to Z9 for subtraction. The state control shaft 300 is automatically rocked in division and multiplication operations by mechanism which will be referred to in connection with descriptions of such operations.

THE QUOTIENT REGISTER

The revolution counter or quotient register RC (Figs. 15 to 18, 29, 30 to 32) comprises the usual value wheels 211 journaled for step by step rotation on the eight right-hand value wheel shafts 501 of the main accumulator A, in the rear of the value wheels 499, and bearing the peripheral series of symbols "0" to "9". In the fragmentary showing of Fig. 17 four of the counter wheels 211 are shown.

A drive shaft 178 for the revolution counter or quotient register extends transversely of the machine beneath and parallel with the carriage, such drive shaft being mounted, by trunnions 180 (Fig. 15), in fixed bearings (not shown) in the machine frame. The shaft 178 is yieldingly held in normal position at a predetermined point in its rotation, by means of an overthrow lock comprising a bolt 181 guided in fixed brackets 184 and 186, for movement into and out of a notch 187 in said shaft. A tension spring 182 coiled around said bolt between a boss 183 thereon and an ear 185 on said bracket 184 urges said bolt into the notch 187. Below said right-hand shafts 501, and freely rotatable upon the subjacent short shafts 497 journaled in the carriage parallel to the shafts 501, are sleeves 213.

Fast on the front end of each of said sleeves 213 is a spur gear 210, and similarly secured to the rear end of each of said sleeves 213 is a pinion, 212. The series of spur gears 210 is driven by said shaft 178 as presently explained. The pinions 212, are meshed with similar pinions 214 fast with the revolution counter wheels 211.

A toothed transfer gear 216 is fast with each revolution counter wheel 211, the transfer gears on adjacent wheels being relatively offset. Each of the pinions 212 on the shafts 497 arranged in a plane beneath the shafts 501 on which the revolution counter wheels 211 are journaled, is provided with a transfer tooth 217, which transfer tooth 217 at each complete rotation of their respective shafts 497, engage the gears 216 of next higher denomination, and advance such gears a half step, preparatory to adding "1" on their revolution counter wheels.

The free ends of spring-pressed detents 215, (Fig. 30), pivoted on the carriage tend to retain the pinions 212, and consequently the revolution counter wheels 211, against overthrow or accidental rotation.

The drive shaft 178 functions in the capacity of a transfer shaft, as follows: Equidistantly spaced lengthwise of said shaft 178 and fixed thereon are transverse rib-like teeth 191, 191a to 191j, arranged as shown diagrammatically in Fig. 16 and which coact with the series of spur gears 210.

At the opposite ends of the extreme right-hand tooth 191, and movable in said shaft 178 is a pair of counter wheel actuating members 192, 193 respectively, angularly related to said member 191.

Since the members 192, 193 are identical a description of one will suffice for both.

Referring to Fig. 18, the member 193 comprises a cylindrical shank 194, and a right-angularly related end blade 196, said member being mounted in said shaft 178 for radial movement therein, a transverse bore 195 in said shaft, receiving said shank, and a groove 198 in said shaft receiving said blade. The blade 196 is angularly related to the tooth 191 at the front end thereof, its length is approximately twice the width of the tooth 191, and a notch 197 is formed centrally in the outer edge of said blade all for a purpose presently clear. The blade end 196 of member 193 is projected outwardly of the shaft 178 by a spring-pressed, right angled key 204 countersunk in a right angled groove 206, 207 in said shaft, said key 204 having limited radial movement therein and having a free end 208 engaging a notch 209 in shank 194. A coil spring 202 contained in a transverse bore 200 in said shaft 178 and connected to the shaft 178, as at 201, and to a notch 203 in the key 204, urges said key in the proper direction. The members 192, 193 are provided with inclined edges 199, 191s respectively, adapted, upon single revolutions of shaft 178 in opposite directions, to cam the appropriate spur gear 210 one step in opposite directions, respectively, in addition and subtraction. The shaft 178 normally rotates in the direction indicated by the arrow g to turn the spur gears 210 in the direction indicated by the arrow h (Fig. 15) and the counter wheels in the direction of the arrow i (Fig. 17) for addition.

The transfer teeth 191a to 191d and 191h to 191j are provided with inclined ends 191aA to 191jA for camming the spur gears in addition. Similarly said teeth 191a to 191d and 191e to 191g are provided with inclined ends 191aS to 191gS for use in subtraction.

Endwise travel of the carriage B is possible in the normal position of the counter driving shaft 178 only. In this position of said shaft 178 the spur gears 210 mounted on the carriage are free to travel in a path indicated by the lines X1 (in Fig. 16) unimpeded by any of the transfer teeth 191 to 191j.

OPERATION OF QUOTIENT REGISTER

The carriage B being in its extreme left hand position, and addition being performed, upon a single revolution of the counter driving shaft 178, the blade 196 of member 193 coacts with, for instance, the tooth 210x (Fig. 15) of spur gear 210 of the units place and thereby rotates said gear in the direction of arrow h and the related revolution counter wheel 211 one step additively. At this point tooth 191 interlocks with said gear and holds the same against rotation. At the end of the revolution of said shaft 178 the subtraction counter wheel actuating member 192 is pressed back into the shaft 178 by the succeeding tooth 210y which engages the notch 192a in said member 192. If the revolution counter wheel 211 of the units place during this step of movement, passes from "9" to "0," the transfer lug 217 carried by the pinion 212 rotates the next higher transfer wheel 216 and its revolution counter wheel 211 through a half step of movement.

In this half step position the counter wheel 211 of the tens place is held by the tensioned dog 215 (Fig. 30) of its related pinion 212. In the consequent half step rotation of the spur gear 210 (Fig. 15) and its wheel 211 of the tens place, the succeeding tooth thereof moves into the path of rotation of the end 191aA of transfer tooth 191a whereby the revolution counter wheel 211 is rotated another half step and the transfer operation completed. The transfer operation to each higher denomination is effected in the same manner.

In subtraction, the operation is substantially the same, the subtraction counter wheel actuating member 192 being active instead of the addition member 193.

Driving mechanism

Figure 20:
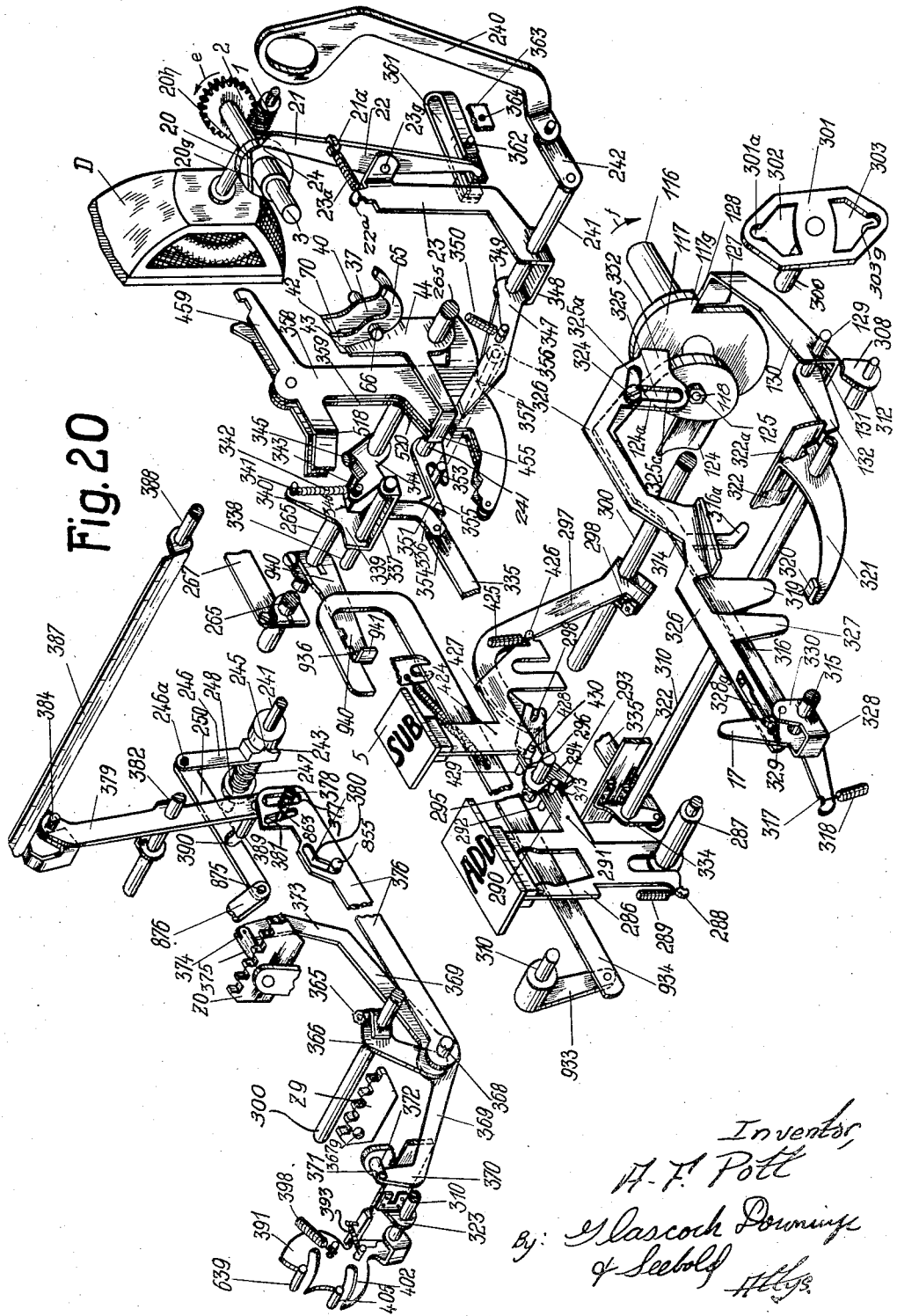
Fig. 20 is a view in perspective of the mechanism controlled by the "Add" key and the "Subtract" key, including the motor contacts and motor.

The motor D is operatively connected to a main drive shaft 3 by a worm 1 and a worm gear 2 (Figs. 3, 40, 20) to rotate said shaft in the direction of arrow e, Fig. 20. On the main drive shaft 3 are three clutches of the single revolution trip type to wit, a carriage shift clutch 26, an actuator clutch 52 and a resetting clutch 83. The driven member of the carriage shift clutch 26 (Figs. 3, 4, 5, 11, 20, 40, 41) comprises a circular disk 29 to which an annular housing member 33 is fastened in spaced relation by screws 30, at the points 31 and 32, and is rotatably mounted on the drive shaft 3 adjacent one end of a ratchet 27 fixed on said shaft, the annular housing member 33 receiving an end of said ratchet. Intermediate the members 29 and 33 is a clutch pawl 37 pivoted to said members by a pin 38 and adapted to engage a beak 46 thereon with a tooth 47 of said ratchet. A tension spring 41 fixed to said pawl at 39, and to said members 29 and 33 by pin 40, urges said pawl 37 into engaging position. The member 29 is provided with a peripheral comb or retaining rib 45 extending substantially half way around the disk member 29. A carriage driving gear 25 presently specifically referred to is fast on the outer face of the disk 29. A locking dog 50 pivoted on a shaft 51 coacts with peripheral notches 48, 49 in the member 29 and 33 to yieldingly hold the member 29 and 33 against rotation with the main drive shaft 3. A spring 50b secured to said dog, as at 50a and to a bar 50c, urges said dog 50 in the proper direction.

The actuator clutch 52 (Figs. 3, 4, 5, 11, 20, 40, 41) is substantially identical with the carriage shift clutch 26. The driven housing members 52a, 58 are secured together, by screws 59 and 60 and screw holes 61, 61a, and are rotatable upon shaft 3 adjacent the other end of ratchet 27, the member 58 having a bore 62 receiving said end of said ratchet 27. The clutch pawl 65 is pivoted on said members 52a, 58 at 66, and tensioned by a spring 69 secured to said pawl, as at 71, and to a pin 68 on said members, whereby a beak 67 on said pawl may engage with the same broad tooth 47 of the ratchet 27 above mentioned. Also, the periphery of the disk 52a of the actuator clutch pawl housing 52a, 58 is provided with peripheral notches 72, 73, with which a locking dog 74 coacts for the same purpose as in the case of carriage shift clutch 26, the dog 74 being likewise mounted on shaft 51 and tensioned by a spring 76 secured to said dog, as at 77, and to the aforesaid bar 50c. Clamping lugs 54 on member 52a, and clamping screws 55, secure said member to the hub 57 of an actuator driving gear 56. The member 52a is provided with a peripheral comb 52x for a purpose presently explained.

The carriage shift clutch 26 and the actuator clutch 52 are normally disengaged by means of a clutch tripping dog 44 fast on a transverse clutch control shaft 265 and normally occupying an intermediate position in which the upper transversely extending edge 43 of the clutch tripping dog is interposed in the paths of both the tails 42 and 70 of the clutch pawls 37 and 65, respectively, to trip said pawls to clutch-disengaging position. The clutch control shaft 265 is mounted for rocking movement in opposite directions to swing said dog 44 out of carriage shift clutch and actuator clutch tripping positions, respectively, or, in other words, into carriage shift clutch and actuator clutch engaging positions, respectively. Several control means for rocking the clutch control shaft 265 will be described under succeeding headings. The before mentioned combs 45 and 52x engage opposite sides of the clutch tripping dog 44, respectively, upon rotation of either clutch 26 or 52 from normal position, and thereby each prevents movement of said dog 44 to clutch disengaging position until the engaged clutch has substantially completed its revolution. The clearing or resetting clutch 83 (Figs. 3, 4, 5, 11, 19, 40, 41) comprises housing members 83a and 85, bored, as at 88, and secured together by screws 86, and screw holes 87, and mounted upon shaft 3 for rotation thereon at opposite sides of a ratchet 84 fixed to said shaft and having a tooth 102. The clutch pawl 89 is pivotally mounted between said members 83a, 85 by a pin 90 and pin sockets, as at 91, 92, formed in said members. A spring 95 suitably connected as at 93, 94 urges said pawl 89 in the proper direction to engage a beak 101 thereon with the tooth 102. A locking dog 104 cooperates with notches 103, 107 in member 83a, as in the case of clutches 26 and 52. A spring 105 connected to said locking dog at 106, and to the bar 50c tensions said dog for cooperation with said notches 103 and 107.

The member 85 is operatively connected to clearing or zero setting mechanism for the main accumulator or dividend registering means A and for the quotient register RC, all as described in succeeding discussions of said mechanisms.

The clutch pawl 89 is normally tripped and clutch 83 disengaged by a clutch tripping dog 100 (Figs. 11 and 19) pivoted at 99 on a fixed part 82 and having a beak 97 coacting with a tail 96 on said pawl. The dog 100 is urged into clutch tripping position by a spring 100a, (Fig. 19), suitably connected to said dog and to fixed pin 100c. A stop arm 100f depending from an operating arm 100b projecting at right angles from the dog 100, contacts the fixed part 82 to arrest movement of said dog 100 under the urge of spring 100a. The operating arm 100b of the dog, by which it is swung out of clutch-disengaging position to free the clearing clutch for operation overlies a pair of off-set arms 453, 454, and 518, 519 projecting from control levers 358, 359 (Fig. 19), respectively. Depression of the accumulator resetting key 7 or of the quotient register (revolution counter) clearing key 8 operates its connected control lever 358, or 359 and the appropriate off-set arm 453, 454, or 518, 519 to rock the clearing clutch dog 100 to clutch-releasing position.

Associated with the resetting clutch 83, is a bell crank locking dog 112, (Fig. 11), pivoted at 111 to a fixed part of the machine and tensioned by a suitable spring 115 connected thereto at 113. The tail 112b, (Figs. 11 and 19), of the locking dog 112 extends laterally of the machine to lie over the cams 358a, 359h on the forwardly projecting feet of said clearing or resetting control levers 358, 359. A cam 110 on housing member 83a of the clutch 83 coacts with the vertical arm 112a of said dog 112 to displace said dog 112 relatively to said cams 358a, 359h (Fig. 19) of the levers 358, 359, when the clutch 83 has completed substantially half a revolution. The action and the purpose of the parts before described is more fully explained under the chapters resetting or zero setting mechanism for dividend registering means, and resetting or zero setting mechanism for quotient register in my co-pending application Serial No. 310,080, which matured in Patent No. 2,382,661, issued September 14, 1945, as a continuation of my original application Serial No. 704,354, filed December 28, 1933.

CARRIAGE SHIFT DRIVE

Returning to the carriage shift clutch 26, (Fig. 3), it will be recalled that the driven member 33 of this clutch has a wide gear 25 fast therewith. This wide gear is connected with a carriage reverse gearing (Figs. 12, 13, 40, 41), comprising a rotatably mounted bushing 218, a pair of right and left hand driving gears 219, 220, respectively, rotatable on said bushing 218, the gear 219 meshing with gear 25, an intermediate idler gear 226 between gear 220 and gear 25, and a draw key 225 sliding in said bushing 218. The draw key 225 is settable in the bushing 218 to couple either gear 219 or 220 to said bushing by means of a lug 224 thereon, sliding in a keyway 221 and 222, 223 in said gears, respectively. The bushing 218 drives the carriage B by means of the usual pin gear 227, pins 228, 229 thereon cooperating with spaces 230 in a carriage feed rack 231 (Fig. 30). The usual detent bar 233, pivoted at 234 and tensioned by a spring 232, cooperates with the pins 228, 229 of said pin gear to hold the same in normal position.

The draw key 225 is set under control of the carriage B as follows: A vertically disposed draw-key setting lever 238 (Fig. 14), comprising an upper laterally extending arm 238a, and a lower operating arm 259 bearing an angular relation to the upper arm 238a, is pivotally mounted on a fixed part of the machine (Fig. 14), at points 236, 237 to swing about a vertical axis. The upper arm 238a of the draw-key setting lever 238 is forked, as at 235, Fig. 12, to embrace a groove in the outer end of the draw-key 225. At the back of the machine is a pendent lever operating yoke 261, pivoted at its upper end at the point 263, and operatively connected to said setting lever 238 by a link 260 pivoted to the lower end of the yoke at 262, and to the setting lever arm 259 at 259a. Alongside the yoke 261, is a vertically extending yoke operating lever 274 pivoted at its lower end to the machine frame at 276. Intermediate their ends, the yoke-operating lever 274 and its yoke 261 are connected by a link 273 and a tension spring 283, the link being pivoted to the yoke at 272a, and having a pin and slot connection 275 to said lever, and the spring being connected to said yoke at the pivot 272a and to a pin 284 on said lever 274. The arrangement of the yoke operating lever 274, yoke 261 and connections therebetween is such that movement of the former in opposite directions will urge said yoke and the setting lever 238 to set the draw-key 225 in positions to couple the bushing 218 to the right and left drive gears 219, 220, respectively. A spring 277 suitably connected to the lever 274 urges the parts in a direction to effect left hand drive of the carriage B. Cooperating stops 279, 280 on the link 260 and a fixed part of the machine respectively, limit movement of the parts under the urge of said spring 277. A tappet 282 on the rear of the carriage B, which tappet slides on the rear carriage rail 281, engages said lever 274 in the left hand position of said carriage to reverse the direction of the drive. Normally the tappet 282 bears against said lever 274 and the draw-key 225 is set for right hand drive of the carriage B. A locking finger 267 fast on the clutch control shaft 265, projects into said yoke 261 and normally lies adjacent to a stop face 268 on said yoke. The locking finger 267 coacts with notches 270, 271 and an intermediate tongue 269 of said yoke under conditions appearing as the description proceeds. The link 273 and spring 283 provide a yielding safety connection between the lever 274 and yoke 261 in the left hand position of the carriage B for the purpose of preventing breakage of the parts.

ACCUMULATOR OR DIVIDEND REGISTERING MEANS

The gear 56 on the driven member 52a of the actuator clutch 52 drives a gear pinion 78 and bevel gear 79, (Figs. 3, 4, 6, 20, 40, 41) fast on a jack shaft 116 rotating in the direction of arrow f, the bevel gear 79 meshing with a similar gear 133 fast on a carry-actuating or transfer shaft 19. Intermediate the driving gears 158, (Figs. 6, 7 and 28), of counter wheel shafts 501 and the value transmitting gears 159 is a series of coupling gears 156 rotatably mounted on spaced studs 157 extending between the parallel spaced sections 154, 155 of a transverse coupling shaft 151, one end of which is journaled in a part of the machine frame (not shown). The opposite end of the transversely extending coupling shaft is fixed at 153 to a gear 152.

Step by step rotary motion is imparted to the coupling shaft as follows:

A pin gear 140, (Figs. 6 and 7), fast on the carry or transfer actuating shaft 19 meshes with a Geneva gear 145 fast on a stub shaft 146 mounted in the frame.

A pinion 147 also fast on the stub shaft 146 meshes with an idler gear 149 fast on a second stub shaft 148 parallel with the stub shaft 146, the idler gear 149 being in mesh with the gear 152 of the coupling shaft 151.

The pin gear comprises two opposed sections 141, 142, (Fig. 7), two sets of pins 143, 143a therebetween, and two arcuate dwells 144, 144a intermediate said sets of pins, respectively. The Geneva gear comprises two pairs of concave tooth-like dwells designated 145a, 145b, in each pair, said pairs of dwells being diametrically opposed and cooperating with the dwells 144, 144a. The arrangement of the described drive between shafts 19 and 151 is such that said shaft 151 is intermittently rotated to mesh the coupling gears 156 with said gears 158 and 159 during the forward stroke of the actuators Z1 to Z9, or Z3 to Z9, as the case may be, and to disengage the same during the return stroke of said actuators.

The jack shaft 116 rotates in the directions of arrow f (Figs. 4 and 20), and drives said actuators through the medium of a crank disc 117 fast thereon, a pitman 124, and twist pin 118. The pitman is operatively connected to said actuators as disclosed in the previously noted Patent No. 1,011,617. The parts 119, 120, 121, 121a, 122, 123, 125, 126 are details of a ball bearing assembly which are unimportant to the present invention and, therefore, are merely identified in passing.

DRIVE TO THE REVOLUTION COUNTER OR QUOTIENT REGISTER

Fast on the transfer shaft 19 is a gear 134 rotating in the direction of arrow m, Fig. 6. Between said gear 134 and a gear 179, fast on the counter driving shaft 178, is a quotient register reverse gearing, as follows: Meshing with gear 179 (Figs. 3, 4, 9) is a gear 169 (Figs 8, 9, 10) fast on a bushing 160 rotatably mounted at one end by means of a hub part 173 journaled in a bearing, not shown, and supported at its other end in a manner presently seen. The bushing has mounted thereon a pair of independently rotatable forward and reverse driving gears 163, 135, respectively. Gear 135 meshes with gear 134. Between said gear 134 and gear 163 is a pair of integral gears 180 rotatable on the shaft 168 and meshing with said gear 134 and 163, respectively. The forward and reverse driving gears 163, 135 are alternately coupled to said bushing by a sliding draw-key 136 having a key lug 170 movable in a longitudinal keyway 171 in said bushing and settable to alternately couple said gears 163, 135 to the latter in addition and subtraction, respectively. The hub 164 of gear 163 and that of gear 135 are provided with keyways 165, 161, respectively, for coupling said gears to said key lug 170.

The draw key 136 is also settable to an intermediate position in which its key lug 170 is intermediate said gears 163, 135, in which setting, the quotient register RC is disabled. The outer end of the draw key 136 is rotatably mounted in a bearing 172, (Fig. 4) thereby supporting the other end of said bushing 160. In its intermediate setting, the key lug 170 of the draw key 136 engages in a key way in a disc 166 held stationary by engagement of a forked end 167, (dotted lines, Fig. 3), thereof with the shaft 168, whereby said draw key is prevented from rotating in the intermediate setting thereof.

ADD AND SUBTRACT STATE CONTROL FOR QUOTIENT REGISTER

The draw key 136 (Fig. 8) is settable through the medium of a bell crank shifter 175 engaging a groove 136a in said key. The shifter 175 is operated by a revolution counter state control bar 304 (Figs. 33 to 37). The counter state control bar 304 is settable into different positions to effect different settings of the draw key 136 by means of a duplex crank 301 fixed intermediate its ends on the state control shaft 300, and a crank 308 fast on the correction shaft 310. The duplex crank 301 comprises opposed triangular cam openings 302, 303 terminating at their apices in notches 301a, 303g, respectively, the former having a shoulder 301g and the latter having a shoulder 303h. The revolution counter state control bar 304 is vertically settable by means of a crank pin 309 in said crank 308, traversing a slot 307 in said bar, to engage opposed lugs 305 and 306 on said bar with the notches 301a or 303g, as the case may be, so that when the state control shaft 300 is rocked to condition the actuators Z0 to Z9 for addition or subtraction, the state control bar 304 will be shifted longitudinally to condition the quotient register, RC, as will be understood and as further described under succeeding headings. The state control bar 304 is also provided with an hour glass-shaped opening 311 therein forming opposed cam faces 304m, 304g and a notch 304a with which a stub shaft extension 312 of shaft 310 coacts upon rocking movement of the latter, to cam the revolution counter state control bar 304 into an intermediate revolution counter disabling position, all as subsequently described in detail.

MOTOR CONTROL

Swingably mounted on the transverse shaft 241 (Fig. 20) is a contact closing lever 348 having forwardly and rearwardly extending arms 347 and 23, respectively. Pivotally mounted intermediate its ends, as at 23g, on the arm 23 is a vertical contact control lever 22 swingable with said lever 348. The lower end of said control lever 22 bears against a resilient contact carrier 361 having a contact 362 thereon and the upper end 21 of said lever rides on a cam member 20 fast on the main drive shaft 3 and comprising an eccentric face 20h and a concentric surface 20g, which, at one point, is tangent to the eccentric face 20h. A spring 23a connected to said levers 22 and 23 at 21a and 22a, respectively, urges the lower end of the control lever 22 away from the contact carrier 361 and the upper end of the control lever 22 against the periphery 24 of said cam member 20. A spring 350 connected to the arm 347 at 349 yieldingly restrains the contact closing lever against movement from a normal position established by the contact of a roller 356, rotatably mounted upon a pin 353 fixed on said arm 347, with the lower edges of the respective feet of the clearing or resetting control levers 358, 359 previously mentioned and to be described. The arrangement of the described parts is such that when the contact closing lever 348 is moved from normal position the control lever 22 permits the contact carrier 361 to move the contact 362 thereon against a fixed contact 364 on a carrier 363 and thereby close a circuit (not shown) to the motor D.

On the arm 291 of the "Add" key slide 286 (Fig. 20) is a laterally extending stud 313 overlying an edge 314 of a vertically swingable and laterally movable lever 316 pivoted on a fixed stud 315 to extend rearwardly adjacent to the crank disc 117. A suitably arranged spring 318 connected to the lever at 317 yieldingly retains the edge 314 in contact with the stud 313. The "Sub" key slide 424 carries a stud 430 also overlying said edge 314 of lever 316. As will be clear, depression of either the "Add" key 4 or the "Sub" key 5 rocks the lever 316 downwardly. A depending lug 319 on the lever 316 overlies an offset lip 320 on the before mentioned operating lever 321 of the key locking bail 322 so that downward movement of lever 316 swings said bail into locking relation to the arms 439 (Fig. 24) of key locking bars 440. The lever 316 (Fig. 20) has a depending arm 316a thereon adapted to descend in front of the key locking bail 322 for cooperation with the upper edge 322a thereof in a manner presently explained.

The key locking bail 322 is operatively connected to the contact closing lever 348 so that upon movement of said bail into locking relation, said lever is swung from normal position and closing of the motor contacts 362, 364 is effected. The operating connections between said bail 322 and lever 348 comprise the following: Fast on a transverse shaft 338 (Fig. 20) is a vertically swinging rocker 337 having a depending cam arm 336 and an upright arm 339 terminating in an extension 340. A link 335 connects the arm 336 to the before mentioned bail bracket 334 so that swinging movement of key locking bail 322 swings the lever 337 from normal position. The cam arm 336 of said lever 337 during such movement thereof, coacts with a cam edge 355 of a beak 354 on a vertically rocking bifurcated lever 351, and thereby rocks the latter downwardly. The bifurcated lever 351 coacts with the pin 353 fixed an the arm 347 of said contact lever 348, to rock the latter from normal position. The rocker 337 is tensioned against movement from normal position by a spring 342 connected to the rocker 337 at 341 and to a stud 343 on a crank arm 344 fixed at 345 on the clutch control shaft 265. The spring 342 urges said crank arm 344 upwardly. Upward movement of the crank 344 is limited by contact of the stud 343 thereon with a stop edge 346 of the rocker 337, whereby the normal position of the clutch control shaft 265 and rocker 337 is established.

The lever 316 forms part of single and multiple cycle control mechanism conditioned by the repeat or single and multiple cycle control key 17 and as follows.

Alongside the lever 316 is a cycle control bar 326 vertically and laterally swingable on a yoke part 328, 329 of the cycle control key 17 pivoted on the before mentioned stud 315 for setting into front and rear positions indicated by the letters A and M on the cover plate C. A suitably arranged leaf spring 328g retains said bar and key in their different set positions. The cycle control bar 326 extends rearwardly to the crank disc 117 at which point it is provided with a tappet extension 332 and a slot 325 comprising right angularly related sections 325a, 325c, respectively. The lever 316, and bar 326 are adapted to be coupled together by a headed screw 324 on lever 316 passing through slot 325 in the bar 326. The arrangement of the slot 325 and screw 324 is such that, in the rear setting of key 17, said lever and bar are uncoupled, and lever 316 is freely movable vertically, so that if either the addition or subtraction keys 4 or 5 are held depressed the lever 316 is likewise depressed and the machine performs multiple cycles of operation. Under these conditions the bar 326 is held stationary by coaction of a lug 327 thereon with the fixed stop 287. On the other hand, in the forward setting of key 17, the lever 316 and bar 326 are coupled together whereby, on the down stroke thereof, the extension 332 is located in the path of revolution of a tappet cam 124a on crank disc 117. After one half revolution of said disc the tappet cam coacts with the tappet extension 332 and cams said lever 316, and bar 326 laterally, thereby moving lever 316 from under pin 313, whereupon said lever 316, and bar 326 return toward normal position under the urge of spring 318. Complete return of said connected lever and bar is blocked however by wiping engagement of the arm 316a of lever 316 with edge 322a of bail 322 which is held in key locking relation by an interlock between the disc 117 and said bail 322. The said interlock comprises the lever 131 pivoted intermediate its ends on shaft 129 and having a lever arm 132 extending beneath the lower edge of said bail, and a lever arm 130, an extension 128 of which is adapted to seat against a shoulder 117g formed in the periphery of the crank disc 117 in the full cycle position of said disc. When the disc 117 is out of full cycle position, the periphery of said disc and said extension coact to hold said lever 131 in a position blocking return of the key-locking bail 322. As soon as the described interlock is broken, the lever 316, and bar 326, return to their normal positions. The key locking bail 322 is returned to normal position by a spring 398 (Figs. 22, 20) connected to the multiplication key lever 634 (Fig. 21) and to a control lever 391 for the key-locking bail 322, said control lever being journaled on the correction shaft 310, said spring 398 being tensioned by movement of said bail out of normal position. The control lever 391 is part of the division mechanism to be described in detail.

MECHANISM FOR CHANGING OVER THE DIFFERENTIAL MECHANISM

The state control lever 14 is pivoted at a fixed point 830 to the machine frame for movement forwardly and rearwardly into negative and positive settings, respectively (Figs. 22, 23, 43, 44). A friction detent or latching dog 834 (Figs. 22, 43, 44) is pivoted, as at 843, for vertical movement to engage and to release a lateral detent stud 831 on the lower end of said lever. The dog is provided with a pair of front and rear detent notches 832, 833, respectively, engaged by said stud in the different settings of said state control lever, respectively. A suitably arranged spring 837 connected to said dog at 836 urges the latter against said stud.

Figure 43:
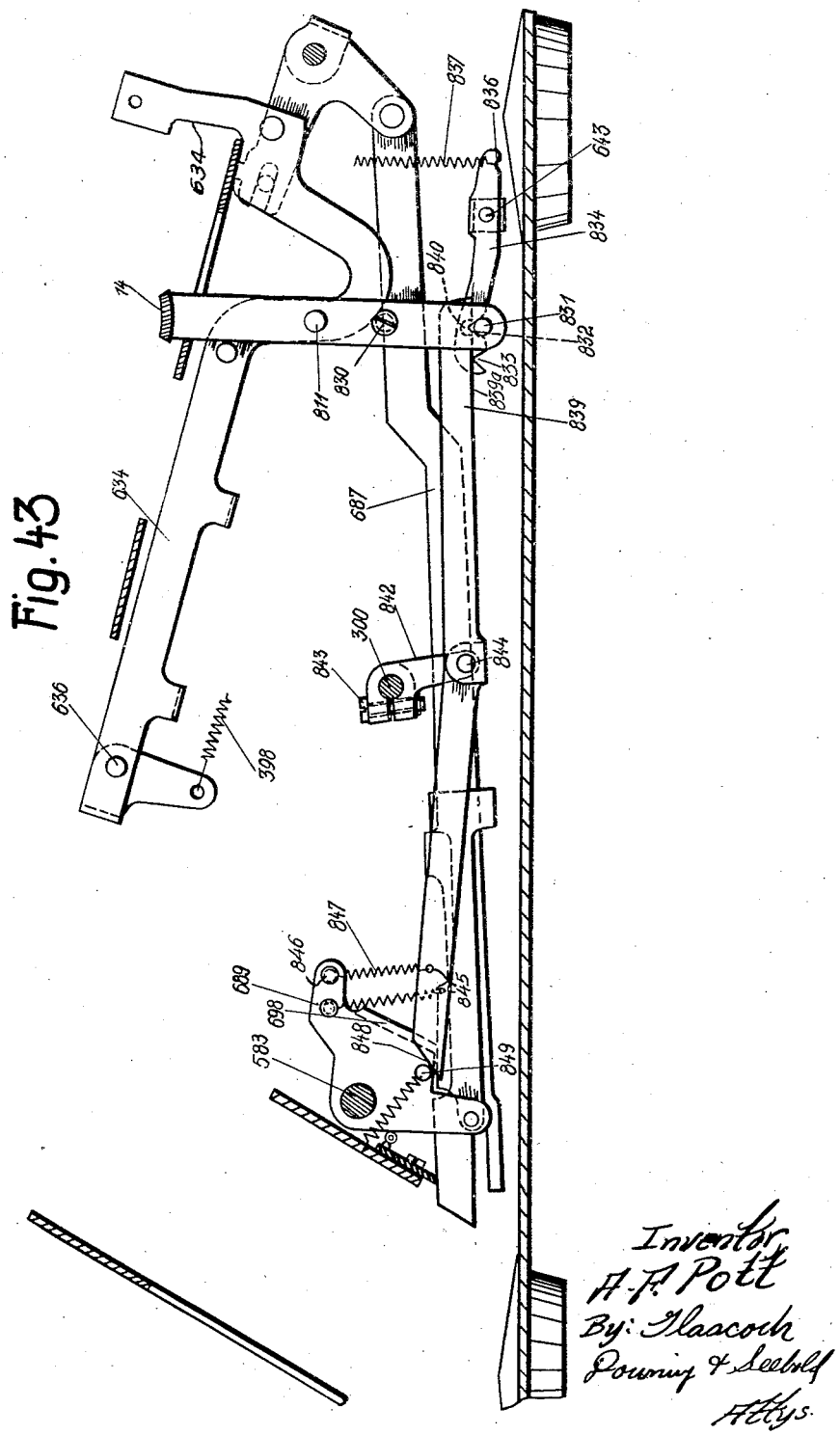
Fig. 43 is another similar section taken on the line 43—43 of Fig. 38 looking in the direction of the arrows and showing the multiplication key lever, and the lever for changing from positive to negative computing and related parts.
Figure 44:
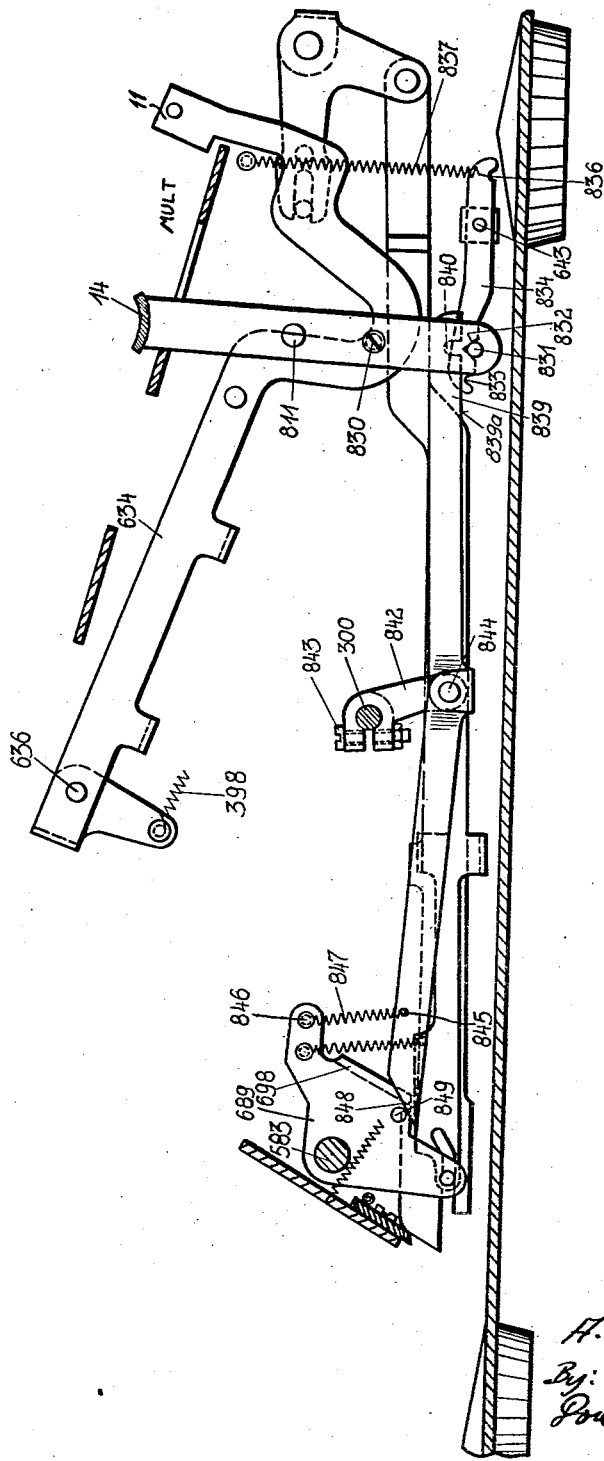
Fig. 44 is a view similar to Fig. 43 showing the position of the parts when the multiplication key is depressed.

Pivotally mounted intermediate its ends at 844 (Figs. 43 and 44) on a crank arm 842 fixed to the actuator state control shaft 300 at 843, is a vertically rocking connecting lever 839 the forwardly-projecting arm of which extends over the stud 831 of said state control lever 14. The connecting lever 839 has a notch 840 in its front end for coupling to said stud 831. The rearwardly extending arm of the connecting lever 839 is provided with an inclined cam end 848 underlying a stud 849 on a lever arm 689 of a bail 698. The rear end of the lever 839 is urged upwardly against the stud 849 by a spring 847 secured at its opposite ends to studs 845 and 846 on said lever 839 and bail lever arm 689, respectively. In the normal position of said bail 698 the front end of the lever 839 is held above the stud 831 in uncoupled position (Figs. 43 and 44).

DIVISION MECHANISM

The key lever 404 (Figs. 22 and 21) of the division key 12 is swingably mounted by a rear end yoke on the fulcrum rod 636. A tension spring 774 connected to a pin 772 on an arm 773 of said yoke and to a fixed pin (not shown) urges said division key lever upwardly against a supporting frame 635. In Fig. 22 for the sake of clearness, these parts have been shown separated from each other.

The division key lever (Figs. 22 and 21) 404 is operatively related to the before mentioned control lever 644, by a laterally projecting pin 405 in said key lever which pin, upon depression of the division key 12, traverses a cam slot 77 in the lever 644 to rock the lever and shift the control shaft 587 (Fig. 24) and the key releasing bail section 418a to the left in a manner and for a purpose to be explained. The division key is locked in depressed position by a U-shaped latch 779 swingably mounted on rod 643 and comprising a pair of arms 778 and 780, one of which is provided with a latch hook 778b having a cam edge 778a. The latch 779 is arranged to be swung forwardly by a pin 776 on the division key lever 404 coacting with the cam edge 778a formed on the bill of the hook, said latch being tensioned for rearward movement, as presently described, so that its hook 778b will snap over said pin 776 and lock said division key lever 404 depressed.

On the carriage B is an overdraft flap 793 (Figs. 23 and 42) mounted on a fixed shaft 794 for swinging movement counterclockwise by the transfer slide 139 of the highest denominational order of the accumulator, the overdraft flap also being shiftable axially of the shaft 794 and laterally of said carriage, into either of two positions. It will be recalled that the transfer slides 139 are conditioned for effective and ineffective movement vertically. In said positions of said flap 793 a pair of lugs 795, 795a are positioned relative to a notched arm 796 on said transfer slide of highest denomination, so that the slide in its different positions, is operatively related to the overdraft flap in a manner presently clear. The overdraft flap 793 is designed to depress a vertically movable overdraft thrust bar 800 slidably mounted on the carriage B by slots 801, 804 cooperating with studs 803 on the carriage. The operative connections between said flap 793 and thrust bar 800 comprise a flange 798 on the flap adapted to overlie an offset lip 799 on the thrust bar. A spring 806 connected to said thrust bar 800 at 805 and to a fixed part of the machine, urges the thrust bar 800 and flap 793 upwardly to normal position determined by a fixed stop 807 overlying said flap.

The overdraft flap 793 (Figs. 23 and 42) is set or adjusted by a conditioning bail 387, swingable on a horizontal fulcrum rod 388, the flap being operatively connected with a flap shifter 791 swingable on a fixed pivot 789 on the carriage B. The flap shifter 791 comprises upper and lower forked ends 790 and 792, respectively, the upper forked end straddling an ear 793a on flap 793, and the lower forked end similarly engaging said conditioning bail 387 for sliding movement along the same. The operating means for the conditioning bail 387 will presently be identified.

In the left hand position of the carriage B, the overdraft thrust bar 800 is located over an unlocking or key-release flap 783 swingable on the before mentioned fulcrum rod 388 and to which the rocker 779 for retaining the division key depressed is operatively connected by a link 781 pivoted at one end to the rocker arm 780 and at its other end to a depending arm 782 on the unlocking flap 783.

A tension spring 781a connected to the link 781 at 781b urges the rocker 779, link 781, and flap 783 into normal position established by engagement of the rear end of said link with a fixed part of the machine. Swingably mounted on the same fulcrum rod 388 with the key-release flap 783 is a clutch control flap 785 (Fig. 26) adapted to be traversed by the overdraft thrust bar 800 in the movement of the carriage B. The unlocking flap 783 is operatively related to the clutch control flap 785 by means of a lateral lug 784 on the unlocking flap overlying the adjacent arm of the clutch control flap 785. The flap 785 functions under control of the overdraft flap 793 and thrust bar 800 to effect rocking movement of the clutch control shaft 265 in a manner presently clear.

Mounted on the fulcrum rod 583 (Fig. 26) is a vertical swinging clutch control bail 879 comprising U-shaped side arms 881, 882, the side arm 881 terminating in a cam lug 870, and the side arm 882 terminating in a lateral lug 915. A spring 884 connected to said clutch control bail 879 at 883 and to a fixed part of the machine, yieldingly restrains said bail 879 against movement from normal position established in a manner hereinafter apparent. The clutch control bail 879 is rocked from normal position by the cam 723 fast on the cam controlled shaft 587 to effect disengagement of the actuator clutch 52 and engagement of the carriage shift clutch 26. To this end, the clutch control bail 879 is operatively related to the clutch control shaft 265 by a coupling link 907 pivoted by ears 908, 909 on said shaft 265 for vertical and lateral movement, and a shaft-operating crank 904 fixed at 903 on said shaft 265. The coupling lever 907 (Fig. 27), comprises a vertical lug 914 adapted to underlie the lug 915 of the clutch control bail 879, a lateral lug 906 adapted to overlie a vertical lug 905 on the crank 904, and a vertical curved arm 917 by which the coupling link 907 is movable into and out of coupling relation to the clutch control bail 879 by means to be described. A suitably arranged spring 910 connected to said coupling link 907 at 910a urges said link upwardly. Upward movement of said link 907 is limited by contact of a stop lug 913 thereon with a fixed part 912 of the machine. Cooperating with the clutch control bail 879 is a locking bail 786 (Fig. 23) vertically swingable on a fulcrum rod 382, and including arms 787, 787a. The locking bail 786 is adapted to be cammed rearwardly out of normal position by the cam end 870 of the clutch control bail arm 871, against the tension of a spring 788 connected to said locking bail at 778a, and to a fixed part of the machine. As the cam end 870 in its clockwise travel (Fig. 23) escapes below the locking bail 786, the spring 788 snaps the locking bail back to normal position over the cam end 870 of the clutch control bail 879 to hold the latter in the operative position into which it has been swung by the cam 723. A pin 787g on the locking bail arm 787 engaging the depending arm 782 of the key unlocking flap 783 arrests said locking bail 786 in normal position.

In the operative position of the clutch control bail 879 (Fig. 26) and the coupling position of coupling link 907, said coupling link is rocked downwardly by said bail 879 and the shaft-operating crank 904 correspondingly rocked by said link 907, whereby the clutch control shaft 265 is rocked counterclockwise, as viewed in Fig. 20, to effect engagement of the carriage shift clutch 26 and disengagement of the actuator clutch 52. The clutch control flap 785 (Fig. 26) is rocked downwardly by the overdraft slide 800 under control of the overdraft flap 793 to effect the disengagement of the actuator clutch 52 and the engagement of the carriage shift clutch 26, upon the occurrence of either of two events, as first, when, in the performance of division under a "subtract" conditioning of the machine, the capacity of the total wheel of highest order is not exceeded, and secondly, when, in the performance of division under an "add" conditioning of the machine, the capacity of the total wheel of highest order is exceeded.

The operating connections between the clutch control flap 785 and the clutch control shaft 265 include a crank arm 899 (Fig. 26) fast with, and depending from the clutch control flap 785. A laterally projecting pin 900 at the lower end of the crank arm projects into the forked end 898, of the upwardly projecting arm of a slide-operating lever 896 journaled on the clutch control shaft 265. The lower arm of the slide-operating lever 896 is slotted at 895 to accommodate a pin 894 projecting laterally from a coupling slide 892, which coupling slide itself is provided with a cam slot 891 loosely accommodating a supporting stud 890 projecting laterally from an offset 889 on a slide-setting rocker 887 journaled on the state control shaft 241. The slide-setting rocker 887 and its stud 890 not only support the coupling slide 892, but also shift the coupling slide longitudinally to render it effective or ineffective as a transmission coupling between the clutch control flap 785 and the clutch control shaft 265. The upper end of the coupling slide 892 is forked at 893 to embrace the clutch control shaft 265 for guidance, the lower end of the coupling slide having a laterally turned lug 901 shiftable vertically into and out of operative relation with a corresponding lug 902a on a laterally turned arm 902 projecting from the clutch control shaft-operating crank 904.

The transmission slide coupling 892 is held normally in its upper ineffective position relatively to the clutch control shaft-operating crank 904 by the following means. A forwardly projecting arm 888 of the slide-setting rocker 887 is forked to embrace a pin 885 projecting laterally from the adjacent arm 882 of the clutch-control bail 879. Consequently, when the cam 723 on the cam control shaft 587 rocks the clutch control bail clockwise (Fig. 26) against the tension of the bail-restoring spring 884, the slide-setting rocker 887 is rocked counter-clockwise to shift the coupling slide 892 downwardly and position its laterally turned lug 901 directly in front of the corresponding lug 902a of the arm 902 of the clutch control shaft-operating crank 904, which, at this time, has been rocked counter-clockwise by the cam 723 from its actuator clutch engaging position to its carriage shift clutch engaging position. The coupling slide 892 will thus lie in front of the lug 902a of the clutch control shaft operating crank arm 904 for the purpose of enabling the totalizer, through the overdraft mechanism, to control the actuator and carriage shift clutch mechanisms.

A vertically disposed bell crank 728X pivoted at 919 on a fixed part of the machine, is provided with a forked end 918 embracing the curved arm 917 of the coupling link 907, the opposite arm of the bell crank being slotted at 920 to accommodate a guide screw (not shown). A spring 729X attached to the bell crank 728X, normally holds the bell crank at its counter-clockwise limit of travel (Fig. 26) as determined by the slot 920 and its screw. In such position, the forked end 918 of the bell crank 728X holds the coupling link 907 to the right (Fig. 26) with the upward projection 914 of the coupling link beneath and in operative relation to the laterally projecting lip 915 on the rear end of the arm 882 of the clutch control bail 879.

Therefore, when the cam 723 rocks the clutch control bail 879 clockwise (Fig. 26), the lip 915 of the clutch control bail rocks the coupling link 907 to cause the similar laterally turned lip 906 of said coupling link overlying the projection 905 of the crank arm 904, to rock said crank arm and its clutch control shaft 265 from its extreme clockwise limit (Fig. 26) through its intermediate position to its extreme counter-clockwise limit of travel, to effect the disconnection of the actuator clutch and the engagement of the carriage shift clutch. It will be understood that the shaft-embracing fingers 908—909 of the coupling link 907 turn freely on the clutch control shaft 265.

The clutch control bail 879 by such clockwise rotation (Fig. 26), rocks the coupling slide-setting lever 887, which, through its pin 890, draws the coupling slide 892 downwardly to position, the coupling slide lug 901 in front of the offset 902, 902a of the clutch control shaft-operating crankarm 904.

The coupling link 907 retains the clutch control shaft-operating crank arm 904 at its counter-clockwise limit of travel with the carriage shift clutch 26 effective, such locking action being maintained by the latching of the arm 871 of the clutch control bail 879 beneath the locking bail 786 (Fig. 23).

The carriage shift clutch 26, through the reversible gearing 25, 219, 220, 226 (Figs. 3 and 12) rotates the carriage-driving disc 227 (Fig. 13) to shift the totalizer carriage step by step to the right. As the carriage enters its final step of travel to the right, a left-hand carriage stop 730 (Fig. 26) fast on the carriage rail 730a collides with the upper end 921 of the bell crank 728x, rocking the bell crank clockwise against the tension of its return spring 729x. As a result, the lower forked arm 918 of said bell crank embracing the curved arm 917 of the coupling link 907 interposed between the clutch control bail 879 and the clutch control shaft crank arm 904, shifts the coupling link to the left (Fig. 26) to disengage the projection 914 of said coupling link from beneath the laterally turned lug 915 of the clutch control bail, whereupon the coupling link spring 916 restores the coupling link 907 to its normal extreme clockwise position as determined by contact of the coupling link shoulder 913 with the fixed stop 912.

Thus, although the clutch control bail 879, its controlled coupling slide-setting rocker 887 and the coupling slide 892 remain in their operated positions, the clutch control bail has been deprived of its direct control of the clutch control shaft 265, to permit operation of the clutch control shaft 265 by the clutch control flap 785.

Pivoted at 810a (Fig. 22) on the division key lever 404 is a depending coupling 808 offset from said lever at 809 and having a projecting lug 812 adapted to contact a lateral lug 813 on a coupling lever 814 pivoted alongside said key lever 404 on the fulcrum rod 636.

The coupling 808 is slotted vertically, at 810, to receive a pin 811 projecting from the positive and negative lever 14. The coupling lever 814 is tensioned against downward movement by a spring 817 connected, at 816, to a depending arm 815 at the rear end of the coupling lever and to a similar arm 818 depending from a point intermediate the ends of a correction key lever 819 pivoted at its rear end on the fulcrum rod 636 (Fig. 22). The correction key lever 819 lies between the division key lever 404 and the coupling lever 814. The coupling 808 is designed to be swung into and out of coupling relation to the coupling lever 814 by movement of the positive and negative key 14. In positive division, the coupling is in coupled relation, whereby the coupling lever 814 is depressed with the division key lever 404.

The coupling lever 814 is operatively related to the correction shaft 310 by a pin 821 on said lever coacting with a cam arm 824 on said shaft 310 so that depression of the division key 12 rocks said shaft 310 clockwise, Fig. 22 in positive division for a purpose to be explained.

The division key lever 404 is also operatively related to the keyboard lock control lever 391 by the before mentioned pin 405 cooperating with a cam slot 403 in said keyboard lock control lever 391 so that, upon depression of the division key 12, said control lever 391 is rocked forwardly together with the key locking bail 322 to effect engagement of the actuator clutch 52 and the closing of the motor contacts 362, 364.

The differential actuators Z0 to Z9 are alternately conditioned for addition and subtraction by an eccentric drive comprising an eccentric 239 (Figs. 12, 14 and 23) on the carriage reverse gear 219, an eccentric rod 240, the annular head of which encircles the eccentric 239, the lower end of said eccentric rod being pivoted to a crank 242 on the transverse actuator state control shaft 241, a crank arm 246 on the state control shaft 241, and a reciprocating coupling link 250 connected at its opposite ends to said crank arm and to a floating link 876 at 246a and 875, respectively. The coupling link 250 is recessed at 390 to embrace a stud 389 projecting laterally from the lower arm of an over-draft conditioning lever 379 journaled on the fulcrum rod 382, the upper arm of which overdraft conditioning lever is pivotally connected at 384 to an arm 385 depending from the overdraft conditioning bail 387 rocking on the fulcrum rod 388.

Normally, the coupling link 250 for connecting the over-draft conditioning bail and the state control shaft 241 is disconnected from the stud 389 on the over-draft conditioning lever 379 to interrupt such connection. The crank arm 246 has a yieldable safety connection with said state control shaft 241 comprising a collar 244 fixed to said state control shaft 241, said collar having clutch teeth 245 frictionally engaging corresponding clutch teeth 243 on the hub of the crank arm 246. A spring 247 interposed between the hub of the crank and a fixed stop 248 on the shaft 241, yieldingly holds engaged the clutch-toothed faces of the collar and the hub. The floating link 876 is mounted on the lever arm 871 (Fig. 23), of the clutch control bail 879 by a slot 874 in said link embracing a pin 872 on said arm, a tension spring 877 being connected at its opposite ends to said pin 872 and to a pin 878 on said link, the arrangement being such that the coupling link 250 is yieldingly movable vertically by said bail 879 into and out of coupling relation with the over-draft conditioning lever 379 pivoted intermediate its ends to rock on shaft 382. In the coupling position of said link 250, a notch 390 therein embraces a pin 389 on the lower end of said lever 379. The upper end 385 of the overdraft conditioning lever 379 is pivoted at 384 to an arm on the before mentioned overdraft conditioning bail 387, whereby, as the eccentric 239, (Fig. 12), through its connection with the actuator state control shaft 241, oscillates such shaft, the coupling link 250, when coupled to the overdraft conditioning lever 379, rocks the overdraft conditioning bail 387.

The bail 387, in turn, rocks the flap-shifting lever 791 to shift the overdraft flap 793 axially along the supporting rod 794 relatively to the upper end of the carrying pawl 139 of highest denomination.

The purpose of this adjustment of the overdraft flap 793 relatively to its operating pawl 139 is to enable the pawl to rock the overdraft flap at such times as when performing division under a "Subtract" conditioning of the machine, the capacity of the total wheel of highest order is not exceeded, and also when, in performing division under an "Add" conditioning of the machine, the capacity of the totalizer wheel of highest order is exceeded. The overdraft conditioning lever 379 is designed to operate the before mentioned actuator state control bar 376, (Figs. 20, 23, 24 and 42), which, it will be remembered, is pivoted at 368 to the crank arm 366 on the state control shaft 300. The rear end of said state control bar 376 is connected to said overdraft conditioning lever 379 for vertical movement thereon by the pin 378 on said overdraft conditioning lever projecting through a vertical slot 377 in said state control bar.

The state control bar 376 is operatively connected to a latch 862, (Fig. 42), pivotally suspended at 864 from an arm 866 fast at 865 on the clutch control shaft 265. The operating connection takes the form of a vertically inclined cam slot 381 in said state control bar 376 coacting with a pin 863 on said latch 862, the arrangement being such that the latch 862 is carried forwardly and rearwardly, and upwardly and downwardly to locate a lug 867 thereon against the front or rear sides of a fixed stop 869 under different conditioning of the actuators, the downward and upward movement of said latch 862 rocking the clutch control shaft to control the drive, all as presently described in detail.

Associated with the state control bar 376 is an actuator conditioning or state control bail 851 vertically swingable upon the transverse fulcrum rod 583 and comprising depending arms 854, 860, (Figs. 23 and 42), and a rearwardly extending arm 852. A cam 853 on the cam control shaft 587 constantly engaged by the bail arm 852, swings said state control bail counterclockwise, Fig. 23, in a manner described under the heading "Operation in Division." The before mentioned spring 857 connected to the state control bar 376 at 387g, and to the bail arm 854, tensions said state control bail against movement relative to said state control bar 376 under the action of the cam 853 and, as previously explained, serves as a resilient link between the state control bail 851 and the state control bar 376. The spring 859 urges the state control bar forwardly to normally condition the actuators Z0 to Z9 for addition. The actuator conditioning or state control bail 851 is operatively connected to said control bar 376 by a lateral stud 855 on the bail arm 854 projecting into a cam slot 380 in said state control bar. The slot comprises a horizontal portion 380 and a front inclined part 380a, all for a purpose which will appear as the description proceeds.

With the machine at rest, the rocking clutch control shaft 265 (Fig. 23) occupies its intermediate position wherein the clutch blade or detent 44 lies in the paths of both clutch pawls 37 and 65 to render both the carriage shift clutch 26 and the actuator clutch 52 inactive.

In this normal position, the arm 866 projecting from the clutch control shaft 265 and supporting the depending latch 862 with its offset lug 867 is in its intermediate position to suspend the offset lug 867 at a point one step below, and slightly in advance of the front face of the fixed abutment 868, the laterally projecting pin 863 on the latch 862 lying about midway between the upper and lower ends of the inclined slot 381 in the rear end of the state control bar 376.

The spring 859 connected to the state control bail 851 maintains the arm 852 of the state control bail in contact with the state control cam 853 on the cam control shaft 587.

With the machine at rest, the low point of the cam 853 is contacted by the arm 852 of the state control bail, thus holding the state control bail at the limit of its rotation clockwise, Fig. 23, the lateral pin 855 of the state control bail resting against the end wall of the downwardly inclined arm 380a of the angular slot 380 in the state control bar 376 to hold the state control bar 376 at its forward limit of travel.

OPERATION IN DIVISION

As an example of division, let it be assumed that "390625" is to be divided by "625." The dividend "390625" is set up in the six left-hand rows of the section "Dt" of the keyboard and the divisor "625" in the three left hand rows of the section "Dr." The division key 12 (Fig. 22) is depressed, the negative and positive lever 14 having been previously swung rearwardly, because positive division is to be performed. This swinging of the lever 14 rearwardly couples the division key lever 404 with the lever 814, the pin 811 swinging the lug 812 of the slotted coupling 808 over the lug 813 of said lever 814.

The division key 12 upon depression, enters the pin 405 on the said lever 404 in the cam slot 777 in the conditioning control lever 644, whereby the latter is swung rearwardly round the shaft 643 and through the connections 646, 647, 648 and 649, rocks the setting shaft 651 (Fig. 24) counterclockwise to shift the section 418A of the key releasing bail 418 endwise, to the left, by the forked member 663 and the shifter rod 666, so that said key-releasing bail section, during the first cycle of operation of the machine, releases the seven left hand rows of the field of keys Dt to clear the value setting up mechanism of the dividend set up therein.

The swinging movement of the setting shaft 651 counterclockwise, shifts the cam control shaft 587 (Fig. 24) endwise to the left through the shifter arms 653, 655 and the notched sleeve 658. The pin 623 of the crank arm 624 is thereby projected into the recess 620 of the gear 618 and consequently couples said gear and cam control shaft 587 together.

In the left hand position of the cam control shaft 587, (Fig. 24), the cam 723 is operatively related to the before described lever arm 881 of the clutch control bail 879 (Fig. 26) and inoperatively related to the lever arm 722, (Fig. 24), of bail 698 which forms part of the multiplying mechanism. Also in said shifted position of the cam control shaft 587, the detent flange 660 (Figs. 24 and 25) fast on said cam control shaft, is disengaged from the detent arm 662a, the cam disc 588 is shifted out of operative relation with the lever arm 585 of transmitting bail 584 so that the automatic multiplier setting up mechanism cannot accumulate a transfer, and the crank arm 679 (Fig. 39) of the key release tappet 680 is operatively related to lever arm 677 of the rocker 676 for operating the key releasing bail 418. In the left hand position of the control shaft 587, the spring 927 is tensioned and urges the control shaft 587 back to its central inactive position in a manner which will be understood.

The laterally projecting pin 405 (Fig. 22) of the Division key 12, upon depression of said key, enters and traverses the cam slot 402, 403 of the key locking bail control lever 391, rocking said lever counter-clockwise (Fig. 22) on the quotient register state control shaft 310, and tensioning the key locking bail spring link 393 to draw the key-locking bail 322 forwardly to its effective position and thereby, through the bail-supporting arm 334 (Fig. 20), link 335, clutch shaft control rocker 337, 339, spring link 342 and crank arm 344, to rock the clutch control shaft 265 clockwise (Fig. 20).

The clutch control shaft, when rocked clockwise from its normal intermediate position shown in Fig. 20, frees the actuator clutch 52 (Figs. 3 and 5) for operation and closes the motor circuit, whereupon the machine commences a cycle.

Because of the previous setting of the positive and negative control lever 14 (Fig. 22) to its rear position, the shoulder 812 of the slotted coupling link 808 overlies the lug 813 at the forward depending end of the quotient register control lever 814, so that depression of the Division key 12, with its coupling link 898, rocks the quotient register control lever 814 counter-clockwise (Fig. 22) causing the pin 821 of said quotient register control lever to wipe along the cam face 824a of the cam arm 824 fast on the quotient register control shaft 310, whereby to rock the cam arm and quotient register control shaft clockwise.

In this movement of the said correction shaft 310, the arm 933 (Figs. 20 and 41) fixed thereon draws the correction shaft locking bar 934 forwardly and locates the rear notch 939 (Fig. 41) thereof above the lug 941 of the latch 940 of the clutch control shaft 265. The latching members 934, 940 are thus conditioned for interlocking relation upon subsequent rotation of said clutch-control shaft 265 to actuator clutch engaging position, whereby said quotient register control 310 and the parts operated thereby are locked against return movement.

Figure 35:
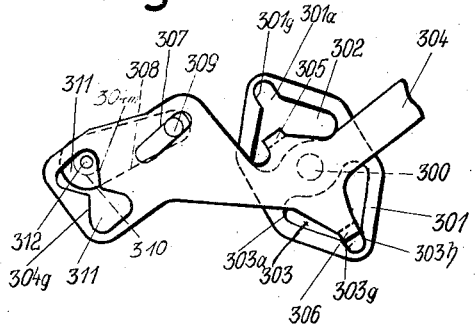
Fig. 35 is another similar view with the parts positioned as under adding conditions and with the correction key depressed.

During the described rotation of the correction shaft 310, the quotient register state control bar 304, (Figs. 41 and 33–37) is moved forwardly and downwardly into the position shown in Fig. 35 whereby the draw key 136 (Figs. 8, 9 and 10) thereof couples the gear 135 of the revolution counter reverse gearing with the bushing 160 and the revolution counter or quotient register is conditioned for subtractive operation. Such movement of said quotient register state control bar 304 is effected by the camming coaction of the pin 309 of the crank 308 fast on the right hand end of the quotient register control shaft 310, with a slot 307 formed in the lower, forward end of the quotient register state control bar 304, and by similar coaction of the reduced end 312 of the quotient register control shaft 310, with the cam edge 304g of said bar 304, as will be understood.

The key locking bar (Fig. 22) when rocked to its effective position by depression of the division key 12, releases the interlocking lever 131 so that when the actuator driving shaft 116 is rotated and the shoulder 177g of the crank disc 117 acts on the lug 128 of the interlocking lever 131, the arm 132 is swung directly under the key locking bar 322, in which position it is held by the unmutilated periphery of the crank disc 117 during a complete cycle of the crank disc, thereby locking the key locking bail 322 in locking relation during the operation of the differential actuators.

It will also be recalled that the gear 619 of the transfer shaft 19 is but one-half the size of the gear 618 with which it engages to drive the cam control shaft 587. Consequently, while the transfer shaft 19 and the rack actuating shaft 116 (Figs. 40 and 41) make one complete revolution, the control shaft 587 makes but half a revolution.

Figure 42:
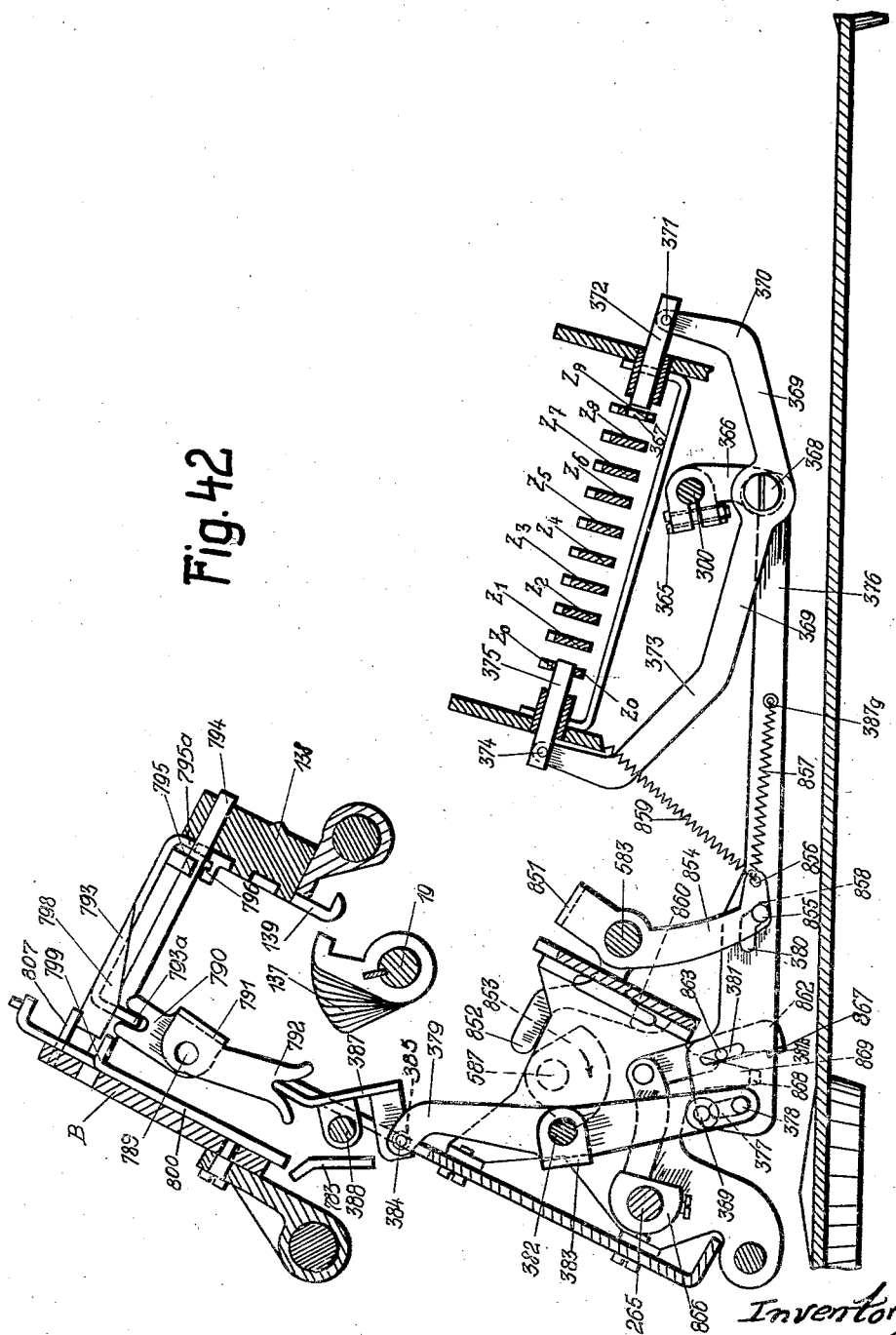
Fig. 42 is still another similar section taken on the line 42—42 of Fig. 38 looking in the direction indicated by the arrows and illustrating details of the differential mechanism and related parts.

Therefore, at about the time when the rack actuator shaft 116 starts the second half of its revolution to return the actuator racks Z1–Z9 to their normal positions, the control shaft 587 starts on its second quarter revolution and brings its state control cam 853 into operation on the rear arm 852 of the state control bail 851 to rock the latter clockwise (Fig. 42, counter-clockwise in Fig. 23).

Rocking movement of the state control bail counter-clockwise (Fig. 23) tensions the spring link 857 connecting the bail with the state control bar 376 to draw the bar rearwardly, but since at this time, the racks Z1–Z9 have not restored to their normal positions, the inner end of anchor bolt 372 contacts the imperforate section of the returning rack Z9 and is held against movement, thereby locking the state control bar 376 against rearward movement, and the spring link 857 remains under tension.

Furthermore, any rearward movement possible to the state control bar 376 is blocked by contact of the offset lug 867 of the depending latch 862 with the front face of the fixed abutment 868 which prevents premature rearward movement of the state control bar 376.

However, as the state control bail 851 is rocked counter-clockwise (Fig. 23), it wipes its pin 855 over the inclined arm 380a of the angular slot 380 in the state control bar 376 and rocks the bar downwardly on its pivot 368. In so doing, the upper end wall of the slot 381 at the rear end of the state control bar, is pressed against the latch pin 863 and draws downwardly the depending latch 862 and offset lug 867 relatively to the fixed abutment 868 near the end of the first half revolution of the cam control shaft 587 to position the offset lug below the lower end of the fixed abutment. This enforced return of the latch 862 to its intermediate position rocks its arm 866 downwardly, imparting a counter-clockwise rotation to the clutch control shaft 265 which rocks the clutch blade 44 back to its normal position while the actuator clutch 52 is completing its first revolution.

Upon the return of the actuator racks Z1–Z9 to normal position at the end of the first machine cycle, the opening 367g in the actuator rack Z9 registers with the anchor bolt 372, and the offset lug 867 of the latch 862 having escaped below the fixed abutment 868, the tensioned spring link 857 is free to snap the state control bar 376 rearwardly, while the pin 855 of the state control bail 851 at such time is at the upper end of the inclined arm 380a of the slot 380.

Rearward movement of the state control bar 376 wipes the inclined arm 380a of the slot 380 over the pin 855 of the state control bail 851 which remains at the counter-clockwise (Fig. 23) limit of its travel due to the fact that the high dwell of the cam 853 is still opposed to the arm 852 of the state control bail. As a result, the wall 858 of the inclined slot 380a cams the state control bar 376 upwardly about its pivot 368, until the lower end of said inclined arm 380a abuts the pin 855.

Rearward movement of the state control bar 376 also rocks the depending latch 862 rearwardly due to the pin and slot connection 863, 381 the offset lug 867 passing beneath the fixed abutment 868 until it clears the lower face thereof.

Were it not for the continued depression of the division key 12 and hence, the continued tension of clutch detent spring 342, the machine would come to rest, but upon the completion of the rearward movement of the state control bar 376, the spring 342 re-asserts itself to again rock the clutch control shaft 265 clockwise (Fig. 23) to free the actuator clutch for operation.

In so doing, the suspending arm 866 rocks upwardly to position the offset lug 867 of the latch 862 opposite the rear face of the fixed abutment 868 and simultaneously, the pin 863 follows the upper end of the slot 381 of the state control bar 376, as the state control bar is rocked upwardly by the wiping action of the inclined arm 380a of the slot 380 over the pin 855 of the state control bail 851 during the rearward shift of the state control bar under the influence of the tensioned spring 857.

Therefore, at the start of the second machine cycle and the second half rotation of the cam control shaft 587, the latch lug 867 lies directly behind the fixed stop 868, the latch pin 863 lies at the upper end of its slot 381 and the bail pin 855 is seated at the lower end of the inclined arm 380a of the slot 380.

Reverting to the functions performed incident to the initiation of the operation of division by depression of the division key 12, the clutch control shaft 265, when rocked clockwise (Fig. 26) in the first instance, at the beginning of the operation in division, by depression of the division key 12, and the consequent tensioning of spring 342 (Figs. 20 and 40), carries with it the operating crank arm 904 (Fig. 26) to position the laterally extending arm 902, 902a, of said crank arm in a substantially vertical plane slightly behind and below that position occupied by the co-acting lateral lug 901, 901a of the coupling slide 892. The coupling slide remains in its elevated normal position relatively to the co-acting arm 902, 902a at this time.

Also the clutch control bail 879 remains at its normal counter-clockwise (Fig. 26) limit of travel, as its operating cam 723 normally positioned just below the free end of the clutch control bail arm 881, has just commenced to turn counter-clockwise (Fig. 26) with its cam control shaft 587.

The clutch control shaft 265, when rocked by the state control bar 376, (Figs. 23 and 42) under the influence of the spring link 857, to condition the machine for subtraction at the end of the first machine cycle, as heretofore explained, results in idly rocking the crank arm 904, first counter-clockwise (Fig. 26) one step, and then clockwise back to the position to which said crank arm was shifted at the beginning of the operation of division, with its lug 902a slightly behind and below the lug 901a of the coupling slide 892.

But as the machine completes its second cycle, and the cam shaft 587 completes its first rotation, the cam 723 (Fig. 26) becomes effective on the arm 881 of the clutch control bail 879 to rock said bail clockwise and with it the slide-setting lever 887.

The clutch control bail 879, through its arm 882 and lateral lug 915, rocks downwardly the coupling link 907, the lug 906 of which, pressing downwardly on the projection 905 of the clutch control shaft crank arm 904, rocks the crank arm and its shaft 265 counter-clockwise (Fig. 26) two full steps from the actuator clutch engaging position through their intermediate position to their carriage shift clutch engaging position. At the end of such counter-clockwise rocking of the clutch control shaft, the clutch selecting blade 44 is in position to disconnect the actuator clutch from operation, and to free the carriage shift clutch for operation.

Simultaneously, the pin 885 projecting laterally from the clutch control bail arm 882, rocks downwardly the slide-setting lever 887, the pin 890 of which slide-setting lever shifts the coupling slide 892 downwardly, so that its lug 901, 901a lies immediately in front of the position just vacated by the laterally turned lug 902, 902a of the crank arm 904. The guide pin and slot connection 894, 895 may rock the coupling slide-operating lever 896 slightly clockwise without materially affecting the transmission of motion from the carrying or tens transfer slide 139 (Fig. 23) to the coupling slide 892, as explained hereinafter.

Therefore, at the end of the second complete cycle of the machine and the first complete cycle of the cam control shaft 587, the carriage shift clutch 26 will be free to transmit power to the carriage shifting disc 227 (Figs. 12 and 13) and the differential rack actuator clutch 52 will be disengaged. Upon the depression of the division key lever 404 (Figs. 22 and 23), the pin 776 coacts with the cam 778a of the rocker 779 and swings the rocker forwardly, counter-clockwise as viewed in Fig. 23. The unlocking flap 783 through the connecting link 781 is thus swung clockwise around the shaft 383.

As the unlocking flap 783 swings clockwise the lever arm 782 thereof coacts with the pin 787g on lever arm 787 of the locking bail 786, and swings said bail counterclockwise on the shaft 382 against tension of the spring 788.

As the division key lever 404 nears complete depression the hook 778b of division key-locking rocker 779 snaps over the pin 776 back to normal position, under the urge of the spring 781a, thus locking said key lever 404 depressed. Coincidentally the locking bail 786 and unlocking flap 783 are returned to normal positions by the spring 788.

The foregoing operations of the unlocking flap 783 and locking bail 786 are idle, being merely incidental to locking of the division key 12 depressed.

Normally the differential actuators Z0 to Z9 are conditioned for addition by the state control bar 376 under the influence of the spring 859, the state control bail 851, state control bar 376, crank arm 366 on shaft 300, yoke 369, 373 and anchor bolts 375, 372.

During the first cycle of operation the dividend set up, "390625," and the divisor set up, "625," are accumulated in the value wheels of the dividend registering means (A) in denominations corresponding to those of the value keys depressed. The machine now registers "390625-0625000000."

During the first cycle of the machine, and after approximately one quarter of a revolution of the control shaft 587 (Figs. 22 and 24), the recess 657 in the collar 658 rotates beyond the end 655a of the shifter arm 655 and the control shaft returns part way to the right under the tension of spring 927 exerted thereagainst until the right-hand face 660a (Fig. 25) of the flange 660 abuts the end 661 of the detent arm 662a. This partial return of the control shaft is not sufficient to disengage its clutch connection 623 with the gear 618, but is merely preparatory thereto.

As heretofore explained, at the completion of the first cycle of movement of the machine the totalizer state control bar 376 moves rearwardly, under the pull of the tensioned spring 857, to project the bolt 372 (Fig. 20) into the actuator Z9 and withdraw the bolt 375 from the rack Z0, and thereby condition the actuators Z0 to Z9 for subtraction. During this subtraction conditioning of said actuators, the quotient register state control shaft 300 and the duplex crank 301, are swung counterclockwise into the position shown in Fig. 36.

Figure 36:
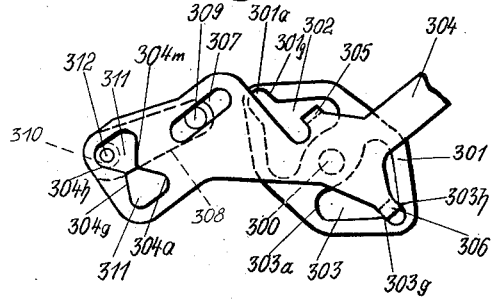
Fig. 36 is another similar view with the parts shown as under subtracting conditions and with the correction key depressed.

On the swinging movement of the quotient register state control crank 301 counterclockwise (Fig. 20), the notch 303g (Fig. 35) coacts with the lug 306 on the quotient register state control bar 304 and moves said bar rearwardly out of the position illustrated in Fig. 35 into the position illustrated in Fig. 36. In the rearward movement of the quotient register state control bar 304 (Fig. 8), the key shifter 177 (Fig. 8) is moved to condition the counter reverse gearing so that in the succeeding cycle of operation of the machine the quotient register RC is driven additively. As the totalizer state control bar 376 (Fig. 23) moved rearwardly the forward edge 858 of the inclined slot 380 engaged the state control bail pin 855 and rocked the latch 862 counterclockwise as at that time the stop lug 867 thereon can swing freely beneath the fixed stop 868. After the swinging latch 862 passes rearward of the fixed stop 868 the clutch control shaft 265 rocks clockwise under the influence of the tensioned spring 342 through the parts 391 (Fig. 20) 322, 334, 335 and 336 in consequence of the depressed division key. The clutch control shaft 265, on such clockwise (Fig. 23) rotation, raises the arm 866 with its swinging latch 862, and the pin 863 moves upwardly in the slot 381 since the totalizer state control bar 376 has been rocked round the point 368 counterclockwise. The stop lug 867 of the swinging latch 862 lies behind the fixed stop abutment 868 and locks the differential actuators in subtracting condition and the actuator clutch engaged.

Shortly before the movement of the differential actuators Z1 to Z9 is completed, that is, just before the completion of half a revolution of the control shaft 587 (Fig. 24) the end 679 of the tappet 680 fast on said cam control shaft depresses the lever arm 677, of the key-releasing bail rocker 676, and rocks the same to effect movement of the key releasing bail section 418A and clear the Dt section of the keyboard of the dividend set up therein in the emanner described under the heading "Automatic multiplication," in my continuation-in-part application Serial No. 310,080, filed December 19, 1939, now Patent No. 2,382,661, issued September 14, 1945.

Figure 39:
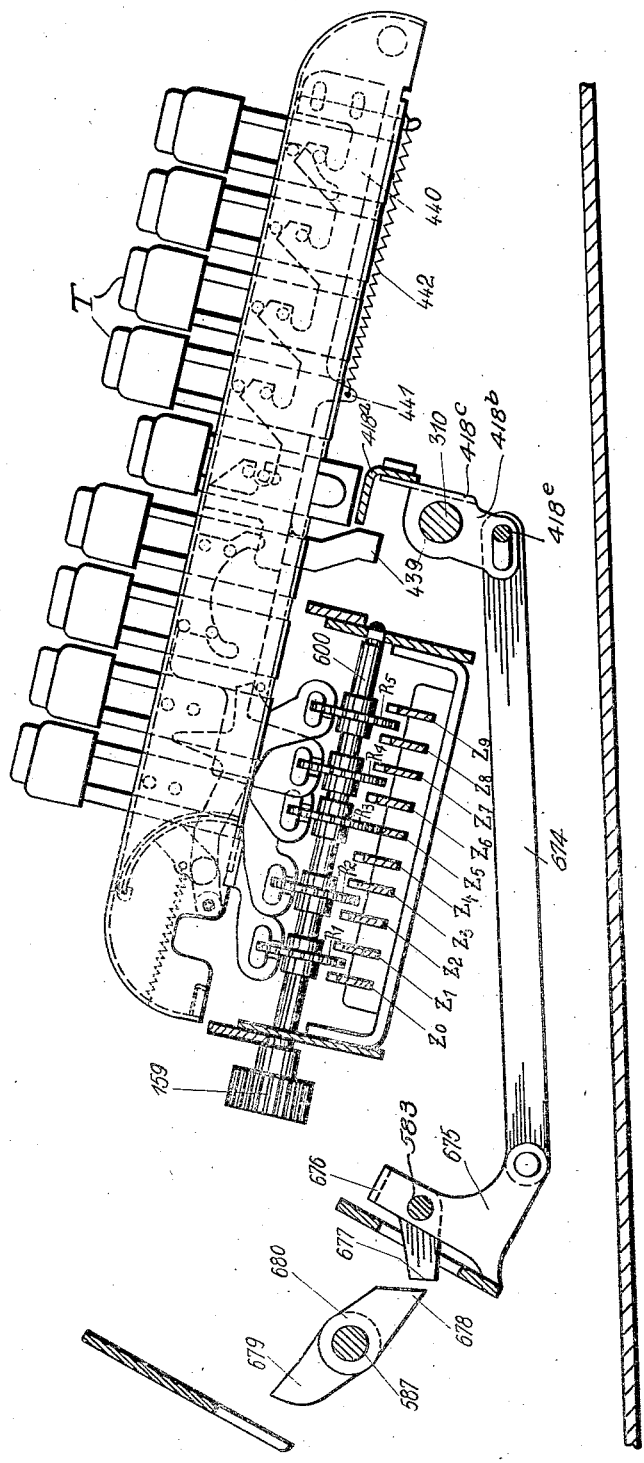
Fig. 39 is a fragmentary transverse section taken on the line 39—39 of Fig. 38 looking in the direction indicated by the arrows, and with the "5" key depressed.

This release of the depressed keys in section Dt. of the keyboard is effected, upon the counterclockwise rocking of the key-releasing bail rocker 676, as follows: As best shown in Figs 24 and 39, the key-releasing bail 676 is journaled on the fulcrum rod 583, the rearwardly projecting arm of the bail lying in the path of travel of the rotating tappet 679 on the control shaft 587, when such control shaft has been shifted to the left by depression of the division key, as heretofore explained.

A link 674 connects the forwardly extending arm 675 of the key-releasing bail with the depending arm 418b of a lever 418c journaled on and slidable along the quotient register control shaft 310. The upper arm of the lever 418c supports one end of the key-releasing bail section 418A, the opposite end of the bail section being supported on an arm 418d likewise journaled on and slidable along the quotient register control shaft 319.

To enable the key-releasing bail section 418A to operate with the main bail section 418, and independently of the connecting link 674, the link is secured to the depending arm 418b by a pin and slot 418e, the pin being of sufficient length to maintain engagement with the slot in the lever arm 418b in any position of the section 418A.

The tappet 679, in its clockwise rotation under the left-hand adjustment of the control shaft 587, rocks the bail 676 counter-clockwise, Figs. 24 and 39, to thrust the link 674 forwardly and impart a counter-clockwise movement to the key-releasing bail section 418A against the tension of a spring (not shown).

The key-releasing bail section 418A, on such counter-clockwise movement, strikes the depending lugs 439 of the key-locking slides 440 on the Dt. side of the keyboard, and shifts such key-locking slides rearwardly, to cause them to release the depressed keys T". As soon as the tappet 680 releases the rocker arm 677, the key releasing bail section 418A, the bail rocker 676 and link 674 return to non-releasing position.

Pressure of the key-releasing bail section 418A against the forward edges of the depending lugs 439 of the key-locking slides 440, to force the spring-pressed key locking slides rearwardly in effecting the release of those numeral keys T representing the "dividend," also forces the rear edges of the lugs 439 against the key locking bail 322 which, it will be recalled, is held in its effective locking position by the spring link 393 (Fig. 22) connecting said key locking bail with the cam slotted control lever 391. The division key 12, by its lateral pin 405 holds the cam-slotted lever in its counter-clockwise position to retain the key locking bail effective.

Therefore, the key-release bail section 418A, in releasing the numeral keys representing the "dividend," also rocks the key-locking bail 322 clockwise (Fig. 20), and said key-locking bail 322, through its supporting arm 334, link 335, rocker 337, spring 342, and operating arm 344, rocks the clutch control shaft 265 to its intermediate position, wherein the motor contacts 362, 364 are temporarily separated.

Such interruption of the operation of the machine is but momentary and results merely in a slight reduction in the speed with which the cycles succeed each other, because the tappet 680 immediately releases the key releasing bail 676, thereby enabling the spring link 393 to re-establish the operative condition of the machine.

As the division key 12 is retained in its depressed position, the motor contacts 362, 364 are held closed because the laterally projecting stud 405 (Figs. 20-22) on the division key lever 404 remains seated in the arcuate slot 402 of the bail lever 391, maintaining under tension the spring link 393 connecting the lever 391 with the key locking bail 322 to shift said bail to its effective position as above stated. In turn, the key locking bail, through its link 335, again rocks the spring tensioning lever 340 to its effective position tensioning the spring 342 connected to the crank arm 344 fast on the clutch control shaft 265, to again rotate the clutch control shaft and its clutch detent 44 to position to free the actuator clutch 52 for operation, whereby the main drive shaft 3 can perform a succeeding revolution.

By maintaining the spring tensioning lever 340 in its effective position, the heel of its depending leg 336 remains in contact with the forwardly extending free end of the pivoted arm 351 slotted to embrace the pin 353 projecting from one arm 347 of the contact closing lever 347, 348, 23 journaled on shaft 241, to hold the contact closing lever in operated position and thereby hold the contact control lever 22 pivotally supported on arm 23 of said contact closing lever, in position to enable the contact 362, 364 to remain closed.

The machine now executes a second cycle of operation during which the divisor "625" set up in the Dr section of the keyboard is subtracted out of the value wheels registering the same while the dividend value "390625" which was set up in the section of keys "Dt" and introduced into the dividend registering means (A) remains in the dividend registering means (A), owing to the fact that the keyboard was cleared of the value "390625" set up in the key section "Dt." In the dividend registering means (A) after the second cycle of operation, the value "3906250000000000" is registered. Simultaneously, in the quotient register RC, the first value wheel 211, which, on the first cycle of operation, was rotated subtractively through one unit, and which showed a "9" after the first cycle operation, is rotated additively one step back to zero during the second cycle of operation.

Shortly before the completion of the second cycle of operation, and shortly before the termination of a complete revolution of the control shaft 587 (Fig. 24), the cam 723 acts on the arm 881 of the clutch control bail 879 and swings the same round the shaft 583 clockwise against the tension of the spring 884 (Fig. 26). The camming face 870 on remaining arm 871 of said clutch control bail engages the locking bail 786 (Fig. 23), whereby the latter is swung around the shaft 382 counterclockwise against the tension of the spring 788 until said face wipes past said yoke, whereupon the latter snaps over the edge 870a of said arm 871 and locks the clutch control bail 879 against return movement.

In the swinging movement of the clutch control bail 879 (Fig. 26) the lateral lug 915 on the bail arm 882 coacts with the edge 914 of the coupling link 907 to swing the latter downwardly on the clutch control shaft 265 against the tension of spring 919. Downward swinging of said coupling link rotates the clutch shaft 265 counterclockwise through the medium of a lateral lug 906 on said link 907 engaging with a cam lug 905 of the shaft-operating crank 904.

Counterclockwise rotation of the clutch control shaft 265 trips the actuator clutch 52, thereby disengaging the same, and effects engagement of the carriage shift clutch 26.

In the rocking movement of the clutch control shaft 265 (Fig. 23) counterclockwise, imparted thereto by the clutch control bail 879, the arm 866 on the clutch control shaft is also swung to lower the swinging latch 862, so that its stop lug 867 is two steps below the fixed stop 869 and the totalizer state control mechanism for the differential actuators is thereby unlocked. At this time, the latch pin 863 is at the bottom of its slot 381, and the bail pin 855 lies at the bottom of the inclined arm 380a of its slot 380.

Shortly before the completion of the first revolution of the cam control shaft 587 which completion occurs at the completion of the second cycle of the machine, the cam 853 (Fig. 23) on the cam control shaft releases the rearwardly projecting arm 852 of the state control bail 851, whereupon the tensioned spring 859 attached to the bail tends to rock said bail and its pin 855 clockwise (Fig. 23). As soon as the differential actuator racks Z0–Z8 are restored to their normal positions, the aperture in the differential rack Z0 registers with its anchor bolt 375, whereupon the spring 859 snaps the state control bail 851 and the state control bar 376 forwardly to their normal positions, to condition the differential actuator racks for addition, the bail pin 855 remaining at the bottom of the inclined arm 380a of the slot 380, and the latch pin 863 remaining at the bottom of its slot 381.

Advance of the state control bar 376, swings the latch 862 with its lug 867 forwardly to position the lug in front of, but two steps below the front face of the fixed abutment 868.

The advance of the state control bar to condition the differential mechanism for addition, also operates through the arm 366 to rock clockwise (Fig. 23) the quotient register state control shaft 300 and its skeleton double-crank 301, to cause the recess 303g (Figs. 35 and 36) of said double crank to rock the lug 306 of the quotient register state control bar 304, together with said bar, forwardly from the position shown in Fig. 36 to the position shown in Fig. 35. The quotient register state control bar, in turn, operating through the bell crank 177, 175 (Fig. 8) and key 136 to condition the quotient register RC for subtraction, as previously explained, the differential actuators Z0–Z9 being conditioned for addition.

During the clockwise swinging of the clutch control bail 879, (Fig. 26) the coupling slide-setting lever 887 is swung downwardly, anti-clockwise, by coaction of the rod 885 on said bail with the slot 886 in said lever, and the coupling slide 892 is moved downwardly on the clutch control shaft 265 by coaction of the rod 890 on the lever 887 with the cam slot 891 in said slide. The downward movement of the coupling slide 892 locates the lateral lug 901 thereof in front of the lug 902a of the shaft-operating crank 904 fast on the said clutch control shaft 265. The coupling slide 892 is guided in its longitudinal movement by the pin 894 moving in the slot 895 of the lever 896.

The slide 892 constitutes a displaceable connection between the elongated overdraft bail 785 and the shaft-operating crank 904, to transmit to the crank 904, the rocking motion imparted to the bail 785 by the overdraft thrust bar 800, (Fig. 23), during the performance of a problem in division.

Obviously, the slide 892 is held out of the path of the crank lug 902 except in operations of division.

The carriage reverse mechanism in the left hand or home position of the carriage B, as previously described, is set for right hand drive of said carriage in which setting, the draw key 225 is coupled with gear 219 (Fig. 12). It has been explained that when the totalizer carriage B is in its normal position at the extreme lefthand end of its travel, its guide collar 282 (Figs. 2 and 14) slidable along the way rod 281 has engaged and rocked the lever 274 to the left (counterclockwise Fig. 14), tensioning spring 277 and spring link 283, which spring link rocks the lever 261 to the left (clockwise in Fig. 14). The lever 261 through link 260, rotates the double crank 259, 238, 238a counterclockwise to position the carriage travel shift key 225, 224, in operative connection with the gear 219.

The shift key 225, 224, thus connects the gear 219 with the sleeve 218 (Fig. 12) on the outer end of which is secured the carriage locking and step by step feed disc 227 engaging the carriage rack 231 (Figs. 2 and 30).

Up to this point, the operation of working an example of division on the machine involved the use of the calculator drive clutch 52 only.

But when the cam 723 (Fig. 24) near the end of the second cycle of the machine, rocks the clutch control bail 879 clockwise (Fig. 26) to cause the offset lug 915 of bail arm 882 to rock downwardly the coupling link 907 (see also Fig. 27), loose on clutch control shaft 265, thereby causing the offset 906 on the coupling link to depress arm 904 fast on the clutch control shaft 265, the clutch control blade 44 is rocked to effect a disconnection of the motor and the calculator drive clutch 52, and to release the carriage shift clutch 26 for operation.

The carriage shift clutch 26 drives gear 25 (Fig. 3) in mesh with gear 219 to rotate the sleeve 218 (Fig. 12) and disk 227 in a direction to shift the carriage step by step to the right.

The cam 723 (Figs. 26 and 23), in rocking the clutch control bail 879, caused the beveled end 879a of bail arm 871 to shift the latching bail 786 aside, which latching bail is immediately returned by its spring 788 as the bail arm 871 escapes below the latching bail, to hold the clutch control bail 879 in its rocked position, to prevent the clutch control blade 44 from disconnecting the carriage shift clutch.

Hence, the carriage shift clutch will continue to feed the totalizer carriage denomination by denomination to the right until discontinued as hereinafter explained. As the carriage B moves step by step toward its extreme right hand position, the differential actuators are conditioned alternately for addition and subtraction through the eccentric 239, (Fig. 12), on the gear 219 of the carriage feed gear train, acting through the eccentric strap 240, crank 242, state control shaft 241, collar 244 and arm 246, (see also Fig. 23), recessed overdraft conditioning link 250, stud 389, overdraft conditioning lever 379 and its pin 378 extending through the slot 377 in the state control bar 376, and said bar, with its connected yoke 369, and anchor bolts 375, 372. Also this alternate conditioning of the differential rack actuators Z0–Z9 for subtraction and addition operates through the arm 366 to which the forward end of the state control bar 376 is connected, to oscillate the quotient register state control shaft 300 bearing at its right-hand end the skeleton double crank 301, which, in turn, operates on the quotient register state control bar 304 (Figs. 33–37, 41 and 8) to shift the state reversing key 136 (Fig. 8) for selecting either of the reversing gears 163, 135, to drive the thimble sleeve 160 and pinion 169 in mesh with the pinion 179 on the quotient register drive shaft 178, to actuate the quotient register additively or subtractively. The quotient register RC is alternately conditioned to operate reversely relative to said actuators. This state conditioning during the movement of the carriage to the right is idle as regards computation. When the carriage B is located in its extreme right hand position the highest denomination of the divisor lies opposite to the highest denomination of the dividend, that is to say the value wheel of highest denomination registering the dividend lies opposite the highest denomination of the keyboard section Dr, or in other words, the highest denomination of the divisor set up.

As an incident to counterclockwise movement of the clutch control shaft 265 and the clutch tripping dog 44 to carriage shift clutch-engaging position, the locking finger 267 (Figs. 14 and 20), on said shaft 265 is swung counterclockwise into the notch 271 of the locking yoke 261 of the carriage reverse mechanism (Fig. 14) to lock the carriage reverse mechanism in condition for right hand drive of said carriage, the stop edge 269a of tongue 269 of the locking yoke 261 bearing against the stop finger 267 and blocking movement of the locking yoke 261 by the spring 277 and lever 274.

The carriage shift clutch 26 remains engaged until the left hand stop 730 on said carriage (Fig. 26) engages the edge 921 of the bellcrank lever 728x and swings the bell crank lever against the tension of its spring 728x, clockwise round its pivot.

The lever 728x, through its bifurcated end 918, swings the coupling link 907 laterally on the clutch control shaft 265, in the direction of the arrow, until the lug 914 thereon is released from the lug 915 of the clutch control bail 879. The coupling link 907 then moves upwardly under the urge of its spring 910 to uncoupling position determined by contact of lug 913 thereon with a fixed stop 912. By relieving the clutch control crank 904 of the restraint imposed thereon by the offset lug 915 of the arm 882 of the clutch control bail 879, the clutch control crank and its clutch control shaft 265 are freed to the action of the doubly tensioned spring link 342 (Fig. 20). The shaft-operating crank 904 follows the upward movement of the coupling link 907 and the clutch control shaft 265 and clutch tripping dog 44 are rotated clockwise to effect the disengagement of the carriage shift clutch 26, and to effect the engagement of the actuator clutch 52.

The spring 342 is held tensioned as long as the division key 12 remains depressed, and is further tensioned by the previous counter-clockwise movement of said clutch control shaft 265 by the cam 723 operating upon the clutch control bail 879.

The clockwise rotation of the clutch shaft 265 swings the locking finger 267 (Fig. 14) from its seat in the notch 271 to release the locking yoke 261 of the carriage reverse mechanism, whereupon the yoke-operating reverse lever 274 swings clockwise, under the tension of the lever-operating spring 277, and said yoke 261 is swung counterclockwise by the stud 275 on said lever, and the link 273 on said yoke. The draw key 225 is thereupon moved by the link 260 and key-operating lever 238 until its lug bears against the side of the left-hand driving gear 220, since the keyway 223 in said gear does not come into register with said lug until the carriage has reached the limit of its right hand movement. As soon as the carriage B reaches its extreme right hand position, the lug 224 of the key 225 escapes from the keyway 222 of the gear 219 and snaps into the keyway 223 of the toothed wheel 220 whereby the carriage reverse mechanism is conditioned for left hand drive of said carriage B.

As the carriage B assumes its extreme right hand position, the state control eccentric 239 (Fig. 12) on the carriage feed gear 219 comes to rest in its lower position. Consequently, the overdraft conditioning shaft 241 has been rocked clockwise in the direction of the arrow $x1$ (Figs. 12 and 23) by the eccentric strap 240 and crank arm 242. The overdraft conditioning link 250 (Fig. 23) is lowered to contact the stud 389 projecting laterally from the overdraft conditioning lever 379 prior to the feed of the carriage towards the right. It will be recalled that near the end of the second machine cycle and the first complete rotation of the cam control shaft 587, the cam 723 (Fig. 26) on said cam control shaft rocks the clutch control bail 879 clockwise (Fig. 23).

The lower end of the floating link 876 is pivoted at 875 to the forward end of the overdraft conditioning link 250, said floating link being slotted at 874 intermediate its ends to accommodate the pin 872 projecting from the arm 871 of the clutch control bail. A spring 877 connected to the clutch control bail pin 872 and to a pin 878 at the upper end of the floating link, normally tends to project downwardly the floating link 876 and the overdraft conditioning link 250 connected thereto, until the upper end of the floating link slot 874 engages the pin 872, which pin normally maintains the overdraft conditioning link out of contact with the pin 389 at the lower end of the overdraft conditioning lever 379.

The clutch control bail 879, when rocked by its actuating cam 723, lowers the floating link 876 and its connected overdraft conditioning link 250. At this time, the state control bar 376 is in its rearward (subtractive) position and the overdraft conditioning lever 379 connected therewith by the pin and slot connection 378, 377, is at its counter-clockwise limit of travel and has rocked its overdraft conditioning bail 387 clockwise. Also at this time (prior to the movement of the totalizer carriage to the right) the state control eccentric 239 (Fig. 12) is in its upper position resulting in rocking the state control shaft 241 (Fig. 23) to its counter-clockwise limit of travel, in which the arm 246 of the state control shaft has shifted the overdraft conditioning link 250 to the limit of its forward travel. In such position, the recess 390 of the overdraft conditioning link lies out of line with the stud 389 of the overdraft conditioning lever 379.

Consequently, the overdraft conditioning link 250, when lowered by the clutch control bail 879 does not at once become coupled with the stud 389 of the overdraft conditioning lever 379. Instead, the unrecessed edge of the overdraft conditioning link 250 contacts the stud 389 and arrests farther downward travel of the overdraft conditioning link 250 and its floating link 876, while the overdraft conditioning bail 879 completes its clockwise travel, the stud 872 of the conditioning bail moving downwardly in the slot 874 of the floating link 876 and tensioning the spring 877.

With the parts in these positions, the state control bar 376, on its advance from its "subtract" position to its "add" position, under the influence of its spring 859 at the end of the second cycle of the machine, as heretofore explained, draws with it the pin 389 of the overdraft conditioning lever 379, and rocks lever 379 clockwise.

The overdraft conditioning lever on such clockwise movement, wipes its pin 389 along the lower edge of the overdraft conditioning link 250 until the pin registers with the recess 390 of the link, whereupon the tensioned spring 877 operates through the floating link 876 to rock the overdraft conditioning link 250 downwardly to fit the recess over the pin 389 and thus couple the overdraft conditioning and state control mechanisms.

The totalizer carriage is then shifted from its normal left-hand or home position to its extreme right-hand limit of travel, which, in the machine illustrated, is effected in seven steps, to position the digit of highest denomination of the dividend registered in the totalizer in line with the digit of highest denomination in the divisor set up on the keyboard.

During such carriage shifting operation, the eccentric 239 (Fig. 12) of the carriage shift gear 219 operates through the eccentric strap 240, arm 242, shaft 241, arm 246 and overdraft conditioning link 250 now connected with the overdraft conditioning lever 379, (Fig. 23) to rock said lever idly back and forth. The overdraft conditioning lever, in turn, idly rocks the overdraft conditioning bail 387, together with the flap 793. Also the overdraft conditioning lever 379, through its pin 378, idly reciprocates the state control bar 376 and its connections, all as heretofore explained, it being clear that, when the totalizer carriage is at its right hand limit of travel, the eccentric 239 will be in its lower position to locate the state control bar 376 (Fig. 23) and its bolts 372, 375 rearwardly and condition the rack actuators Z0 to Z9 for subtraction while the quotient register RC is conditioned for addition, in the manner previously described.

Clockwise movement of the overdraft conditioning bail 387 shifts the overdraft flap 793 through the medium of the flap shifter 791 so that the lug 795 of said flap overlies the lateral arm 796 of the transfer slide 139 of highest denomination of the dividend registering means (A).

Generally speaking, the method by which division is accomplished in the machine comprises alternately subtracting and adding in successive orders, and shifting the carriage to bring successively lower denominations into operative relation with the division which remains set up on the keyboard. Over subtractions or overdrafts are corrected by addition in the next lower denomination in which they occur.

The machine proceeds automatically to progressively reduce the successive partial dividends brought step by step in line with the divisor set up on the keyboard, until the dividend is exhausted with or without a remainder, the number of operations being entered in the quotient subtractively, when the divisor is being added to the dividend, and additively, when the divisor is being subtracted from the dividend. At the end of the operation of division the wheels of the quotient register indicate the quotient.

In case the actual division operation is completed before the carriage returns to its extreme left hand or home position, and the quotient is known, the machine continues to alternately subtract the divisor from and add it onto the totalizer wheels, and the quotient register continues to register the number of operations, interrupted by periodic step motions of the carriage to the left until it reaches its home position, at which time the totalizer wheels and the quotient register will exhibit the same amounts as they did when the true results were first exhibited.

In the example given, the machine, at the initiation of the actual operation of division, will have been automatically set to operate subtractively. Hence the divisor is subtracted from the value wheels of those denominations registering the dividend. In the example chosen, no transfer occurs in the highest denomination. The related transfer slide 139 is shifted upwardly by the related transfer cam 137 (Figs. 28 and 42) and the lug 796 on said slide rocks the overdraft flap 793 counterclockwise (Fig. 23) on the pivot rod 794. The flange 798 on said flap contacts the ledge 799 of the overdraft thrust bar 800 and depresses the same against the tension of the spring 806. Such movement of the thrust bar 800 swings the universal overdraft flap 785 (Fig. 26) round the pivot 389 clockwise. Clockwise swinging of the universal flap 785 swings the beforementioned slide-operating lever 896 counterclockwise on the clutch control shaft 265, by the flap arm 899 and its pin and slot connections 900, 898 to said lever. Such movement of the lever 896 is transmitted by the pin and slot connection 894, 895 to the coupling slide 892, and swings the latter counterclockwise around said shaft 265, whereby the lug 901 on said slide bears against the lug 902a of the shaft-operating crank 904 to rock the clutch control shaft 265 counterclockwise. The shaft 265 rocks the clutch tripping dog 44 toward the non-tripping position relative to the carriage shift clutch 26 and into tripping position relative to the actuator clutch 52 whereby, as will now be clear, the actuator clutch 52 becomes disengaged.

In the counter-clockwise swinging movement of the shaft 265 and its clutch tripping dog 44 (Fig. 20), the spring 342 is further tensioned, since the lever 344 to which said spring is attached, rocks with the clutch control shaft 265 in opposition to the lever 340 to which said spring is also attached and which is held stationary by the locked condition of the depressed division key 12. The tripping dog 44 is now tensioned against the comb 45 of carriage shift clutch 26.

The carriage B now moves one step to the left. The eccentric 239 (Fig. 12) moves upward into the position shown in Fig. 12, whereby the overdraft conditioning shaft 241 is rocked counterclockwise (Fig. 23) through the intermediary of the eccentric strap 240 and crank 242. The overdraft conditioning link 259 is thus moved forwardly and by reason of the engagement of its recess 388 with the pin 389 on the lower arm of the conditioning bail 379, rocks the bail 379 clockwise. The conditioning bail 379, in turn, by its slot and pin connection 377, 378 with the state control bar 376, shifts the bar 376 forwardly to condition the actuators Z0 to Z9 for addition, and the quotient register RC for subtraction as will be understood without repetition of the operation involved. Clockwise movement of the bail 379 will rock the universal overdraft conditioning bail 387 counterclockwise and shift the overdraft flap 793 rearwardly by the shifter lever 791, so that the projection 795a thereon is positioned over the lug 796 of the transfer slide 139.

After substantially a one-half revolution of the carriage shift clutch 26 (Fig. 11), the comb 45 of the same releases the clutch tripping dog 44 so that the tripping dog may swing clockwise, under the tension of the spring 342 (Fig. 20), toward tripping and disengaging position relative to the carriage shift clutch 26, and into non-tripping relation to the actuator clutch 52. The carriage shift clutch 26 is now disengaged and the actuator differential clutch 52 engaged.

The differential actuators now execute four cycles of additive movement until the capacity of the totalizer has been exceeded by the repeated addition of the divisor to the partial dividend, whereupon the carriage B moves another step to the left, and the differential actuators are conditioned for subtraction, and the revolution counter RC for addition.

Division in accordance with the operations described in the foregoing proceeds until the carriage B has arrived in its extreme left hand position.

Shortly before the carriage B moves into its extreme left hand position, the stop 282 (Figs. 2 and 14) thereon engages the carriage reversing lever 274 and swings it counterclockwise around its pivot 276 against the tension of the spring 277, whereby the tension on said spring 283 is increased since the locking yoke 261 is detained, as previously described, by the locking finger 267. As soon as the comb 45 of the carriage shift clutch 26 releases the clutch tripping dog 44, the latter with its shaft 265, swings clockwise under the influence of its spring 342, and the locking finger 267 is also swung clockwise to unlocking position relative to the locking yoke 261. The yoke 261, link 260 and draw-key adjusting lever 238, under the action of the tensioned spring 283, (Fig. 14), are now moved until the lug 224 of the draw key 225 lies against the side of the gear 219, the keyway 222 having not yet rotated into register with said lug. As soon as the carriage B reaches its left-hand position, said keyway 222 registers with said lug 224, the draw key 225 shifts into coupling relation with the gear 219 and the parts of the carriage reverse mechanism return to normal right hand driving position shown in Fig. 14.

In the extreme left hand position of the carriage B, an overdraft occurs. Under this condition, the overdraft flap 793 (Fig. 23) is swung counterclockwise by the highest transfer slide 139 concerned, whereby the flap flange 798 engages the ledge 799 of the overdraft thrust bar 800 and depresses the same against the action of the spring 896. The overdraft thrust bar 800, being now located above the unlocking flap 783, rocks the unlocking flap in clockwise direction around the pivot rod 388. The flap arm 782 pressing against the pin 787g of the lever arm 787, swings the locking bail 786 against the tension of the spring 788 around the fulcrum rod 382 counter-clockwise to release the arm 871 of the clutch control bail 879 (Figs. 26 and 23), and said bail 879 is returned to position (Fig. 23) under the tension of the spring 884, (Fig. 26). The clutch control bail 879, as it returns, causes its laterally projecting pin 885, engaged with the slide-setting lever 887, to rock the lever clockwise, and the lever 887, in turn, by its pin connection 890 with the slide 892, returns the slide 892 to ineffective position, and the clutch control shaft 265 is free to be rocked clockwise. Simultaneously with the release of the clutch control bail 879, the pin 872 on the arm 871 of said clutch control bail contacts the upper end of the slot 874 in the floating link 876 connected with the forward end of the conditioning link 250 and restores the floating and conditioning links to their normal idle positions. In so doing the conditioning link 250 releases the pin 389 of the conditioning rocking lever 379, to render the state control eccentric 239 (Fig. 12) ineffective relatively to the state control bar 376. In the swinging movement of the unlocking flap 783, the link 781 is displaced forwardly to swing the rocker 779 counter-clockwise around its pivot rod 643 (Fig. 22), whereupon the hook 778b releases the pin 776 of the division key lever 404 and said lever is returned under the tension of the spring 774 to normal position. As the crank disc 117 (Fig. 20) rotates into the position illustrated in Fig. 20, the lug 128 of the interlocking lever 130, can fall into the notch 127 of said disc. Under the tension of the spring 398, the cam-slotted bail or control lever 391 and the key locking bail 322 are now rocked clockwise to normal position, the bail 322 swinging the interlocking levers 130, 132 to interlock the lug 128 with the lug 117g, whereby the normal position of the key locking bar is established. As the key locking bail 322 returns to normal position, the link 335 and lever 339 return to normal position in which both clutches 26 and 52 are disengaged.

In the return of the lever 339 to normal position, the cam lever 351 (Fig. 20) also returns to normal position under the tension of the spring 350. The arm 21 of the contact closing lever 22 at a suitable moment rides up onto the periphery 20h of the cam 20. When this has taken place, the said lever 22 is swung clockwise around the pivot 23g, whereby the arms of the contact spring 361 are pressed together and the contacts 362, 364 are opened so that the motor comes to rest.

On the return of the division key lever 404 (Fig. 22), its pin 405 withdraws from the slot 777 of the control lever 644, and in so doing, rocks the control lever 644 to return the section 418A of the key-board resetting bail 418 endwise into the normal position illustrated in Figure 24, through the bail arm 646, (Fig. 22), crank 649, switch shaft 651, crank arm 663 (Fig. 24) and the switch lever 666.

AUTOMATIC NEGATIVE DIVISION

The positive and negative key lever 14 is swung forwardly on its pivot 830 (Figs. 22, 43 and 44) whereby the stud 831 on the lower end of said lever 14 is moved out of the stop notch 832 of the locking dog 834 into stop notch 833 of said dog to lock said lever 14 in its forward position. The stud 831 in this position of the lever 14, lies under the edge 839a of the lever 839. The pin 811 of the lever 14 extending into the slot 810 of the coupling 808, on the division key lever 404, swings said coupling forwardly out of engagement with the lug 813 of the keyless lever 814. The division key 12 is now uncoupled from said keyless lever 814 for a purpose presently explained.

Let it be assumed that the problem $$(390625 \div 625) - (12500 \div 625)$$

is to be solved. The dividend "12500" is set up with its highest denomination in the second row of value keys T, from the left, of the dividend section of keys "DT." Thus, when at a later point in the operation, the carriage B is shifted to its right hand position, the highest denomination in the dividend of the second expression, which will have been registered on the totalizer, will lie in the same denominational line with the digit of second highest denomination of the divisor on the keyboard. This is necessary in order that the units denomination of the dividend, and consequently the units denomination of the quotient, lie in the same denominational line, as otherwise, the correct difference between the quotients would not be obtained.

The operations incident to obtaining the quotient resulting from the solution of the problem (390625÷625) have already been explained. At the termination of this part of the problem, the divisor "625," as we have seen, is still set in the key-board, so that the resetting thereof on the performance of the second part of the problem is unnecessary. The first quotient "625" is accumulated with its highest denomination in the second counter wheel from the left in the quotient register RC. After these preparatory settings, the calculation (125000÷625) is proceeded with. To this end, the division key 12 is first depressed.

In the depression of the division key 12, its key lever 404, being uncoupled from the keyless lever 814, is ineffective as regards operation of the latter. Consequently, the state of the quotient register RC is not altered by depression of the division key 12, as in positive division. Therefore, the quotient register state control bar 304 (Figs. 33–37, and dotted lines Fig. 41) remains under the control of the general shaft 300 and its double crank 301 (Figs. 20, 23, 41 and 42). Since the state control eccentric 239 (Fig. 12) shifts the differential state control bar 376 to "subtract" condition, as heretofore explained, when the totalizer carriage B shifts to its right-hand limit of travel, the double crank 301, on the right-hand end of the general shaft 300, now uninfluenced by the crank arm 308 on the quotient register state control shaft 310, shifts from its "add" Fig. 33 position to its "subtract" position shown in Fig.

34, to condition the quotient register for subtraction.

In the first cycle of operation after setting up said second dividend of the problem on the keyboard, the counter value wheel 211 of highest denomination, being at zero, has rotated through one unit subtractively, so that the quotient register now shows the following value "96250000."

The carriage B is now stepped to the left one step, the differential actuators are conditioned to effect addition in the dividend registering means (A) and the quotient register RC is conditioned for addition, all under control of the overdraft flap 793 and related parts in a manner which it is believed will be understood from the previous description of the operation of said flap and related parts. Alternate conditioning of the machine for addition and subtraction under control of said flap and related parts follows, until the carriage B reaches its extreme left hand position, at which point the problem is completed and the quotient register RC registers "0605000."

In this embodiment of the invention, the totalizer carriage B is limited to seven steps of travel from and to its home position. Because of this limitation, when it is desired to perform division with a dividend of more than seven denominations, the dividend is set up in the dividend section "Dt" of the keyboard and partly in the divisor section "Dr" thereof. Then the dividend, through the depression of the addition key 4, is accumulated in the dividend registering means (A) in the manner described under the heading "Addition" in my continuation-in-part application, Serial No. 310,080, filed December 19, 1939, which matured as Patent Number 2,382,661, dated September 14, 1945. The quotient register RC is disabled through partial depression of the correction key lever 13. As explained in the said continuation application, Serial No. 310,080, filed December 19, 1939 (now Patent No. 2,382,661 dated September 14, 1945), division key lever 404 (Fig. 22), the correction key lever 819, and the keyless lever 814 all pivoted on the rod 636, are closely juxtaposed or nested to the left of the multiplication key lever 634, the correction key lever 819 being sandwiched between the division and the keyless levers. A laterally turned lip 829 projecting to the right at a point intermediate the ends of the keyless lever 814 extends beneath the correction key lever 819. Hence depression of the correction key 13 depresses the keyless lever 814 to disable the quotient register by locating the reversing key 136 (Figs. 8 and 10) in its intermediate position between the reversing gears 135, 163.

The rear edge of the key stem 13 (Fig. 22) of the correction key lever 819 projecting upwardly through a slot in the keyboard plate 635, is notched to engage the rear end wall of the keyboard slot which end wall thus releasably retains the correction key lever in the position to which it may be adjusted, that is, in its normal elevated position, or in its partially or wholly depressed positions, respectively.

The rear end of the correction key lever 819 is slotted at its pivot point on the rod 636, and the spring 817 connecting the depending lugs 815, 818 of the keyless lever and the correction key lever respectively, permits a forward and rearward movement of the correction key lever, to enable the operator to position the correction key, as desired. The notches in the rear edge of the stem of the correction key 13 are formed with inclined shoulders having abrupt upper faces to contact the under face of the keyboard plate. The inclinations of the shoulders enable the correction key to be readily depressed to any of its positions, but the abrupt upper faces require that the operator manually draw the depressed key forwardly, after which it may be restored by hand or in any other convenient manner.

Partial depression of the correction key 13 and its lever 819 depresses the associated keyless lever 814 to force the laterally extending pin 821 on the keyless lever along the cam edge 824a of the cam lever 824 fast on the correction shaft 310, rocking said shaft clockwise and with it the crank 308 at its right hand end.

This crank, it will be recalled, carries a stud 309 (Figs. 33-37) traversing an inclined slot 307 formed in the lower front end of the quotient register state control bar 304.

Figure 33:
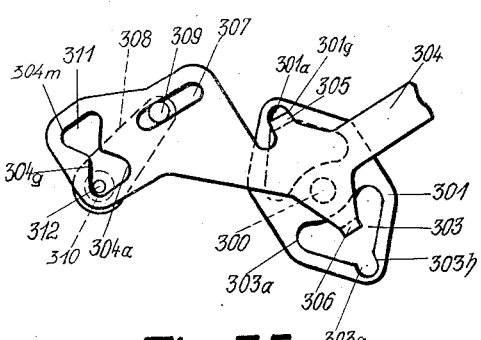
Fig. 33 is a detail view in side elevation, of the setting devices for the draw key of the quotient register reverse gearing with the parts positioned as under normal adding conditions.
Figure 34:
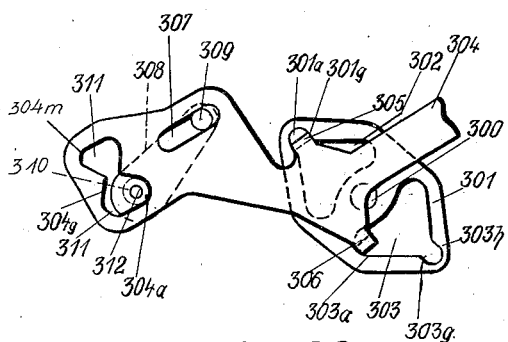
Fig. 34 is a similar view with the parts positioned as under normal subtracting conditions.
Figure 37:
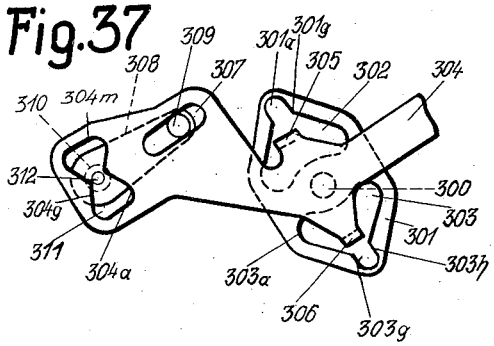
Fig. 37 is still another similar view with the parts in the position as when the quotient register is disabled or cut out.

The crank 308, when rocked, swings the quotient register state control bar 304 counterclockwise from the position shown in Fig. 33 to that shown in Fig. 37, to cause the cam edge 304g of the hourglass-shaped aperture 311 in the quotient register state control bar, to wipe over the reduced end 312 of the quotient register control shaft 310 and thereby cam the quotient register state control bar 304 forwardly incident to its downwardly swinging movement.

The quotient register state control bar 304 on its forward movement, rocks the bell crank 175, 177, (Fig. 8) to which its rear end is connected, and the bell crank slides the quotient wheel reversing key 136 to its intermediate position, thus disconnecting the forward and reverse gears 163, 135, from the driving sleeve 171, so that no motion is communicated to the quotient register wheels. After the introduction of the dividend into the dividend registering means (A) it is necessary, if the lever 17 (Fig. 1) is not set into Add "A" position, to clear the key board of the dividend through depression of the keyboard resetting key 6 (RK). Then the divisor is set up in the divisor section Dr and the division key 12 depressed, whereupon the same operations are performed as have been described in detail under the heading "Operation of Division."

MECHANISM FOR ENTERING THE "FUGITIVE ONE"

As will be understood, subtraction is performed by adding the complement of the subtrahend to the minuend. If, for instance, the value "25" has to be subtracted, this is performed by first adding "99999974." Firstly, the value "25" is set up in the two right hand rows of the keys T of the keyboard. Then, the subtraction key 5 is depressed, whereby the machine is set for subtraction and the rack bar Z9 (Figs. 38 and 45) is locked by the bolt 372. During the calculating process all rack bars Z0 to Z8 are moved in the direction of the arrow L, while the rack bar Z9 is held stationary. The wheel R3, which corresponds to the number "5" of the value "25," is moved by the rack bar Z5 by four units, while the wheel R2, which corresponds to the number "2" of the value "25" is moved by the rack bar Z2 for seven units. The wheels R1, which are associated with the key rows to the left of the two right rows, are turned during the movement of the rack bar Z0 in the direction of the arrow L for 9 units. The result register or accumulator shows "99999974."

The result "99999974" is wrong in so far as the units decimal place shows only a "4" instead of showing a "5." This is corrected in the following manner.

During the movement of the rack-bar Z0 in the direction of the arrow L for 9 units, the short rack bar 1000 (Figs. 38 and 45) offset relatively to and constituting an extension of the actuator rack Z0, turns a nine-toothed pinion 1001 a full revolution. The pinion 1001 is fast on an auxiliary shaft 600a similar to the value setting gear shafts 600 and parallel therewith adjacent and to the right of the units value-setting gear shaft. A corresponding nine-toothed pinion 1003 fast on one end of the auxiliary shaft 600a and in line with the driven gears 159, is engaged by a correspondingly toothed gear 1004 mounted in the rocking coupling shaft 151. The coupling gear 1004 also meshes with a nine-toothed gear 1002 fast on a fugitive one shaft 1002a corresponding with the value wheel shafts 501 and mounted in the carriage adjacent the units value wheel shaft.

The complete rotation imparted by the "fugitive one" rack 1000 to the pinion 1001 is transmitted through the foregoing train of gears to the toothed gear 1002 on the fugitive one shaft 1002a, which trips a fugitive one tens-transfer mechanism (not shown) in all respects similar to the tens-transfer mechanism shown in Fig. 28, to advance the units number wheel 499 one unit, so that the units wheel 499 which indicated "4," now indicates "5," which is the correct value.

The entry of the "fugitive one," described and illustrated in Patent 2,033,439, may be referred to for a more complete explanation of the foregoing.

I claim:

1. In a calculating machine having a carriage, a division key, dividend registering means on said carriage, differential actuators for said registering means, a power drive for said differential actuators, state controlling means for said differential actuators, carriage-shifting mechanism, an eccentric driven by said carriage-shifting mechanism, and normally ineffective coupling means between said eccentric and said state controlling means, the combination of a member rotatable by said power drive in response to depression of the division key, and cams on said member for operating said state controlling means and said coupling means, respectively; said member being shiftable by said division key to bring said cams into working relation with said coupling means, and said state control means, and one of said cams operable to render said coupling means effective to connect said state control means to said eccentric for operation thereby subsequently to the setting of said state control means by the other of said cams.

2. In a calculating machine having a shiftable carriage, dividend registering means on said carriage, differential actuators for said dividend registering means, a division key, a latch for said key, and a motor, the combination of a shaft axially shiftable in response to depression of the division key, and rotatable by the motor, a bail; said shaft being operable, in its shifted position, to operate said bail, a member for holding said bail in operated position, and means, including a flap, operable by said dividend registering means only when the carriage is in a predetermined position to rock the division key latch whereby to free the division key for return to normal, and to displace the bail-holding member to free the bail for return to normal.

3. In a calculating machine, the combination with a shiftable carriage, a division key, and a motor, of a shaft axially shiftable in response to depression of the division key to connect the shaft with the motor for rotation thereby; a bail operable by the shaft in its shifted position, a carriage shift clutch, a control lever for the carriage shift clutch being mounted on the rock shaft, a rock arm on the rock shaft, a coupling member between the bail and the rock arm, and an operating member for the coupling member, the operating member being effective to disengage the coupling member relatively to the bail as the carriage reaches its right-hand limit of travel.

4. In a calculating machine, the combination with a shiftable carriage, dividend registering means on said carriage, differential actuators for said dividend registering means, a division key, and a motor, of a shaft axially shiftable in response to depression of the division key to connect the shaft with the motor for rotation thereby; a bail operable by the shaft in its shifted position, a carriage shift clutch, a clutch for driving the differential actuators, a rock shaft, a control lever fast on the rock shaft, and common to both carriage shift and differential actuator clutches, a rock arm fast on the rock shaft, an overdraft flap controlled by the dividend registering means, and means operable by the overdraft flap to control the rock arm in all carriage positions except the home position, this controlling means including a normally uncoupled coupling means moved to coupling position upon operation of the bail by the axially shiftable shaft.

5. In a calculating machine for solving problems in division, the combination with a differential mechanism; a travelling carriage; an accumulator travelling with the carriage; a state control mechanism for the differential mechanism; and a motor; of a keyboard relatively to which the carriage travels, the keyboard being of sufficient capacity to enable the indication thereon at one time of both the dividend and the divisor; manually set mechanism, depression of which subsequently to setting up both dividend and divisor at one time, initiates repeated cycles of operation of the machine, to first simultaneously register on the accumulator, by the operation of the differential mechanism, both the dividend and the divisor; means to retain the manually-set mechanism in its effective set position; means operable near the end of the first cycle of the machine to clear the dividend only from the keyboard; means conditioned as a result of the first cycle of the machine, and operable on the second cycle to set the state control mechanism to subtract the divisor from the accumulator; means automatically operable during the next cycles of operation of the motor, to shift the carriage from its home position, and relatively to the keyboard, to position the digits comprising the dividend registered in the accumulator in predetermined denominational relation to the digits of the divisor remaining on the keyboard; said manually set mechanism under control of the accumulator, being effective to initiate a step by step return of the carriage to its home position; means to alternately effect subtraction of the divisor one or more times from the dividend, and addition of the divisor one or more times to the dividend, in the successive ordinal positions of the carriage; and means under control of the accumulator to automatically release the manually set mechanism for return to normal.

6. In a calculating machine designed for performing division, the combination with a stationary keyboard; a carriage shiftable denominationally relatively thereto; carriage shifting means; a dividend register mounted in the carriage; differential actuators for the dividend register; actuator driving mechanism; a state control means for the differential actuators: a motor; selective means to connect the motor either with the carriage shifting means to shift the carriage or with the actuator driving mechanism to reciprocate the actuators; an overdraft mechanism operable by the dividend register; normally ineffective means operable by the overdraft mechanism to cause the selective means to connect the motor with the carriage shifting means; normally ineffective means operable by the carriage shift means to adjust the state control to effect subtraction and addition alternately as the carriage shifts denomination by denomination; a division key; and yielding means operable by the division key and connected with the selective means to cause it to connect the motor with the actuator driving means; of means to condition both of said normally ineffective means for operation, including a control shaft; means operable by the division key to connect the control shaft with the actuator driving mechanism for rotation; a conditioning member; means on the control shaft to actuate the conditioning member to render effective both of the said normally ineffective means; and means, releasable by the overdraft mechanism under control of the dividend register when the carriage is in a predetermined position, to lock the conditioning member in its effective position.

7. In a calculating machine designed to perform division, the combination with a field of denominationally arranged, settable keys; a carriage shiftable relatively thereto denomination by denomination from and to its normal position; an accumulator mounted in the carriage; a carriage shift mechanism including a carriage shift clutch; differential mechanism for the accumulator; an actuating clutch for the differential mechanism; selective means to control both clutches; a motor connectible with said carriage shift mechanism and with said differential mechanism through their respective clutches; and denominational means to lock the set keys in their effective positions; of sectional key release means operable upon said denominational locking means to release the set keys; normally ineffective means to actuate one of such sections independently of the other; state control means for the differential mechanism; normally ineffective accumulator-controlled means to render the carriage shift clutch effective; normally ineffective carriage shift mechanism-controlled means to shift the state control means according to the denominational position of the carriage; means to condition the several normally ineffective means for automatic operation, including a special key; a normally idle, axially shiftable control shaft; normally disengaged coupling means between the control shaft and the actuating clutch; means operable under control of the special key to shift the control shaft axially to engage the coupling means; a conditioning member; means on the control shaft to actuate the conditioning member to render effective the normally idle carriage shift mechanism-controlled means for actuating the state control and for rendering effective the accumulator-controlled means to effect cycling of the carriage shift mechanism; and means, releasable by the accumulator-controlled means when the carriage is in a predetermined position, to latch the conditioning member in its effective position.

8. In a calculating machine for solving problems in division, the combination with a keyboard; differential mechanism controlled by the key-board; a travelling carriage; an accumulator mounted in the carriage and shiftable therewith order by order relatively to the key-board; a motor; a motor-driven carriage shift clutch; reversible carriage drive mechanism operable by the clutch; state control means for the differential mechanism; a motor-driven actuator clutch for the differential mechanism; means to normally disable the carriage shift and actuator clutches and selectively shiftable to free either clutch for operation; and carriage-controlled means to control the reversible carriage drive mechanism to determine the direction of carriage travel; of normally ineffective means operated by the carriage drive mechanism to shift the state control means for addition and subtraction; normally ineffective means controlled by the accumulator to select the carriage shift clutch or to free the actuator clutch for operation; a conditioning member effective when set, to render effective said normally ineffective means; a normally ineffective motor-driven member; means operable by the motor-driven member, when effective, to set the conditioning member to effective position; means to releasably latch the conditioning member in its effective position; a manipulative means to render effective the normally ineffective motor driven member; and accumulator-controlled means to automatically release the latching means when the carriage is in one of its positions.

9. In a calculating means for solving problems in division, the combination with a stationary keyboard; a differential mechanism controlled by the numeral keys of the keyboard; an accumulator operable by the differential mechanism; a travelling carriage in which the accumulator is mounted to shift relatively to the keyboard; a state control means for the differential mechanism; a motor; a motor driven clutch to actuate the differential mechanism; a carriage shift clutch; carriage shift mechanism driven by the carriage shift clutch to propel the carriage; and means to disable both of said clutches and to select either clutch for operation, of normally ineffective accumulator-controlled means to select the carriage shift clutch for operation; normally ineffective means operable by the carriage shift mechanism to set the state control mechanism to effect addition or subtraction operations of the accumulator; a control member; means including a manipulative device to connect the control member for operation by the actuator clutch; means also controlled by said manipulative device to select the actuator clutch for operation during a division, unless superseded by the selection of the carriage shift clutch by the accumulator-controlled means; and a conditioning member settable by the control member, when operated, to render effective both the accumulator-controlled carriage shift clutch selecting means, and the carriage shift mechanism controlled means for setting the state control; means interposed between the conditioning member and the clutch selecting and disabling means and operable by the conditioning member as the conditioning member is set to its effective position, to initiate travel of the carriage toward a predetermined position; and carriage controlled means to displace said interposed means at the predetermined position to discontinue the control by the conditioning member of the clutch selecting and disabling means, to enable said clutch selecting and disabling means to select the actuator clutch for effective operation.

10. In a calculating machine designed for performing division, the combination with a stationary keyboard; a carriage shiftable denominationally relatively thereto; a dividend register mounted in the carriage; actuators for the dividend register; a motor; an overdraft mechanism operable by the dividend register; means to drive the actuators; means to drive the carriage; selecting means to connect either the actuator drive or the carriage drive with the motor; and a state control means to condition the actuators for addition or for subtraction; of normally ineffective means operable by the carriage drive means to adjust the state control to addition and subtraction alternately, and to adjust the overdraft mechanism accordingly; a rockable floating member shiftable longitudinally into and out of operative relation with the selecting means, and operable by the overdraft mechanism to connect the carriage drive and the motor; a conditioning member; a normally idle operating member which, upon rotation, actuates the conditioning member; a division key to effect connection of the operating member with the actuator drive for rotation thereby; means interposed between the conditioning member and said selecting means and operable by the conditioning member to initiate operation of the carriage drive; carriage-controlled means to displace said interposed means to enable the selecting means to disconnect the motor and the carriage drive means; and additional means operable by the conditioning member to shift the floating member to position to operatively relate the selecting means with the over-draft mechanism, and to render effective the normally ineffective state control and over-draft adjusting means.

11. In a calculating machine designed to mechanically perform division, the combination with a keyboard; a travelling carriage; an accumulator mounted on the carriage; differential actuators controlled by the keyboard for actuating the accumulator; an overdraft means operable by the accumulator; a motor-driven carriage shift mechanism; a motor-driven actuator drive mechanism; means to select either of said motor-driven mechanisms for operation; and a division key; of division key-controlled means to select the motor-driven actuator drive mechanism for operation, and insure continued cycling of the machine, a normally inoperative motor-driven control member; a conditioning member movable to effective position by the control member when operative; means operable by the division key to render the control member operative; means to connect the overdraft means with the selecting means to select the carriage shift mechanism for operation, including a normally inoperative floating coupling member interposed between the overdraft means and the selecting means, and shiftable by the conditioning member into operative relation with the selecting means to enable the overdraft means to select the motor-driven carriage shift mechanism for operation; means to latch the conditioning member in effective position; and means controlled by the overdraft means when the carriage is in one of its positions, to release the latch and free the conditioning member for return to its ineffective position.

12. In a calculating machine, designed for the mechanical performance of division, the combination with a stationary keyboard on which both factors of the division are set up prior to cycling the machine; a carriage shiftable denominationally relatively to the keyboard; an accumulator mounted on the carriage; differential actuators for the accumulator; means to reciprocate the actuators; state control means to control the actuators to effect addition and subtraction on the accumulator; an overdraft means operable by the accumulator; a motor driven carriage shift mechanism; selective means to render the actuator reciprocating means or the carriage shift mechanism effective; and a division key; of sectional means to release the keys of the keyboard; means set by the division key to control the selective means and insure the continued cycling of the machine; a control shaft; means to shift the state control means; state control conditioning means settable by the control shaft during the first machine cycle to condition the state control shift means for operation prior to the second cycle of the machine, to effect subtraction of the divisor from the accumulator; means rendered effective by the division key, upon depression, to actuate one section of the sectional key release means independently of the other, to release the dividend representing keys during said first machine cycle; a second conditioning means under control of the control shaft and operable during the second machine cycle to shift the selective means to select the motor-driven carriage shift mechanism for operation in opposition to the division key control of the selective means; carriage-controlled means to discontinue the control of said second conditioning means over the selective means, and thus re-establish the division key control of the selective means; normally ineffective means operable by the carriage shift mechanism to shift the state control according to the denominational position of the carriage; normally ineffective means to connect the overdraft means with the selective means; and means operable by said second conditioning member to effectively relate the carriage shift mechanism with the state control, and to effectively relate the overdraft means with said selective means.

13. In a calculating machine designed for mechanically performing division, the combination with a keyboard; differential actuators controlled thereby; a travelling carriage; an accumulator mounted therein and operable by the actuators; a motor drive for said actuators including a clutch, and a clutch control element to effect engagement and disengagement of the clutch; of state control means, including a state control bar positionable to control the actuators for additive and subtractive operation, and having a shouldered slot therein; a state control lever having a pin entered in the slot in the state control bar and normally engaging the shoulder in the slot; resilient means connected to the state control lever to urge the state control bar to position to effect addition in the accumulator; a spring link connecting the state control bar and its lever; means to rock the state control lever in a direction to tension the spring link to shift the state control bar to position to effect subtraction in the accumulator; a latching member connected with the clutch control element and having a pin and slot connection with the state control bar; an abutment engageable by the latching member; means operable on the clutch control element to engage the clutch and shift the latch member to effective position relatively to its abutment, to prevent a premature shift of the state control bar by the tensioned spring link, as the latter is tensioned, until the pin in the state control lever wipes over the shoulder in the slot to rock the state control bar and disengage the latch member and its abutment.

14. In a calculating machine designed for mechanically performing division, the combination with a keyboard; differential actuators controlled thereby; a travelling carriage; an accumulator mounted therein and operable by the actuators; a motor drive for said actuators including a clutch, and a clutch control element to effect engagement and disengagement of the clutch; of state control means including a state control bar positionable to control the actuators for additive or subtractive operation and having a shouldered slot therein; a state control lever having a pin entered in the slot in the state control bar and normally engaging the shoulder in the slot; resilient means connected to the state control lever to urge the state control bar to position to effect addition in the accumulator; a spring link connecting the state control bar and its lever; means to rock the state control lever in a direction to tension the spring link to shift the state control bar to position to effect subtraction in the accumulator; a latching member connected with the clutch control element for relative movement in one direction, and with the state control bar for relative movement in a direction at right angles to the first-named movement; an abutment with which the latching member variously co-acts in response to the movement imparted by the state control bar and the clutch control element, respectively; means operable on the clutch control element to engage the clutch, and incidentally shift the latch member to position for effective engagement with one or the other opposite faces of its abutment to prevent a shift of the state control bar by the tensioned spring link in one direction, or by the resilient means in the opposite direction prematurely in the cycling of the machine, the pin in the state control lever wiping over the shoulder in its slot to disengage the latch member and its abutment, in a transition from addition to subtraction; and means operable subsequently to the operation of the state control lever rocking means, to disengage the latching member from the opposite face of its abutment upon a transition from subtraction to addition.

15. In a calculating machine having dividend registering means; a keyboard, including a plurality of orders of value keys for setting up the dividend and the divisor; ordinal locking members for said value keys with which locking members the keys engage upon depression; differential actuators for said registering means controlled by the depressed value keys, and conditionable for addition and subtraction; a key to condition the machine for working problems in division; and a motor; the combination of a member shiftable in response to depression of the division key, to connect said member with said motor for rotation; means operable by said member upon rotation thereof to automatically control the state of said differential actuators; a sectional key releasing member operable to displace all said key locking members to free the depressed keys for return to normal; and means operable by the shiftable and rotatable member upon rotation thereof to operate a section of the key release member independently of the remaintaining sections to release a predetermined number less than the whole number of key locking members.

16. In a calculating machine designed to perform problems in division, the combination with a stationary keyboard; a carriage shiftable relatively to the keyboard denominationally; a dividend register mounted in the carriage to travel therewith; actuators for the dividend register; a motor; carriage shifting mechanism; and clutch means to releasably connect the motor and the carriage shift mechanism; of means to automatically control the clutch means, including a normally idle operating member; a division key; means controlled by the division key to connect the operating member for actuation by the motor; a normally idle conditioning member shiftable to effective position by the operating member at a predetermined point in the movement of the operating member by the motor; a shiftable connection between said conditioning member and said clutch means; means to normally retain said shiftable connection in, and to return it to operative relation between the conditioning member and said clutch means, said shiftable connection, when in operative position, being operable by said conditioning member to adjust the clutch means to connect the motor with the carriage shift mechanism; a latch to retain the conditioning member in its shifted position, to maintain the clutch connection between the motor and the carriage shift mechanism effective; said means to normally retain the shiftable connection in and to return it to its operative relation, being operable by the carriage at a predetermined point in the carriage travel, to displace the shiftable connection and thereby interrupt the control of the clutch means by the conditioning member; means operable upon the interruption of said control of the clutch means by the conditioning member, to render said clutch means ineffective and thereby disconnect the motor and the carriage shift mechanism; and means to displace the latch and free the conditioning member for return to its normal idle position.

AUGUST FRIEDRICH POTT.